United States Patent
Fujita et al.

(10) Patent No.: US 7,857,458 B2
(45) Date of Patent: Dec. 28, 2010

(54) IMAGE DISPLAY DEVICE AND IMAGE PROJECTION DEVICE

(75) Inventors: Kazuhiro Fujita, Tokyo (JP); Atsushi Takaura, Tokyo (JP); Yasuyuki Takiguchi, Kanagawa (JP); Toshiaki Tokita, Kanagawa (JP); Toshiharu Murai, Kanagawa (JP); Hiroyuki Sugimoto, Kanagawa (JP); Kazuya Miyagaki, Kanagawa (JP); Takanobu Osaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 651 days.

(21) Appl. No.: 11/718,460

(22) PCT Filed: Nov. 2, 2005

(86) PCT No.: PCT/JP2005/020490
§ 371 (c)(1),
(2), (4) Date: Jan. 17, 2008

(87) PCT Pub. No.: WO2006/049310
PCT Pub. Date: May 11, 2006

(65) Prior Publication Data
US 2008/0151356 A1 Jun. 26, 2008

(30) Foreign Application Priority Data
Nov. 2, 2004 (JP) .............................. 2004-319045

(51) Int. Cl.
*G03B 21/00* (2006.01)
(52) U.S. Cl. .............................. 353/46; 353/84; 345/87
(58) Field of Classification Search .................. 353/46, 353/82, 84; 345/84, 87, 90; 359/298, 315
See application file for complete search history.

(56) References Cited

U.S. PATENT DOCUMENTS

| 2003/0011559 A1 | 1/2003 | Adachi et al. |
| 2003/0132901 A1 | 7/2003 | Shimada |
| 2008/0055266 A1* | 3/2008 | Harada et al. ............... 345/173 |
| 2010/0118002 A1* | 5/2010 | Yamashita et al. .......... 345/205 |

FOREIGN PATENT DOCUMENTS

| EP | 1 111 575 A1 | 6/2001 |
| JP | 2000 28984 | 1/2000 |
| JP | 2000-111871 | 4/2000 |
| JP | 2002 281517 | 9/2002 |

(Continued)

*Primary Examiner*—Kevin Pyo
(74) *Attorney, Agent, or Firm*—Oblon, Spivak, McClelland, Maier & Neustadt, L.L.P.

(57) ABSTRACT

An image display device is disclosed that has a simplified structure and is able to display a high quality image of high resolution at low cost. The image display device includes a light separation unit configured to extract a light beam having a predetermined wavelength band from light emitted from a light source; a light valve that controls a light beam incident thereon to form a plurality of sub frames of a target image; and a light path shift unit operable to shift a light path of an output light beam from the light valve having the predetermined wavelength band according to a frame period of the target image to locate one or more sub frame of the target image at different positions from other sub frames of the target image formed by the light valve.

12 Claims, 36 Drawing Sheets

FOREIGN PATENT DOCUMENTS

| | | |
|---|---|---|
| JP | 2003 44007 | 2/2003 |
| JP | 2003 302952 | 10/2003 |
| JP | 2003 322854 | 11/2003 |
| JP | 2003 322908 | 11/2003 |
| JP | 2004 233524 | 8/2004 |

\* cited by examiner

State 1

State 2

TG1+TG2=TR=TB

State 1

State 2

TG1+TG2=TR=TB

TG1"+TG2"=TR"=TB"

TG1'+TG2'=TR'=TB'

IMAGE DISPLAY DEVICE AND IMAGE PROJECTION DEVICE

TECHNICAL FIELD

The present invention relates to an image display device and an image projection device, and particularly, to a display device capable of optical control pixel by pixel using a light valve, and a projector and a rear-projection apparatus having the display device.

BACKGROUND ART

In the related art, a liquid crystal projection device for projecting a modulated image on a screen by using a display device is well known, and in the liquid crystal projection device, the display device is used to modulate three different monochromatic light beams, such as, red (R), green (G), and blue (B), and obtain the modulated image. In order to increase the resolution of the image projected on the screen, it is required that the liquid crystal projection device be of a high resolution. For this purpose, it has been attempted to increase the number of pixels of a liquid crystal display device, or form the images in plural screens with plural projectors, or shift green pixels by half pixel pitch to obtain effects equivalent to doubled pixel numbers.

However, when the number of pixels is increased, for example, in a transmission-type liquid crystal display device, the area of the open area of each pixel decreases, and the projection luminance becomes insufficient. When using plural projectors to display the images on plural screens, it is difficult to obtain smooth connection between the images on adjacent screens. When shifting the green pixels by half pixel pitch to obtain the double-pixel-number effect, because the R, G, B light in the whole band is projected on the screen to form an image by using only one projection lens, and because of the monochromatic aberration of magnification of the projection lens, different monochromatic images do not have precisely the same size, thus it is difficult to form an image of a high resolution and obtain a sufficiently large contrast ratio.

To solve this problem, a display technique is proposed in which a pixel-shift element is used to switch the light path quickly, thereby, increasing the number of pixels apparently, and thus realizing high-resolution display. This technique is promising because it is capable of easily realizing high-resolution display.

For example, in the related art, it has been attempted to combine the light path shift technique with a so-called "color sequential technique". In the color sequential technique, color light beams, for example, of the three primary colors, are generated sequentially at a high speed in a time-division manner for illumination, thus, monochromatic images are displayed sequentially on the screen corresponding to the illumination monochromatic light, and resultantly, it looks as if color images are being displayed. This technique is promising because it can be realized with a compact and inexpensive device. In the related art, when combining the above two techniques, however, a light valve of very high-speed response is required.

For example, as a simplified calculation, since three sub-frames are required for the three primary colors, R, G, B, respectively, the total required number of sub-frames equals the total number of times of pixel-shift operations multiplied by three (the number of sub-frames for R, G, B). For example, assume the number of times of the pixel-shift operations is two (that is, pixels are shifted to two different positions in one image frame), the required number of sub-frames equals 2×3=6, that is, it is necessary to display 6 sub-frames. In other words, it is necessary to update the image data applied on a light valve at least 6 times in each image frame, and the pixel shift element needs to perform switching three times.

It is reported that development is being made on such a high-speed light valve, but a device ready for mounting in a product has not been manufactured.

Instead of the combination of the pixel shift technique and the color sequential technique, in the related art, it has also been attempted to simply increase the pixel number of a light valve to increase the resolution of the display device. In this case, however, the size and cost of the light valves increase.

In addition, in the related art, it has been proposed to increase the number of the light valves to increase the resolution of the display device. For example, a liquid crystal projection devices have been disclosed which are able to display images of high resolution and a high contrast ratio in Japanese Laid Open Patent Application No. 2003-322854 (hereinafter, referred to as "reference 1").

FIG. 34 is a diagram illustrating a configuration of the liquid crystal projection device in the related art, as disclosed in reference 1.

In the liquid crystal projection device 100 illustrated in FIG. 34, there are two reflection type liquid crystal display elements 115, 116, which are for use of the green color; incident light is projected so that pixel shift is performed in an inclined direction; thus the resolution of the green image, which has high relative visibility, is doubled, thereby realizing a high resolution display.

In addition, Japanese Laid Open Patent Application No. 2003-322908 (hereinafter, referred to as "reference 2") discloses a projection system which includes a transmission type liquid crystal display panel composed of four transmission type liquid crystal display elements.

However, in reference 1 and reference 2, two green display panels are employed and are arranged such that respective images formed by the two green display panels are shifted by a distance less than a pixel pitch to double the pixel number. As a result, the number of panels increases, and this causes increased cost of the display device.

DISCLOSURE OF THE INVENTION

It is a general object of the present invention to solve one or more of the problems of the related art.

A specific object of the present invention is to provide an image display device and an image projection apparatus that have simplified structures and are able to display a high quality image of high resolution at low cost.

According to a first aspect of the present invention, there is provided an image display device, comprising: a light separation unit configured to extract a light beam having a predetermined wavelength band from light emitted from a light source; a light valve that controls a light beam incident thereon to form a plurality of sub frames of a target image; and a light path shift unit operable to shift a light path of an output light beam from the light valve having the predetermined wavelength band according to a frame period of the target image to locate one or more sub frame of the target image at different positions from other sub frames of the target image formed by the light valve.

Preferably, the light beam having the predetermined wavelength band includes a light beam having relative visibility higher than a predetermined value. Further, preferably, the light beam having the predetermined wavelength band includes a green light beam.

As an embodiment, the image display device further comprises a projection optical system configured to project the output light from the light valve to form the target image.

According to the present invention, when the light path shift unit shifts the light path of the light beam from the light valve having specified wavelength band according to a frame period of the target image, sub frames of the target image to be projected corresponding to the illumination light beam having specified wavelength band are formed at different positions, and the total number of pixels included in all sub frames corresponding to the illumination light beam having specified wavelength band is apparently increased, thereby, it is possible to realize high-resolution image projection.

According to a second aspect of the present invention, there is provided an image display device, comprising: a time-division illumination unit that generates a plurality of different monochromatic light beams sequentially in a time-division manner for time-divisional illumination; a light valve that is operable to form a plurality of sub frames of a target image when each of the monochromatic light beams is illuminating the light valve; a control unit that controls the light valve during illumination of one of the monochromatic light beams so as to form a monochromatic image corresponding to the one of the monochromatic light beams; and a light path shift unit that is operable to shift a light path of an output light beam from the light valve according to a frame period of the target image to form a sub frame of the target image at a different position from the sub frames formed by the light valve, wherein the time-division illumination unit includes a color-switching unit configured to, in one frame period of the target image, divide at least one of the monochromatic light beams having a predetermined wavelength band into at least two portions in the time-division manner, the light path shift unit shifts the light path of the output light beam from the light valve at least when one or more of the portions of the monochromatic light beam having the predetermined wavelength band is illuminating the light valve, and illumination is performed in the time-division manner according to the timing of the light path shift operation of the light path shift unit.

According to the present invention, it is possible to provide an image display device having a simplified structure and able to display a high quality image of high resolution at low cost.

As an embodiment, the color-switching unit is configured to specify illumination time periods of the different monochromatic light beams, respectively, so that white color illumination light is produced within one frame period of the target image so that illumination is performed in the time-division manner according to the specified illumination time periods and the timing of light path shift operation of the light path shift unit.

According to the present invention, the color of the displayed images is not biased to the color having the highest relative visibility; hence, it is possible to display a high quality image of high resolution with excellent color balance.

As an embodiment, the different monochromatic light beams include a red light beam, a green light beam, and a blue light beam, the color-switching unit, within one period of one image frame, divide the green light beam into at least a first portion and a second portion, and define one illumination cycle including four or more time divisions corresponding to the first portion of the green light beam, the second portion of the green light beam, the red light beam, and blue light beam, respectively, the light path shift unit shifts the light path of the output light beam from the light valve during illumination of the first portion of the green light beam or during illumination of the second portion of the green light beam.

According to the present invention, by performing pixel shift display on the image corresponding to the green light, which has high relative visibility, and thus adding sub frames in the color sequential scheme, it is possible to provide a compact and inexpensive image display device having few light valves. Therefore, it is possible to display a high quality image of high resolution at low cost.

As an embodiment, alternatively, illumination time periods of the red light beam and the blue light beam are arranged between the illumination time period of the first portion of the green light beam and the illumination time period of the second portion of the green light beam, and the light path shift unit shifts the light path of the output light beam from the light valve during illumination of the red light beam or during illumination of the blue light beam.

According to the present invention, the resolution of the image displayed in a sub frame of a green color which has high relative visibility is apparently improved, and thus it is possible to display a high quality image of high resolution.

As an embodiment, the color-switching unit includes a plurality of color filters arranged side by side, and the color-switching unit repeatedly moves the color filters back-and-forth in accordance with timings of displaying the monochromatic images to perform color switching, select the monochromatic light beam having the predetermined wavelength band, and perform illumination in the time-division manner.

According to the present invention, it is possible to realize a color-switching unit having a simplified structure that is inexpensive compared to a color filter and suitable for pixel shifting and color displaying sequences.

As an embodiment, each of the monochromatic light beams is emitted from a monochromatic light source that is controlled to emit light in synchronization with one of the corresponding illumination time periods.

According to the present invention, it is possible to provide an image display device without a mechanical driving mechanism and of high reliability.

As an embodiment, the time-division illumination unit generates the different monochromatic light beams by passing white light from a white light source through a plurality of wavelength-selective filters which are configured to be switchable with each other, setting switching timings of the wavelength-selective filters to be different for different colors included in the white light, and adjusting illumination time periods of the different colors included in the white light.

According to the present invention, it is possible to construct an image display device of low cost by using simple rotational color filters.

As an embodiment, the time-division illumination unit sets strength per time unit of the different monochromatic light beam having the predetermined wavelength band to be lower than strength per time unit of the other different monochromatic light to maintain color balance within one frame.

According to the present invention, it is possible to display a high quality image of high resolution.

As an embodiment, strength per time unit of the different monochromatic light beam having the predetermined wavelength band is set to be lower than strength per time unit of the other different monochromatic light beams by adjusting light flux passing through the wavelength-selective filters.

According to the present invention, it is possible to display a high quality image of high resolution.

As an embodiment, the strength per time unit of one of the different monochromatic light beams is reduced by setting a non-illumination time period within a sub frame period.

According to the present invention, it is possible to provide an image display device having a simplified structure and able to display a high quality image of high resolution at low cost.

As an embodiment, the time-division illumination unit generates the different monochromatic light beams by using a liquid crystal switching element to set switching timings of wavelength selection in the liquid crystal switching element to be different for different colors included in white light from a white light source, and selectively adjust illumination time periods of the different colors included in the white light.

According to the present invention, it is possible to provide an image display device without a mechanical driving mechanism and of high reliability.

As an embodiment, the light valve is one of a transmission type liquid crystal panel, a reflection type liquid crystal panel, and a micro-mirror device.

According to the present invention, it is possible to provide an image display device having a simplified structure and able to display a high quality image of high resolution at low cost.

According to a third aspect of the present invention, there is provided an image display device, comprising: a light separation unit configured to extract a plurality of light beams having different wavelength bands from light emitted from a light source; a plurality of light valves that are illuminated by the light beams having different wavelength bands, respectively, and form plurality of monochromatic images corresponding to the different wavelength bands, respectively; a color combination unit that combines the monochromatic images to form a color image; and one or more light path shift unit that is provided on a downstream side of one of the light valves to shift a light path of an output light beam from the one of the light valves according to a frame period of the target image to form a sub frame of the image formed by the one of the light valves.

As an embodiment, the light path shift unit is provided between the color combination unit and the one of the light valves.

According to the present invention, because plural light valves are used to form a red image, a green image, and a blue image, respectively, it is possible to simplify the optical system of the device, and improve the image quality. In addition, because one or more light path shift unit is provided following one or more light valves, for example, the light path shift unit is provided between the color combination unit and the one of the light valves, light path shift unit shifts a light path of an output light beam from the light valve according to a frame period of the target image, and this forms a sub frame of the image formed corresponding to the illumination light beam having a specified color. Therefore, the total number of pixels corresponding to the specified color is apparently increased, thereby, it is possible to realize high-resolution image projection.

In addition, when the light path shift unit is provided between the color combination unit and the corresponding light valve, it is possible to reduce the size of the light path shift unit, thus reducing cost of the device.

As an embodiment, a light path correction element is arranged between the color combination unit and each of the other light valves than the one light valve, and a light path length in the light path correction element is substantially the same as a light path length in the light path shift unit.

According to the present invention, the light path length difference generated by the light path shift unit can be compensated for, thus, it is possible to prevent monochromatic aberration of magnification and thus improve the image quality.

As an embodiment, each of the light valves may be a transmission type light valve or a reflection type light valve.

According to the present invention, when using a transmission type light valve, it is possible to simplify the structure of the device, reduce the distance from the light valve to a projection lens, and make it easy to arrange the light valve.

Meanwhile, when using a reflection type light valve, because of the high area ratio of each pixel of the reflection type light valve in a reflection type liquid crystal liquid panel, it is possible to increase the utilization of illumination light, thereby, improving brightness of the image.

As an embodiment, each of the light valves is an optical modulation element able to control a polarization direction of an output light beam therefrom pixel by pixel, a polarization direction of the output light beam from the one of the light valves is perpendicular to polarization directions of the output light beams from the other light valves after passing through the color combination unit, and the light path shift unit is polarization-dependent and is arranged on a downstream side of the color combination unit to selectively shift the light path of the output light beam from the one of the light valves.

According to the present invention, it is possible to prevent the light path length difference between light beams of different colors generated by the light path shift unit without using a light path correction unit, and it is possible to prevent monochromatic aberration of magnification and thus improve the image quality.

As an embodiment, a color selective wave plate is arranged on a downstream side of the color combination unit to adjust the polarization states of the output light beams from different light valves to be the same.

According to the present invention, by using the color selective wave plate to adjust the polarization states of light beams from different the light valves to be the same, it is possible to use any kind of screen, on which the image is to be projected, without caring about polarization dependence of the screen. This makes the image projection device very convenient for use. In addition, it is possible to insert an additional polarizer to improve the contrast ratio of the image.

According to a fourth aspect of the present invention, there is provided an image projection apparatus, comprising: an image display device; and a projection optical system, wherein the image display device includes: a time-division illumination unit that generates a plurality of different monochromatic light beams sequentially in a time-division manner for time-divisional illumination; a light valve that is operable to form a plurality of sub frames of a target image when each of the monochromatic light beams is illuminating the light valve; a control unit that controls the light valve during illumination of one of the monochromatic light beams so as to form a monochromatic image corresponding to the one of the monochromatic light beams; and a light path shift unit that is operable to shift a light path of an output light beam from the light valve according to a frame period of the target image to form a sub frame of the target image at a position different from other sub frames formed by the light valve; wherein the time-division illumination unit includes a color-switching unit configured to, in one frame period of the target image, divide at least one of the monochromatic light beams having a predetermined wavelength band into at least two portions in the time-division manner, the light path shift unit shifts the light path of the output light beam from the light valve at least when one or more of the portions of the monochromatic light beam having the predetermined wavelength band is illuminating the light valve, and illumination is performed in the time-division manner according to the timing of the light path shift operation of the light path shift unit.

According to the present invention, it is possible to provide a compact image projection apparatus having a simplified structure and able to display a high quality image of high resolution with an apparently increased pixel number at low cost.

According to a fifth aspect of the present invention, there is provided an image projection apparatus, comprising: an image display device; and a projection optical system, wherein the image display device includes: a light separation unit configured to extract a plurality of light beams having different wavelength bands from light emitted from a light source; a plurality of light valves that are illuminated by the light beams having different wavelength bands, respectively, and form plurality of monochromatic images corresponding to the different wavelength bands, respectively; a color combination unit that combines the monochromatic images to form a color image; and one or more light path shift unit that is provided on a downstream side of one of the light valves to shift a light path of an output light beam from the one of the light valves according to a frame period of the target image to form a sub frame of the image formed by the one of the light valves.

According to the present invention, it is possible to provide an image projection apparatus having a simplified optical system and able to display a high quality image of high resolution with an apparently increased pixel number at low cost.

These and other objects, features, and advantages of the present invention will become more apparent from the following detailed description of preferred embodiments given with reference to the accompanying drawings.

BEST MODE FOR CARRYING OUT THE INVENTION

Below, preferred embodiments of the present invention are explained with reference to the accompanying drawings.

First Embodiment

As described above, it is possible to realize high-resolution display by using a pixel-shift element to switch the light path quickly, thereby, increasing the number of pixels apparently. For example, this light path shift technique can be combined with the well-known color sequential technique. In the color sequential technique, for example, color light beams of the three primary colors are generated sequentially at a high speed in a time-division manner, and the image projected on a screen changes quickly corresponding to the illumination monochromatic light; hence, monochromatic images are displayed sequentially on the screen, and resultantly, it looks as if color images are being displayed. This technique is attractive because it can be realized with a compact and inexpensive device.

In the related art, as described above, it has been attempted to combine the light path shift technique and the color sequential technique in the following way. Specifically, as a simplified calculation, since three sub-frames are required for the three primary colors, R, G, B, respectively, the total required number of sub-frames equals the total number of times of pixel-shift operations multiplied by three (the number of sub-frames for R, G, B). For example, assuming a displayed image is composed of R, G, B three monochromatic images, and the number of times of the pixel-shift operations is two (that is, pixels are shifted to two different positions in one image frame), the required number of sub-frames equals 2×3=6, that is, it is necessary to display 6 sub-frames. In other words, it is necessary to update the image data applied on a light valve at least 6 times in each image frame, and the pixel shift element needs to perform switching three times. This requires a light valve of high-speed response.

In the present embodiment, as described below, the light path shift technique and the color sequential technique are combined in different ways, and according to the present embodiment, it is possible to provide an image display device that have simplified structures characterized by color sequential technique and are able to display a high quality image of high resolution at low cost.

In the present embodiment, it is assumed that a transmission type liquid crystal panel is used as a light valve in an image display device.

Figure 1:
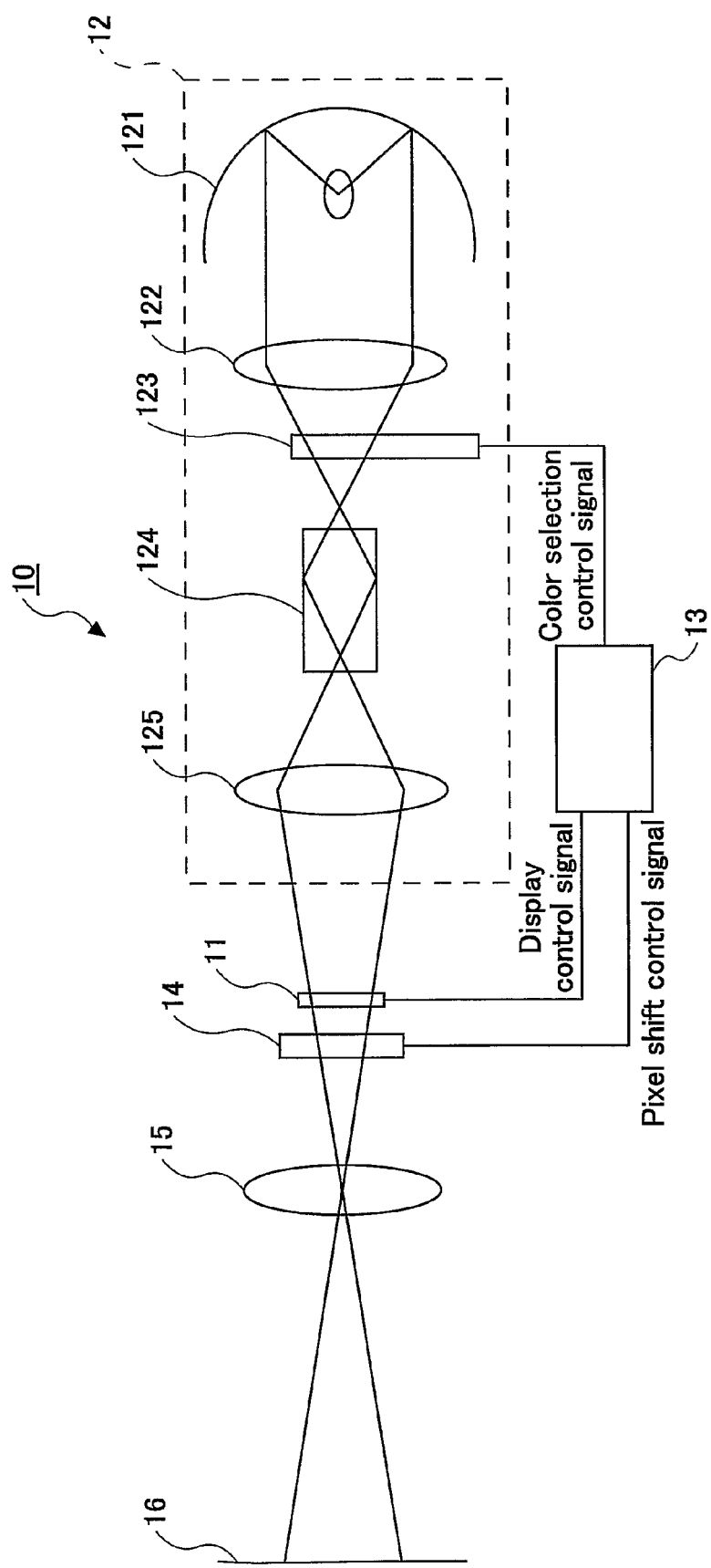
FIG. 1 is a diagram exemplifying a configuration of an image display device according to a first embodiment of the present invention.

FIG. 1 is a diagram exemplifying a configuration of an image display device according to a first embodiment of the present invention.

As illustrated in FIG. 1, the image display device 10 includes a light valve 11, a time-division illumination unit 12, a control unit 13, a pixel shift unit 14, a projection optical system 15, and a panel 16.

The time-division illumination unit 12 generates different monochromatic light beams sequentially in a time-division manner.

The control unit 13 controls image data applied on the light valve 11, and controls color-switching operations of a color-switching unit 123 (described below) and pixel-shift operations of the pixel shift unit 14 during illumination of the monochromatic light beams to form a color image corresponding to the monochromatic light beams in illumination.

The pixel shift unit 14 shifts pixels projected by the light valve 11 so that the shifted pixels do not overlap with other pixels, for example, the pixel shift unit 14 shifts the pixels projected by the light valve 11 by a pixel pitch or less.

The projection optical system 15 magnifies and projects the image formed by the light valve 11.

The time-division illumination unit 12 includes a white light source 121, a light condensing element 122, the color-switching unit 123, an illuminance equalization unit 124, and a light condensing element 125.

For example, the white light source 121 may be a halogen lamp, a xenon lamp, a metal halide lamp, a super high-pressure mercury lamp, a LED lamp, or a LD having one single color of the three primary colors. A high-intensity white LED, which has become commercially available in recent years, may be used as the white light source 121.

The light condensing elements 122 and 125 may include an illumination optical system so as to provide high illumination efficiency, or may be used to condense light by using an ellipsoidal reflector, or a paraboloidal reflector.

The color-switching unit 123 divides the white light from the white light source 121 into monochromatic light beams having the three primary colors in a time-division manner. For example, the color-switching unit 123 may be formed by fast switching color filters, or by liquid crystal elements, for example, manufactured by Color Link Inc., which are able to switch colors. In order to achieve high illumination efficiency, a co-called integrator optical system may be provided.

For example, the color-switching unit 123 turns on separate monochromatic light sources, such as red (R), green (G), blue (B) LEDs sequentially to perform the time-divisional illumination. In addition, if combining light source switching with filter switching, it is possible to realize high quality color illumination having a wide color space of the three primary colors.

The illuminance equalization unit 124, which may be a rod integrator, optionally combined with a fly-eye lens array, superposes light on the light valve 11 to homogenize illuminance on the light valve 11.

For example, the light valve 11 may be a transmission type liquid crystal panel, a reflection type liquid crystal panel, or a digital micro-mirror device (DMD, a registered trademark). When using a liquid crystal panel, because it is required that incident light on the panel be linearly polarized, it is necessary to insert a polarizer to align the polarization direction. In order to achieve high light utilization efficiency, a non-illustrated polarization conversion element may be provided in the illumination optical system 122, 125.

Although it is illustrated that the image display device 10 of the present embodiment includes a transmission type liquid crystal light valve 11, when a reflection type liquid crystal light valve is used, a polarization beam splitter (PBS) may be used to separate an illumination light path and an image formation light path to display an image. In this case, because optical switching is performed by polarization control using liquid crystal, it is also necessary to align the polarization direction.

When using the digital micro-mirror device, it is not necessary to align the polarization direction, but in order to allow the pixel shift unit 14 to switch light paths by utilizing polarization properties, it is necessary to insert a polarizer in the light path of light incident on the pixel shift unit 14.

For example, the polarizer may be a linear polarizer. In order to maintain light utilization efficiency, a polarization conversion element may be provided in the illumination light path, which includes a PBS combined with a wave plate.

In the image display device 10 having the above configuration, the controller 13 sends a color selection control signal to the color-switching unit 123 to control the color-switching unit 123 at high speed so as to extract monochromatic light, for example, having one color of the three primary colors R, G, B from the polarized illumination light.

In addition, the controller 13 sends a display control signal to the light valve 11 in accordance with the color of the monochromatic illumination light to control the light valve 11 so as to obtain a color image. Here, illumination is carried out in the time-division manner in which illumination with green light, which has the highest relative visibility, is performed at least twice in each frame. As it is well known, a visibility curve represents the relative energies of different wavelengths required to produce a given brightness; and the visibility curve has a maximum at a wavelength range approximately corresponding to green light (about 550 nm). That is to say, green color can be observed clearly compared to red and blue colors even the red, green, blue light has the same intensity.

The controller 13 drives the pixel shift unit 14 to operate in conjunction with the light valve 11 and the time-division illumination unit 12 to perform pixel shift at a high speed. In addition, the controller 13 drives the light valve 11 to display an image in conjunction with positions of the shifted pixels. The image displayed in each frame is in conjunction with positions of the shifted pixels.

The image of the light valve 11 may be updated so that the pixels are shifted by half of a pixel pitch, or one and half of a pixel pitch, two and half of a pixel pitch, or other odd integral multiples of ½ pixel pitch when the total number of illumination divisions is two to allow images to be displayed at positioned shifted by the odd integral multiple of ½ pixel pitch. When the total number of illumination divisions is three, seemingly compensation being made at two positions between two pixels, the pixels may be shifted by ⅓ pitch, ⅔ pitch, −⅓ pitch, or −⅔ pitch. In addition, the pixels may be shifted by ½ pitch in both the horizontal direction and the vertical direction to carry out four-division illumination corresponding to a four-time pixel density.

Within one frame, because the light valve 11 is driven to display images corresponding to pixel shift positions, due to the after image effect on human eyesight, it appears as if the number of pixels has been increased.

The pixel shift unit 14 may be a light path conversion element or a liquid crystal element for shifting a light path. In FIG. 1, it is illustrated that the pixel shift unit 14 is inserted in the light path to shift the light path, but the pixel shift function may also be realized by directly driving the panel 16 to perform micro-motion. For example, the pixel shift unit 14 may be driven electromagnetically, piezoelectrically, or mechanically.

In addition, if the back focus of the projection system can be made sufficiently long, the light path can be changed by using a so-called Galvano mirror, that is, a mirror is provided in the light path to displace the light path by a small angle each time.

Further, for example, a pair of parallel plates can be arranged in the fight path, and the light path can be shifted by tilting the parallel plates.

As described above, in the image display device 10, during illumination with the green light which has the highest relative visibility, the pixels are shifted within one frame, and the number of pixels is apparently increased, thereby images of a high resolution are obtained. It is found that the obtained effect of apparent resolution improvement by pixel shift is significant.

It should be noted that pixel shift may also be performed during illumination with the red and blue light when it is needed.

One image frame may be displayed with four or more sub frames, and in this way, a large number of the light valves supporting the time-divisional illumination existing in the related art can be utilized, and this allows image display of high resolution at low cost.

When the image size can be enlarged, text and jaggy lines become highly visible in textures of an image. Upon that, in the present embodiment, pixels corresponding to green light, which has the highest relative visibility, are shifted at high speed, and seemingly a high-resolution image is formed. Hence, even if a projection lens is used to enlarge and project the image, it is possible to obtain images of high quality compared to the related art. In addition, because the same light valve is used to realize high-resolution image display, the image display device 10 of the present embodiment is compact and inexpensive.

Figure 2A:
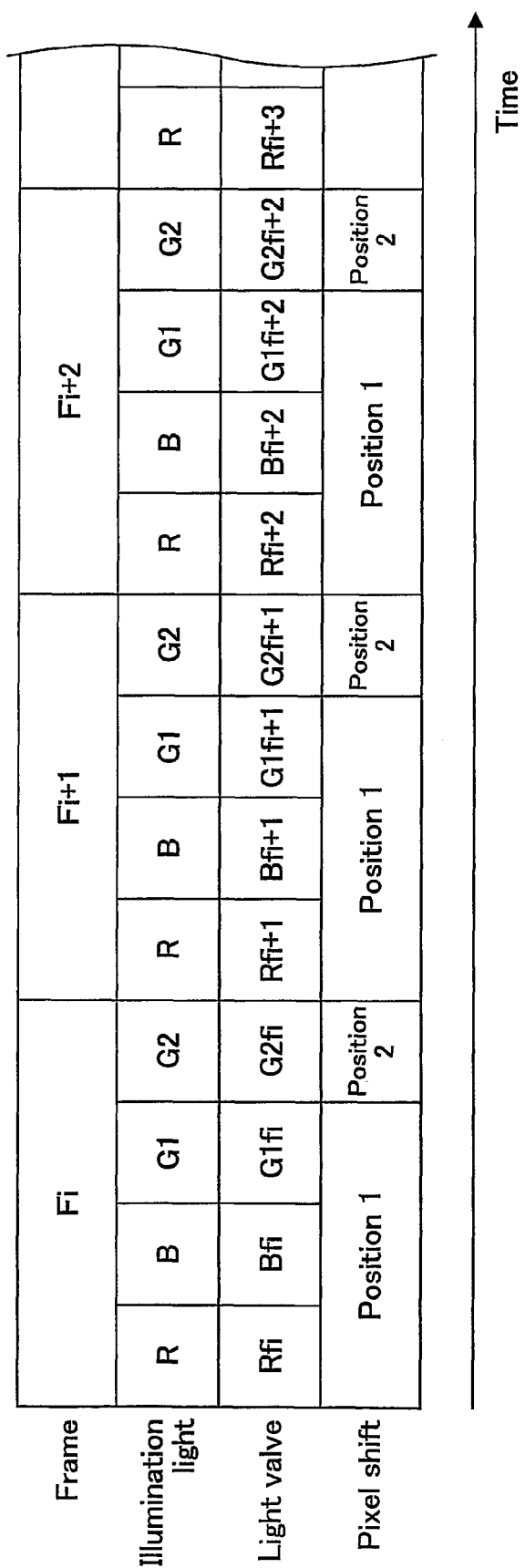
FIG. 2A through FIG. 2C are timing sequences illustrating timings of pixel shift and illumination light obtained by the color-switching unit 123.
Figure 2B:
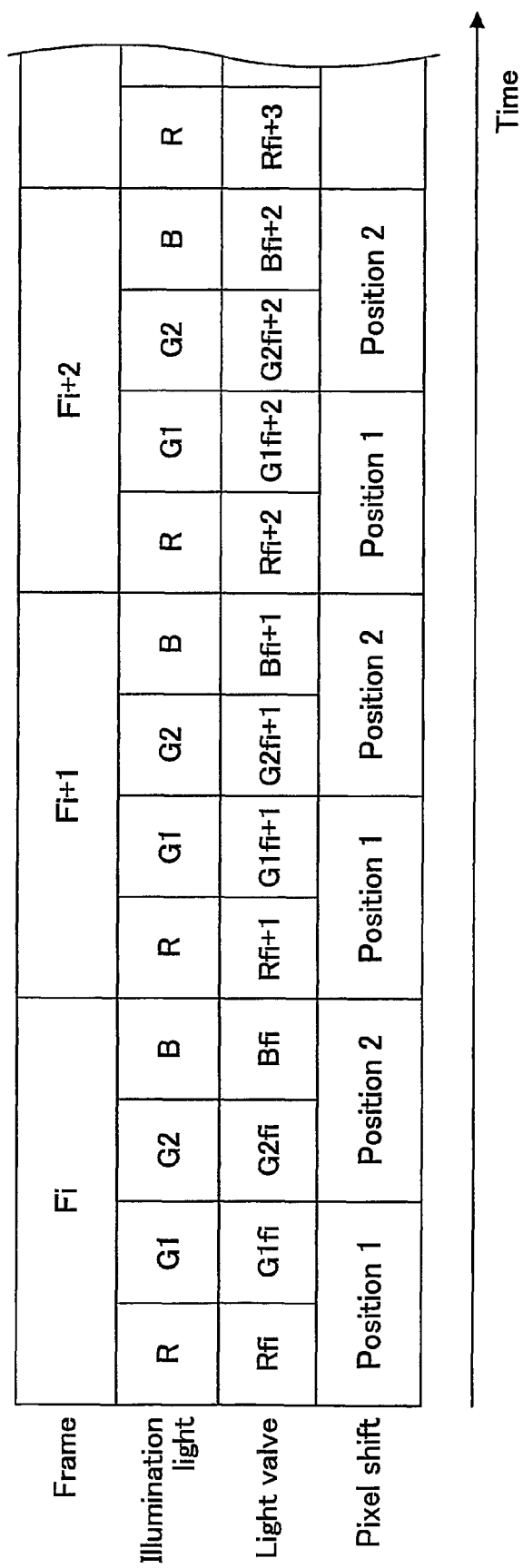
Figure 2C:
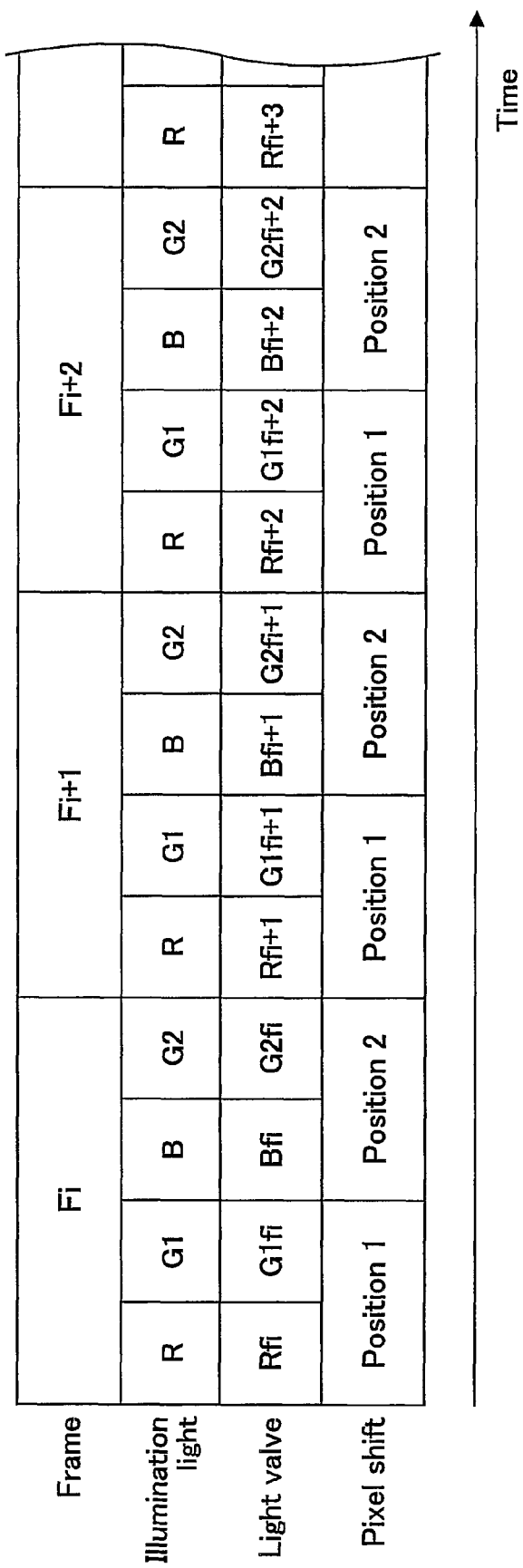

FIG. 2A through FIG. 2C are timing sequences illustrating timings of pixel shift and illumination light obtained by the color-switching unit 123.

FIG. 2A illustrates a sequence of time-divisional illumination in order of R, B, G1, G2 to form a color image in an image frame Fi.

The pixel-shift unit performs pixel shift at least between G1 and G2 in one frame, specifically, the pixel shift is performed during illumination with the green light, which has the highest relative visibility. In other words, in the sequence, the timings of pixel shift are at regular intervals within one frame.

FIG. 2B illustrates a sequence of time-divisional illumination in order of R, G1, G2, B.

FIG. 2C illustrates a sequence of time-divisional illumination in order of R, G1, B, G2.

Figure 3A:
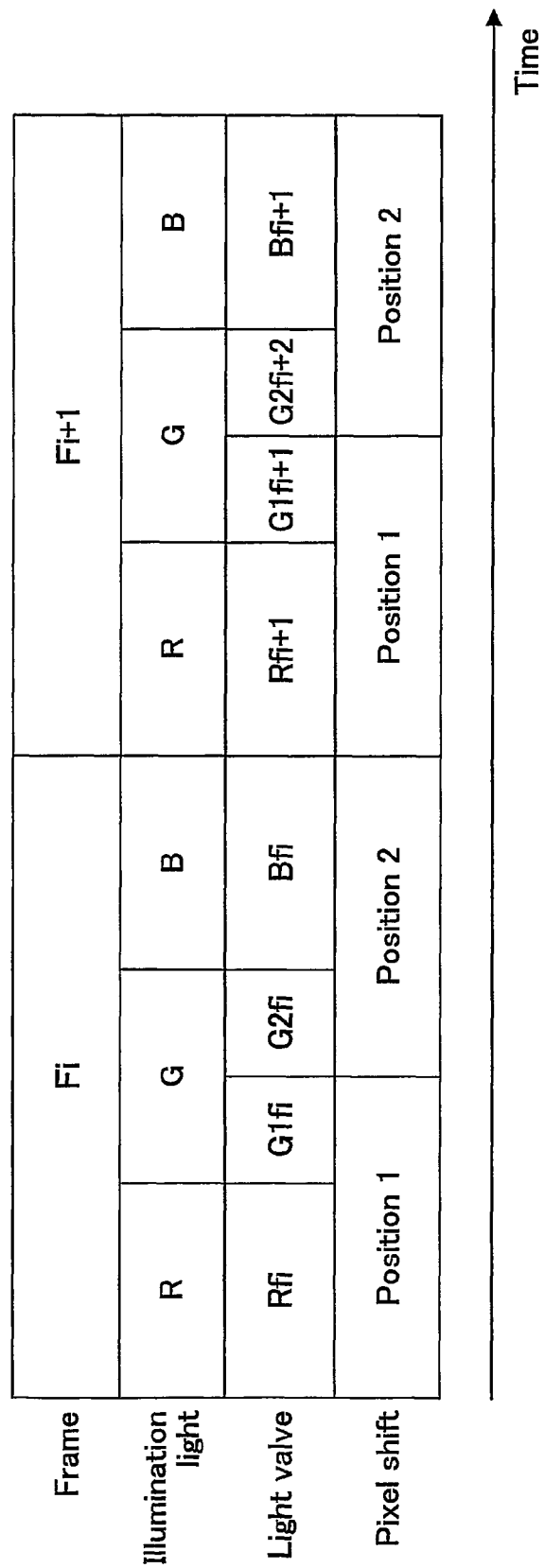
FIG. 3A and FIG. 3B are timing sequences illustrating other examples of timings of pixel shift and illumination light.
Figure 3B:
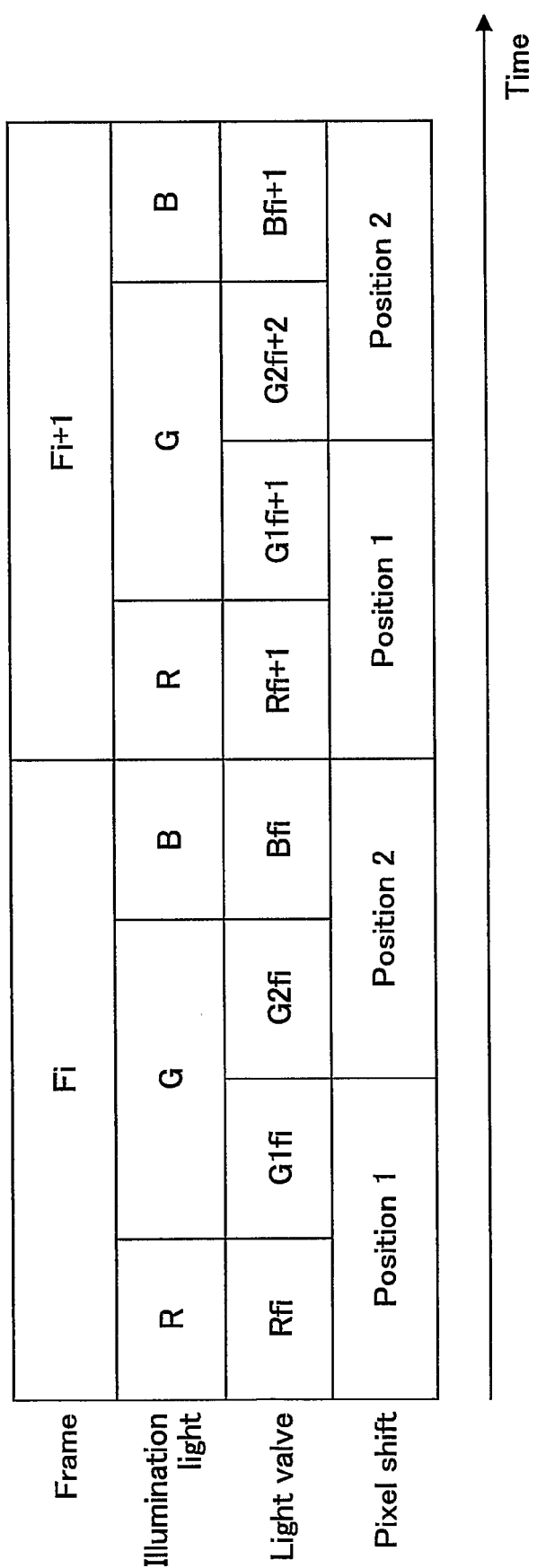

FIG. 3A and FIG. 3B are timing sequences illustrating other examples of timings of pixel shift and illumination light.

Specifically, FIG. 3A and FIG. 3B illustrate sequences of time-divisional illumination in order of R, G, B to form a color image in an image frame Fi. The pixel shift is performed during illumination with the green light. A green image corresponding to a pixel shift position 1 is displayed in a time period G1$fi$, and a green image corresponding to a pixel shift position 2 is displayed in a time period G2$fi$, that is, the timing of pixel shift is within illumination with the green light.

In the sequence shown in FIG. 3A, illumination timings of R, G, B light beams are set to be nearly the same, so it is possible to perform illumination corresponding to pixel shift essentially without changing the illumination system of the related art.

In the sequence shown in FIG. 3B, image display time at a green pixel shift position 1 and a green pixel shift position 2 is longer than that in FIG. 3A, and thereby, update of the light valve pixel may be carried out in a relatively long time period compared to that in FIG. 3A. Hence, constraint on speed of the light valve is relaxed.

Figure 4:
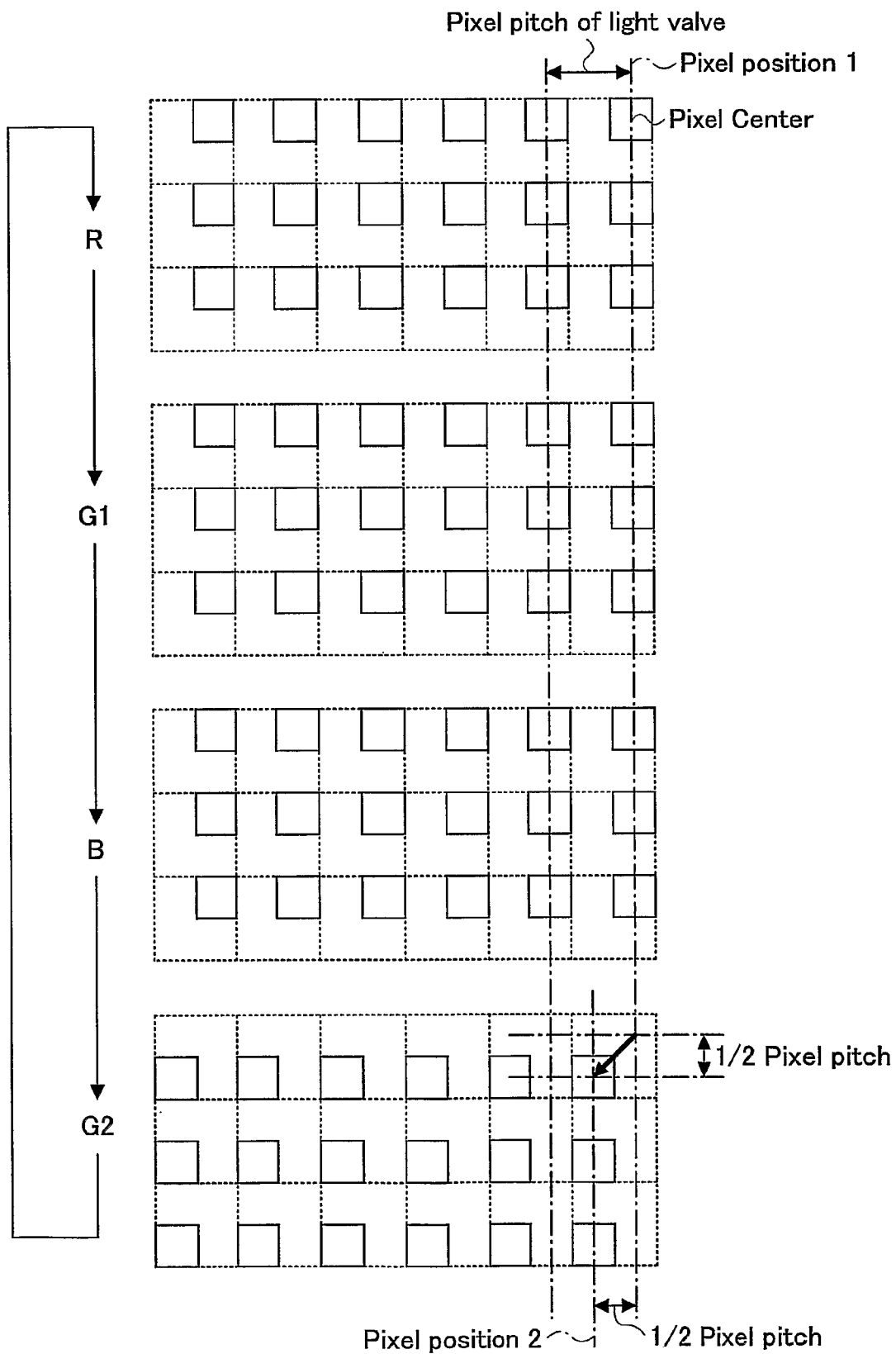
FIG. 4 is a diagram schematically illustrating operations of pixels displayed in one frame.

FIG. 4 is a diagram schematically illustrating operations of pixels displayed in one frame.

The sequence shown in FIG. 4 is in order of R, G1, B, G2, and the pixel shift is performed during R and G1 illumination, corresponding to a pixel position 1 and a pixel position 2.

Squares in FIG. 4 do not represent shapes of pixels. It is sufficient that sizes of the dashed-line squares be less than the pixel pitch. For example, during R illumination, the center of a displaying pixel is on a dot-dashed line through the pixel position 1. After R illumination, the pixel position remains unchanged, G1 illumination is performed, and then, before G2 illumination, the light valve is controlled so that an image corresponding to the pixel position 2 is displayed.

Figure 5:
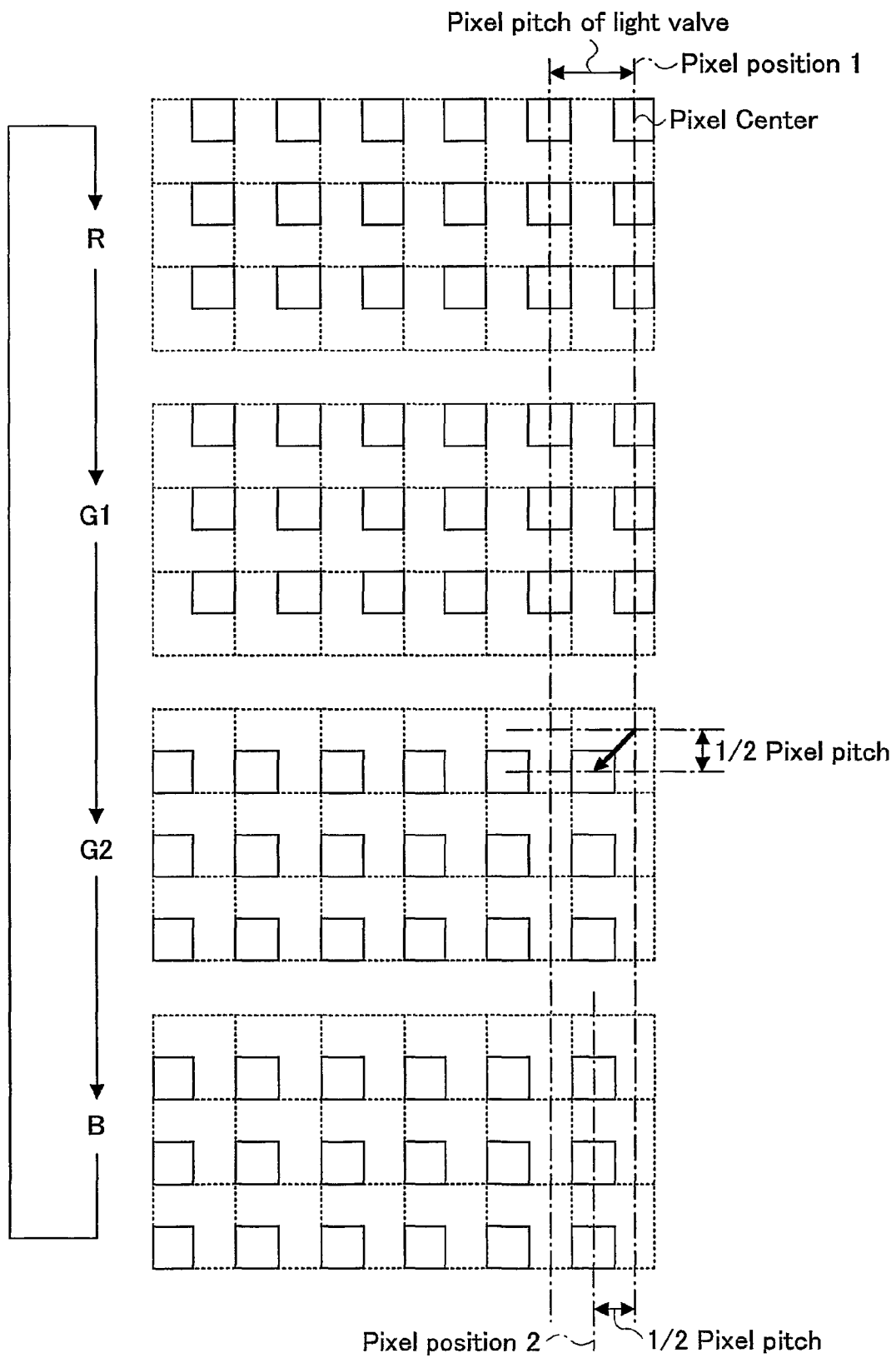
FIG. 5 is a diagram for schematically illustrating another example of operations of pixels displayed in one frame.

FIG. 5 is a diagram for schematically illustrating another example of operations of pixels displayed in one frame.

The sequence shown in FIG. 5 is in order of R, G1, G2, B, and the pixel shift is performed from a pixel position 1 to a pixel position 2 during G1 illumination. During R illumination, the center of a displaying pixel is on a dot-dashed line through the pixel position 1. After the R illumination, an image at the pixel position 1 by G1 illumination is formed with the light valve, and then, while shifting to the pixel position 2, the light valve is controlled so that G2 illumination is carried out.

In examples shown in FIG. 4 and FIG. 5, it is described that a pixel is shifted in one direction to the pixel position 1 and the pixel position 2 (this is a so-called "one direction pixel shift technique"), but the shift direction is not limited to these examples: it can be along an inclined direction, in the vertical direction, or in the horizontal direction. Further, as long as the response speed is tolerable, the shift can be performed by three steps, or totally four times in both the vertical direction and the horizontal direction.

Further, the sequence of R, G, B illumination is not limited to the above examples, and the pixel shift positions and number of times of pixel shift during R, B illumination is not limited to the above examples, either. In the present embodiment, illumination with the monochromatic light having the highest relative visibility is performed in a time-division manner, and pixel shift is performed in each other the time divisions, thereby obtaining high resolution of images formed by the monochromatic light.

Figure 6:
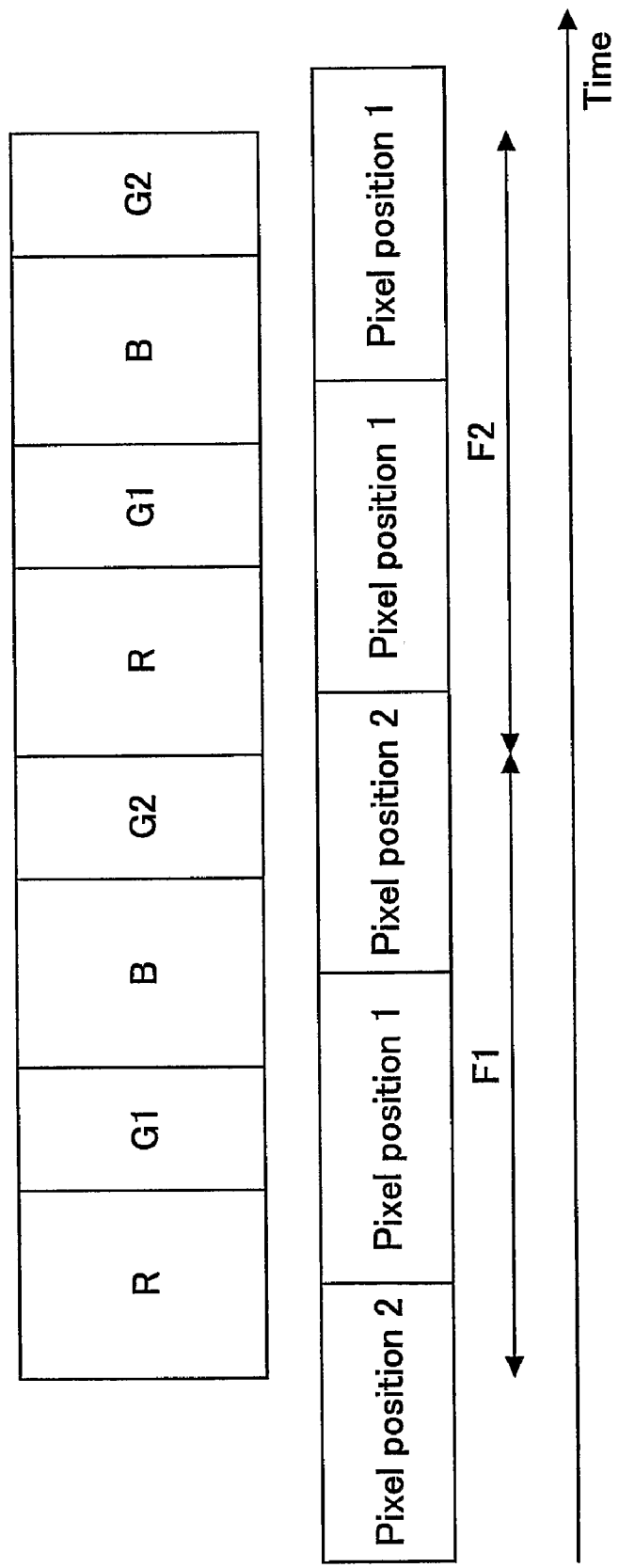
FIG. 6 is a diagram illustrating a relation between colors of displayed images and pixel shift positions.

FIG. 6 is a diagram illustrating a relation between colors of displayed images and pixel shift positions.

As illustrated in FIG. 6, illumination with red (R), the first division of green (G1), blue (B), the second division of green (G2) light (below, abbreviated to be "R illumination, G1 illumination, B illumination, G2 illumination, where necessary) forms one frame F1 or F2.

Within one frame F1 or F2, each of R illumination and B illumination is performed once, and G illumination is performed twice (G1, G2). The G1 illumination and G2 illumination form images corresponding to pixel shift. Between the G1 illumination and the G2 illumination, the R illumination or B illumination is performed, and during the R illumination and B illumination, pixel shift is performed. During the R illumination and B illumination, images may be formed without correspondence to the pixel shift.

With such a configuration, because pixel shift is performed during the R illumination and B illumination, a green image by the green light, which has the highest relative visibility, can be displayed precisely in correspondence to switching of a G1 image and a G2 image, thereby obtaining high resolution.

Figure 7A:
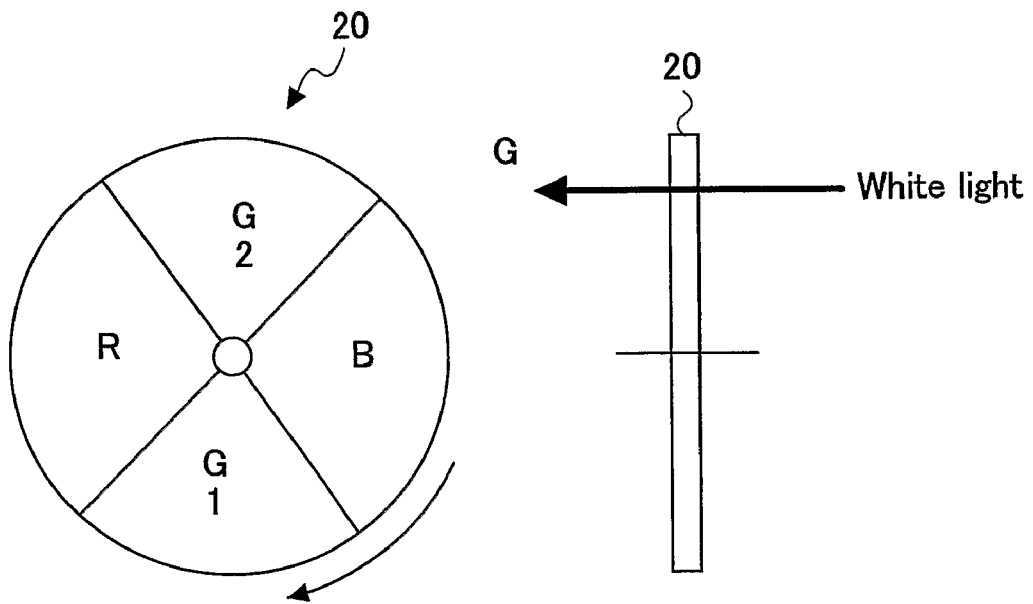
FIG. 7A and FIG. 7B are diagrams illustrating examples of the color-switching unit 123 in FIG. 1.
Figure 7B:
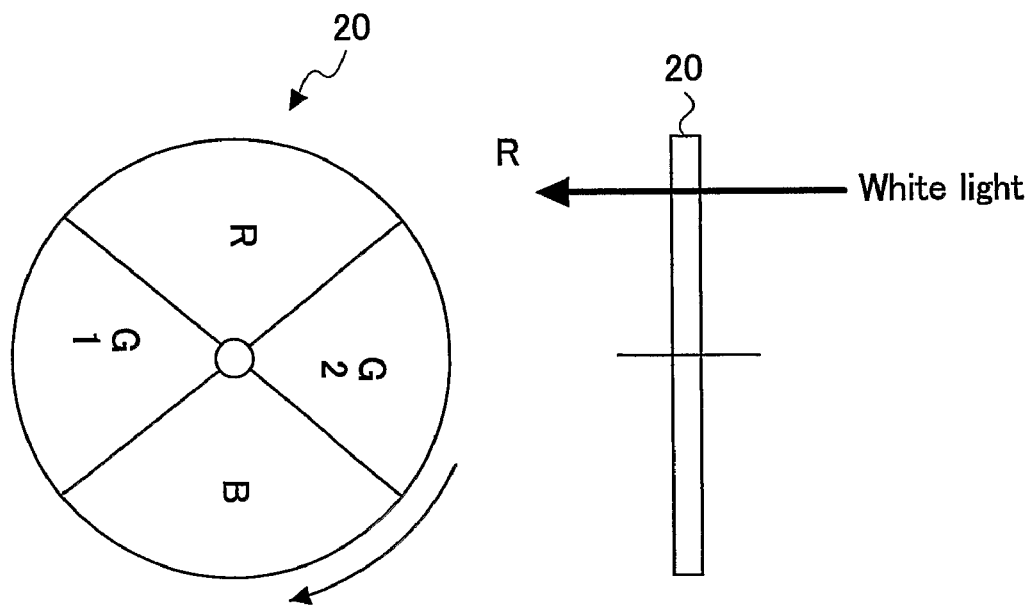

FIG. 7A and FIG. 7B are diagrams illustrating examples of the color-switching unit 123 in FIG. 1.

As shown in FIG. 7A and FIG. 7B, the color-switching unit is formed by a transmission type color filter unit 20, which includes a red filter (R), a first green filter (G1), a second green filter (G2), and a blue filter (B) arranged in order of R, G2, B, G1. The transmission type color filter unit 20 is rotated, to selectively allow the incident white light to pass through, thereby generating monochromatic light beams R, G2, B, and G1. Of course, a reflection type color filter may be used to generate monochromatic light by reflection.

Figure 8A:
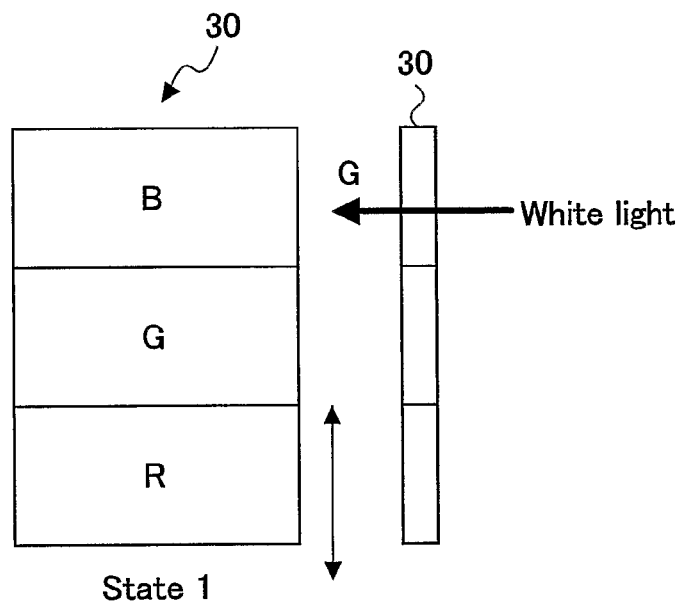
FIG. 8A and FIG. 8B are diagrams illustrating other examples of the color-switching unit 123.
Figure 8B:
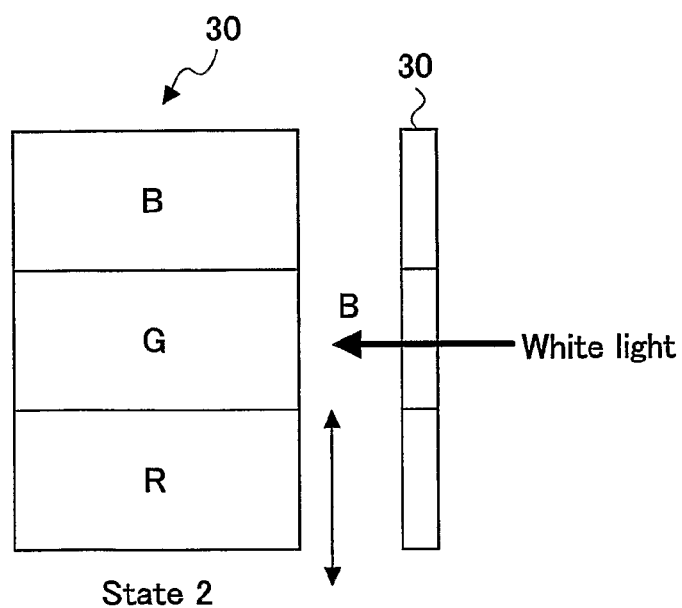

FIG. 8A and FIG. 8B are diagrams illustrating other examples of the color-switching unit 123.

As shown in FIG. 8A and FIG. 8B, the color-switching unit is formed by a transmission type color filter unit 30, which includes a red filter (R), a green filter (G), and a blue filter (B) arranged side by side with the green filter at the center. The transmission type color filter unit 30 is moved back and forth along one axis repeatedly at high speed. A not-illustrated actuator driven by electromagnetic induction is provided to carry out the back and forth motion. The actuator is controlled by the controller 13, which is for driving and controlling the light valve and the pixel shift element. Alternatively, a driving period may be detected to feedback control the actuator to drive the actuator to operate in precise connection with images displayed on panels.

As described above, the rotational color filter unit 20 shown in FIG. 7 needs two green filters in order to display green images, but in the color filter unit 30 as shown in FIG. 8A and FIG. 8B, which is able to be moved back and forth, only one green filter is sufficient for performing the sequence as described above. For example, the filter B on the top of the color filter unit 30 is selected first, then, the filter G at the center is selected, and then, the filter R on the bottom is selected, and again the filter G at the center is selected. In this way, by moving the color filter unit 30 back and forth, filters R, G, B are switched repeatedly in order of R, G2, B, G1. Because the filter G is selected twice in one cycle of the back-and-forth motion, three filters are sufficient in the color filter unit 30; in comparison, the rotational color filter unit 20 shown in FIG. 7 needs four filters. Therefore, the arrangement of filters R, G, B in the color filter unit 30 is more efficient, and is suitable for executing a color sequence of R, G, B, G. Further, it is advantageous that the filters R, G, B are rectangular, because such a shape matches with rectangular illumination light on to the panel.

Figure 9:
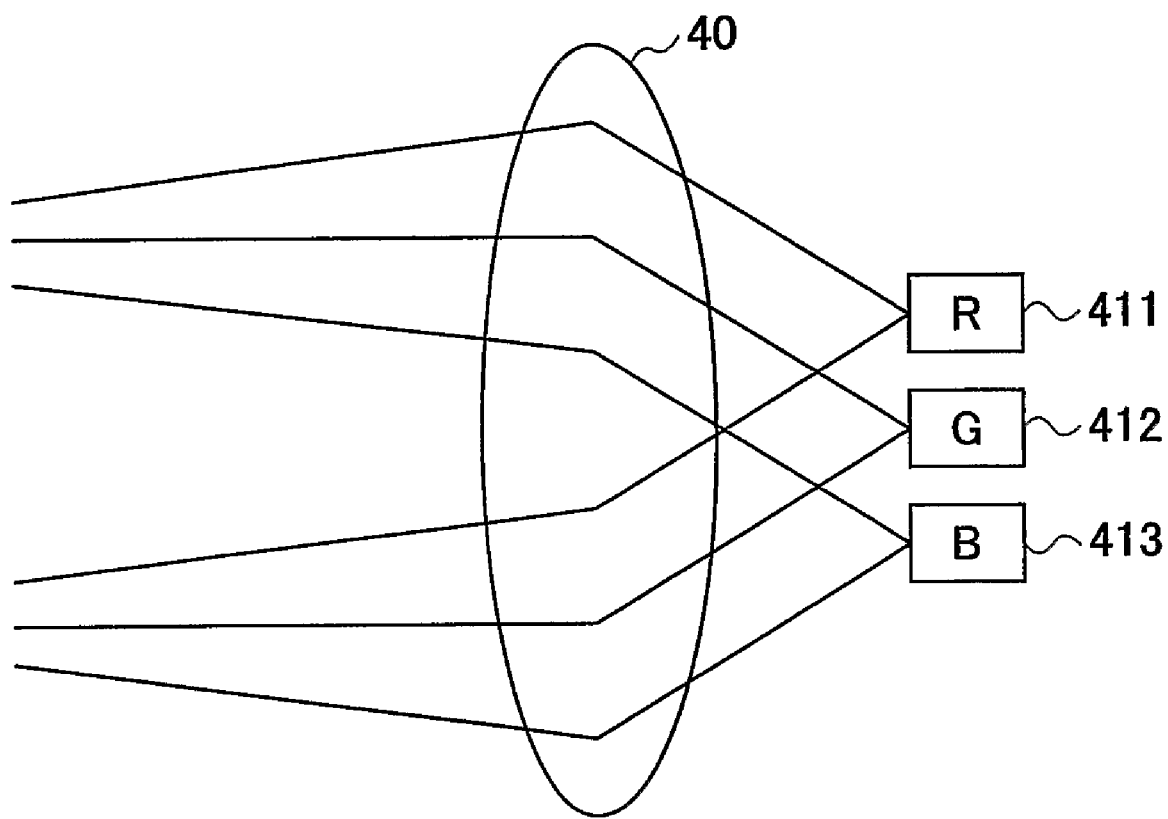
FIG. 9 is a schematic view for illustrating a configuration of solid light sources for emitting monochromatic light of the three primary colors.

FIG. 9 is a schematic view for illustrating a configuration of solid light sources for emitting monochromatic light of the three primary colors.

As shown in FIG. 9, three solid light sources 411, 412, and 413 are arranged in a row, emitting monochromatic light beams of the three primary colors, respectively. For example, the monochromatic light beams of the three primary colors are R, G, and B light, respectively. A light condensing element 40 is provided to condense the R, G, B light.

Figure 10:
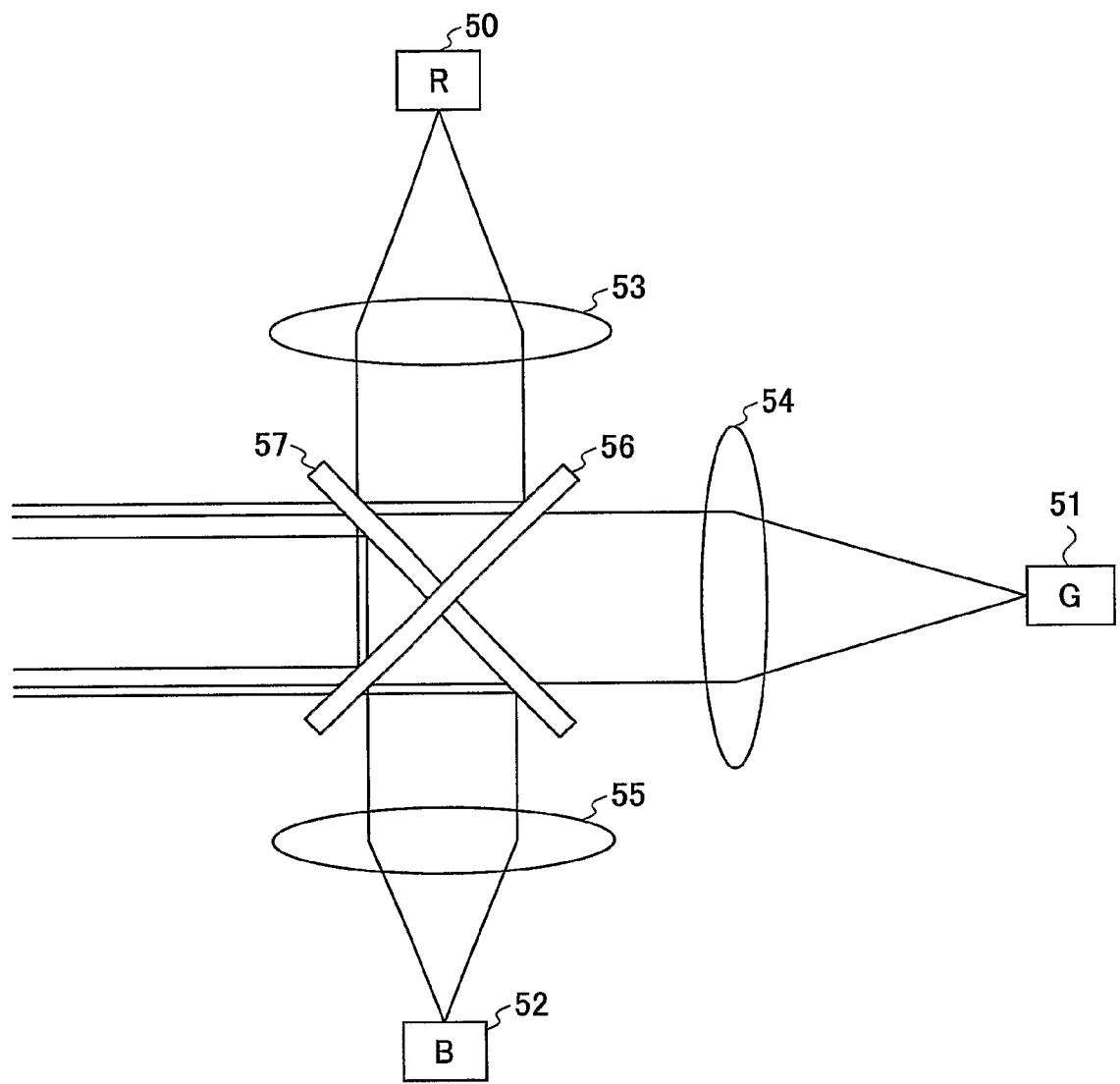
FIG. 10 is a view illustrating a configuration for condensing the monochromatic light of the three primary colors emitted from the solid light sources.

FIG. 10 is a view illustrating a configuration for condensing the monochromatic light of the three primary colors emitted from the solid light sources.

As illustrated in FIG. 10, in order to increase light condensing efficiency, three light condensing elements 53, 54, 55 are provided which are suitable for condensing the monochromatic light beams R, G, B emitted from the solid light sources 50, 51, 52, respectively, and a combining unit formed by color filters are also provided. Specifically, a cross-filter is used to form the combining unit, which includes a filter 56 allowing reflected red light and light of color complementary to red to pass through and a filter 57 allowing reflected blue light and light of color complementary to blue to pass through. Light emission units, which are not illustrated in FIG. 10, are controlled in conjunction with display control of the light valve and driving control of the pixel shift. Alternatively, in order for switching light emission of the light sources, a shutter or the like able to shield and pass light from the light sources can be used to turn on or turn off light emission.

With the above configuration, it is possible to provide an image display device which does not have a mechanical driving mechanism and thus can be of high reliability compared to the related art, in which a color filter is used to select different monochromatic light from white light for illumination.

Second Embodiment

In the present embodiment, it is assumed that a reflection type liquid crystal panel is used as a light valve in an image display device.

Figure 11:
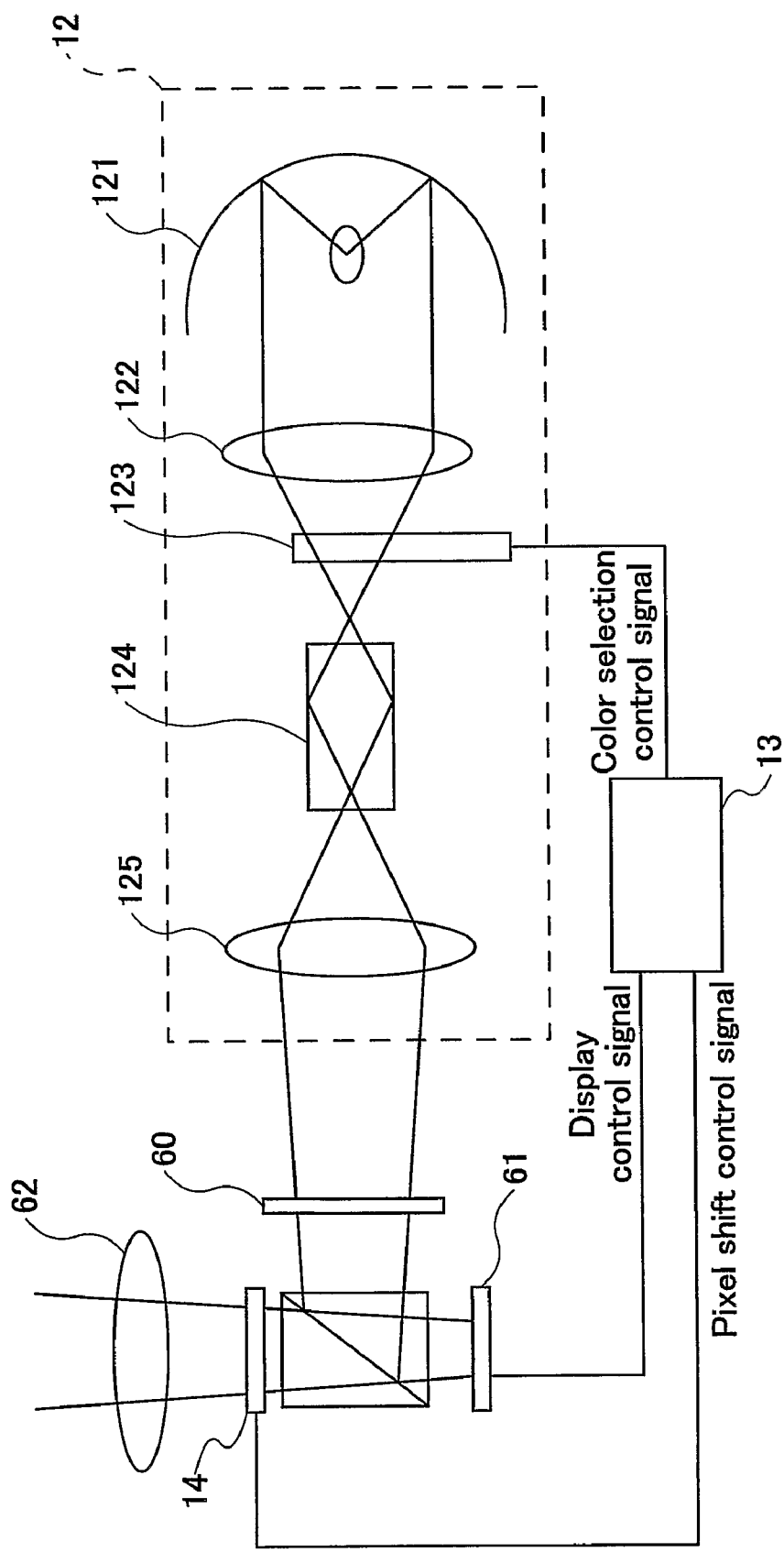
FIG. 11 is a schematic view exemplifying a configuration of an image display device according to a second embodiment of the present invention.

FIG. 11 is a schematic view exemplifying a configuration of an image display device according to a second embodiment of the present invention.

In FIG. 11, the same reference numbers are assigned to the same elements as those described in FIG. 1, and overlapping descriptions are omitted appropriately.

The image display device in FIG. 11 differs from the image display device in FIG. 1 in that a polarizer 60, a reflection type liquid crystal panel 61, and a magnification projection lens 62 are provided additionally.

Operation of the image display device in FIG. 11 is similar to the image display device in FIG. 1, and detailed descriptions are omitted.

Generally, a light path separation element (not illustrated) such as a polarization beam splitter (PBS) may be arranged in front of the panel 61 to separate an image formation light path for displaying an image from an illumination light path. Of course, if the light path separation is attainable, light may be incident at an inclined angle for illumination, and thus the polarization beam splitter can be omitted.

For example, the polarization beam splitter may be a prism including multiple dielectric layers, a plate including a golden wire lattice, or an element capable of polarization separation with organic multiple layers.

Figure 12:
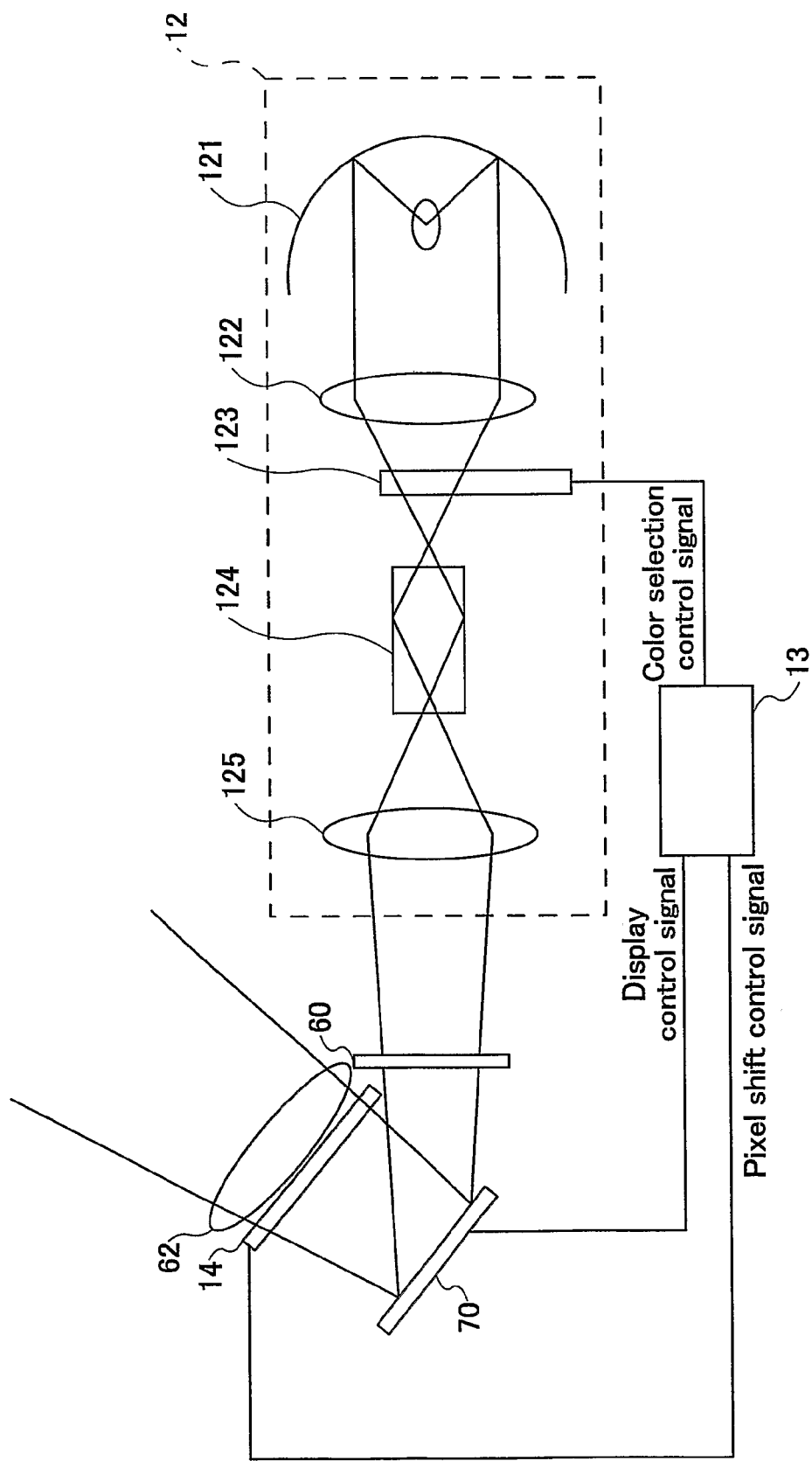
FIG. 12 is a schematic view exemplifying another configuration of an image display device according to the second embodiment of the present invention.

FIG. 12 is a schematic view illustrating another example of the image display device according to the second embodiment of the present invention.

In FIG. 12, the same reference numbers are assigned to the same elements as those described previously, and overlapping descriptions are omitted appropriately.

The image display device in FIG. 12 differs from the image display devices in FIG. 1 and FIG. 11 in that a micro-mirror device 70 is used.

In the image display device using the micro-mirror device 70, the display operation of a pixel is represented by presence or absence of reflected light from the micro-mirror device 70; hence, display can be performed without polarized light.

In the image display device in FIG. 12, if the pixel shift unit shifts a light path by utilizing liquid crystal optical polarization characteristics, it is necessary to use a polarizer or the like to align the polarization direction.

In FIG. 12, it is illustrated that a polarizer 60 is installed, but if the panel is driven in the display plane, it is not necessary to align the polarization direction.

Third Embodiment

Figure 13:
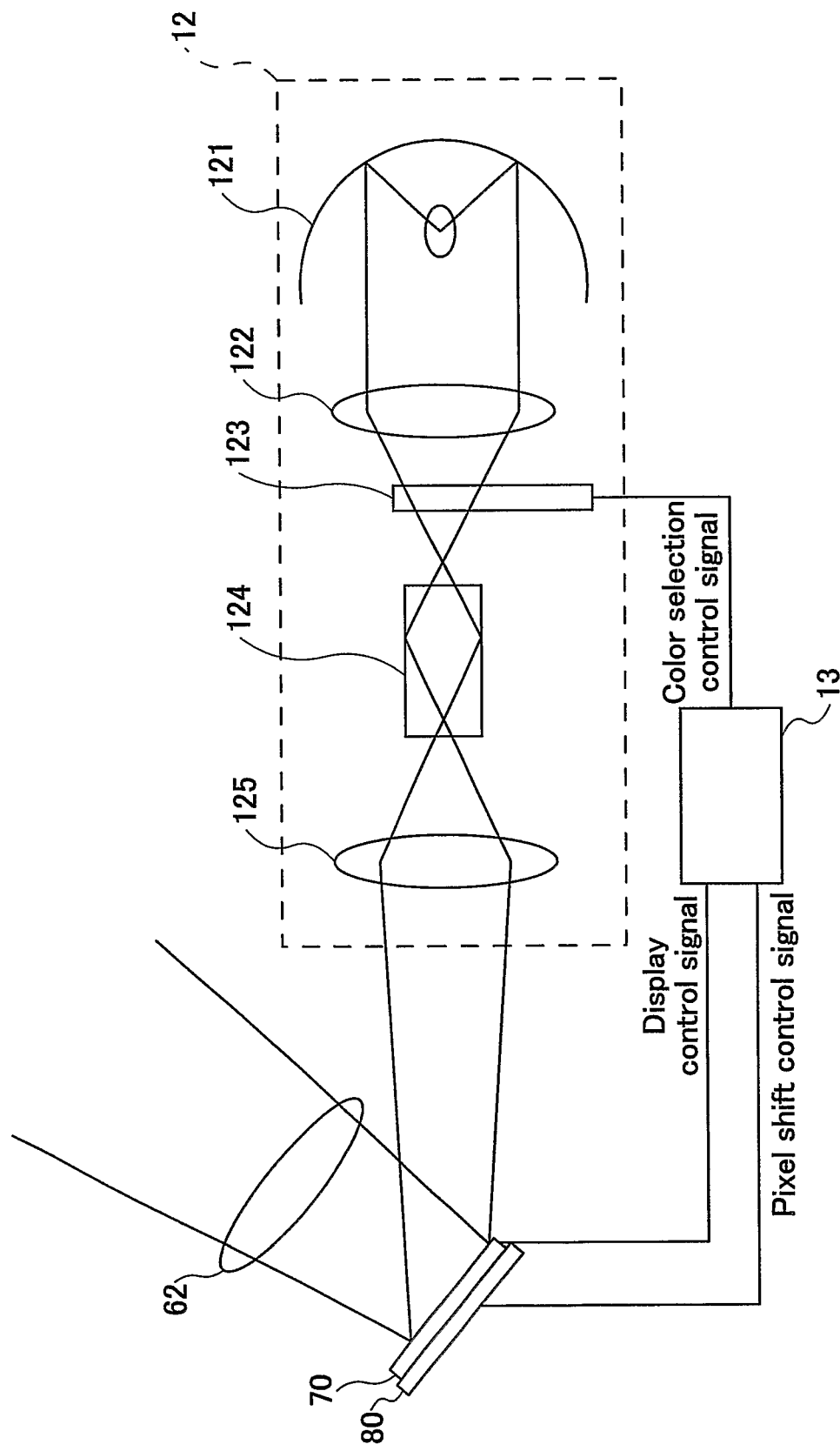
FIG. 13 is a schematic view exemplifying a configuration of an image display device according to a third embodiment of the present invention.

FIG. 13 is a schematic view exemplifying a configuration of an image display device according to a third embodiment of the present invention.

In FIG. 13, the same reference numbers are assigned to the same elements as those described in FIG. 12, and overlapping descriptions are omitted appropriately.

The image display device in FIG. 13 differs from the image display device in FIG. 12 in that an actuator 80 capable of fine motion is used as the pixel shift unit to fast shift the light valve in a plane of the display elements.

This configuration is not limited to the case in which a DMD is used, but is applicable to other kinds of light valves formed from a transmission type or reflection type liquid crystal panel.

Fourth Embodiment

In the present embodiment, illumination with light having the highest relative visibility is divided into at least two divisions in the time period for displaying one image frame, and illumination time periods of the different monochromatic light beams are specified respectively within the time period for displaying one image frame so that the illumination light is white in one frame.

Figure 14:
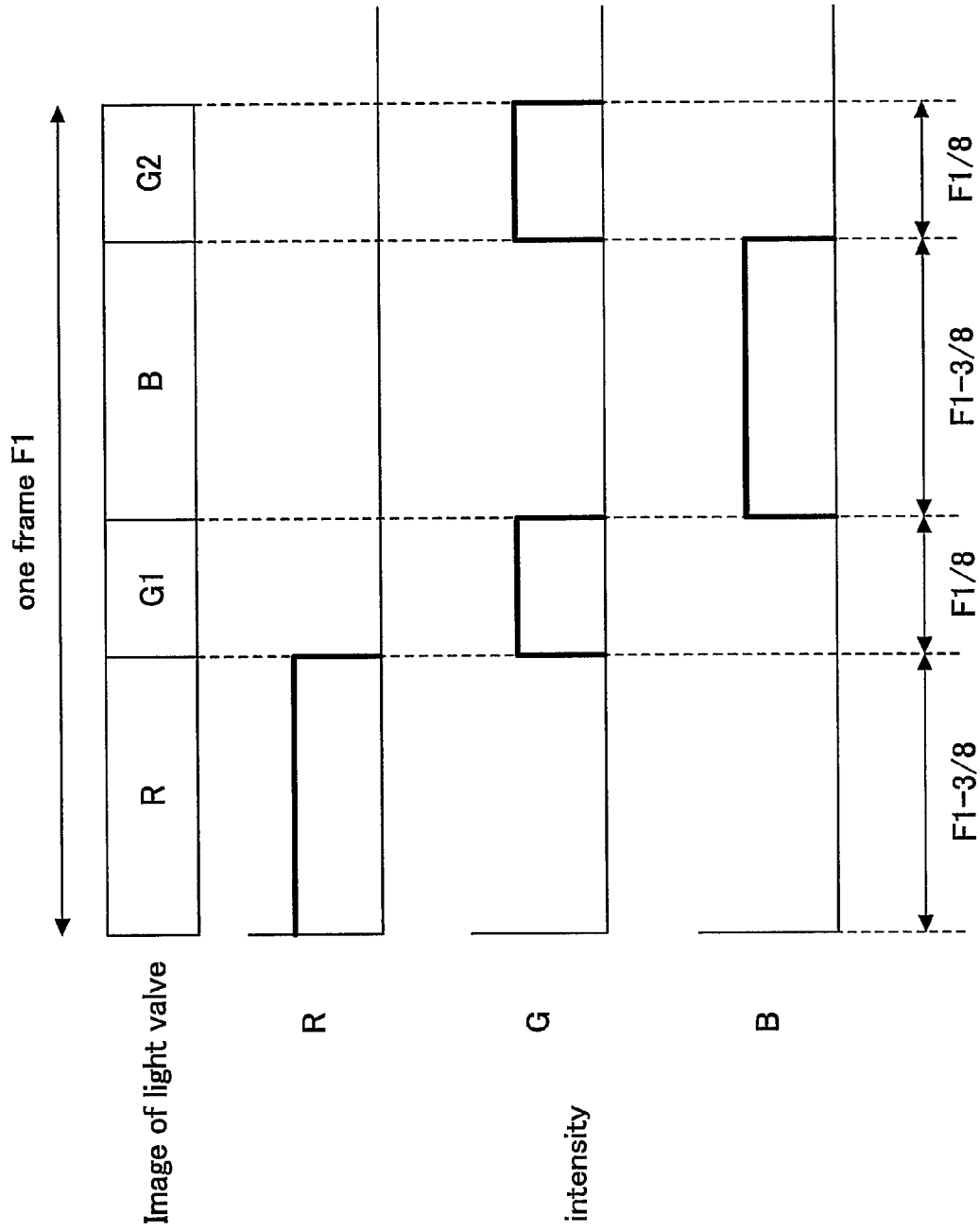
FIG. 14 is a time chart illustrating display of one frame F1.

FIG. 14 is a time chart illustrating display of one frame F1.

As shown in FIG. 14, one frame F1 includes R, G1, B, G2 illumination, green light illumination is performed twice, and image updating at a pixel shift position 1 and a pixel shift position 2 is performed within this period. Specifically, to realize such kind of illumination, a color filter or the like is switched at high speed, and the switching timing can be adjusted.

In the related art, a rotational color filter, for example, a disk-like color filter referred to as "color wheel", is inserted in the illumination light path, and with the color wheel being rotated, time-divisional illumination is realized. Such a rotational color filter is usually constructed by three R, G, and B color filters having equal size. If illumination with the green light, which has the highest relative visibility, is divided into two parts, for example, referred to G1 illumination and G2 illumination, respectively, then R, G1, G2, B illumination forms one frame, and if each of illumination time periods of R, G1, G2, B illumination is the same, since illumination with the green light is performed twice for the same time period as that of R and B illumination, the total flux of the green light is high, and good color balance cannot be attained.

In the present embodiment, degradation of color balance is prevented even when illumination with light of one color is performed plural times. Generally, it is known that a frame frequency of about 60 Hz (60 frames per second, or 1 sec/60=16.6 ms per frame) or higher does not causes flicker. In the present embodiment, a time period of 16.6 ms, which is the time period for displaying one frame, is equally divided into three divisions for R, G, B illumination.

Figure 15:
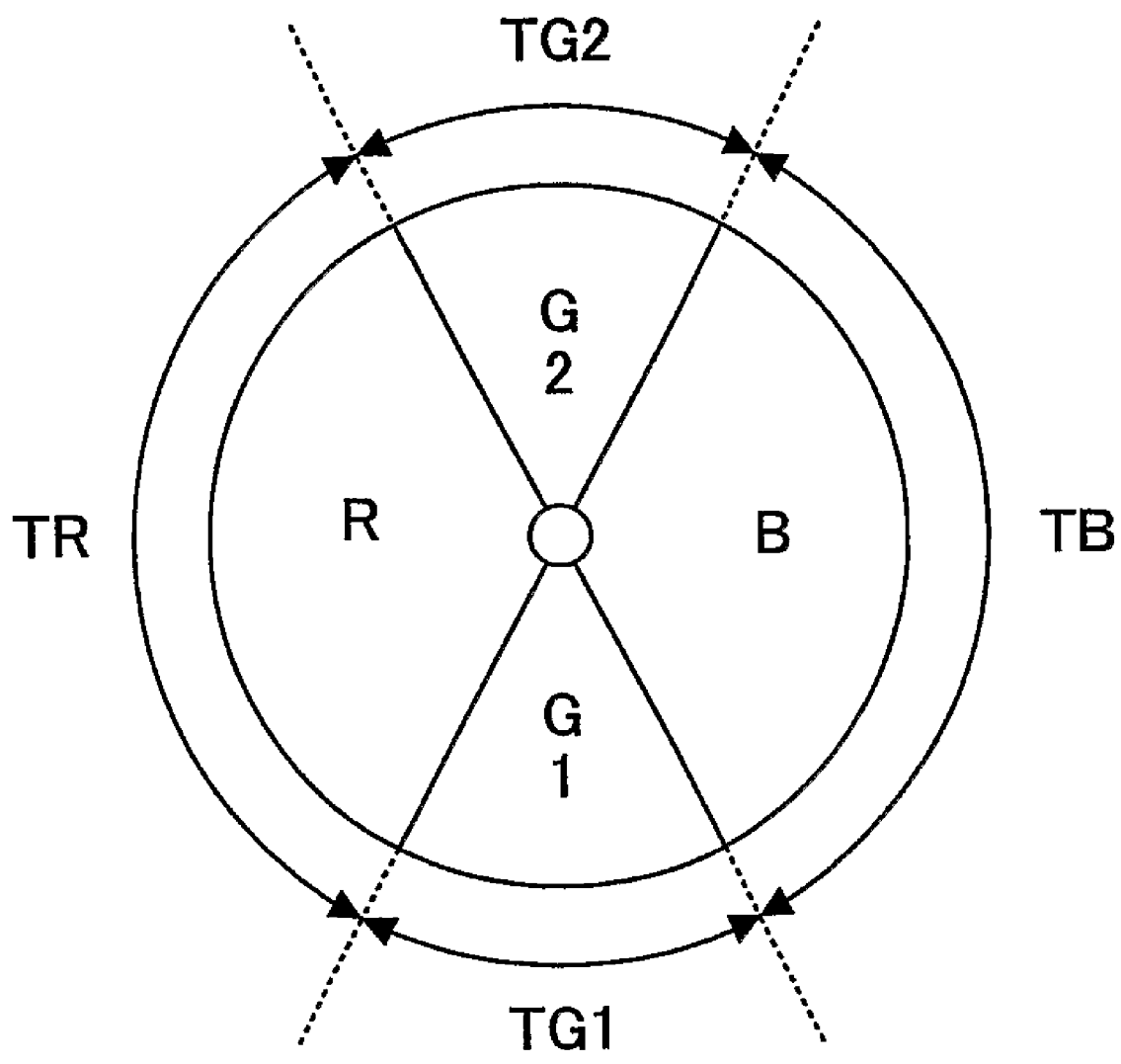
FIG. 15 is a diagram illustrating divisions of illumination time in the present embodiment.

FIG. 15 is a diagram illustrating divisions of illumination time in the present embodiment.

As illustrated in FIG. 15, if the time periods of R, G1, G2, B illuminations are represented to be TR, TG1, TG2, and TB, in the present embodiment, TR=TB=TG1+TG2, approximately. When setting the illumination times TR, TG1, TG2, and TB, fluctuations of the filters and of transmittance of the light valves are taken in to consideration. With this requirement being satisfied, the total illumination light turns to exhibit white color in one frame, and good color balance, which more or less depends on the wavelength dependence of the light valves, can be attained in the displayed image.

In the present embodiment, a white light source and plural wavelength selective filters are used as a filter switching device to divide monochromatic light into plural time-divisions to perform sequential illumination. The wavelength selective filter may the so-called color wheel or the like.

Figure 16A:
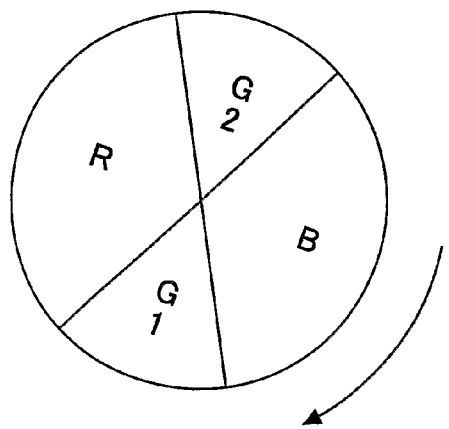
FIG. 16A and FIG. 16B are diagrams illustrating examples of the wavelength selective filter.
Figure 16A:
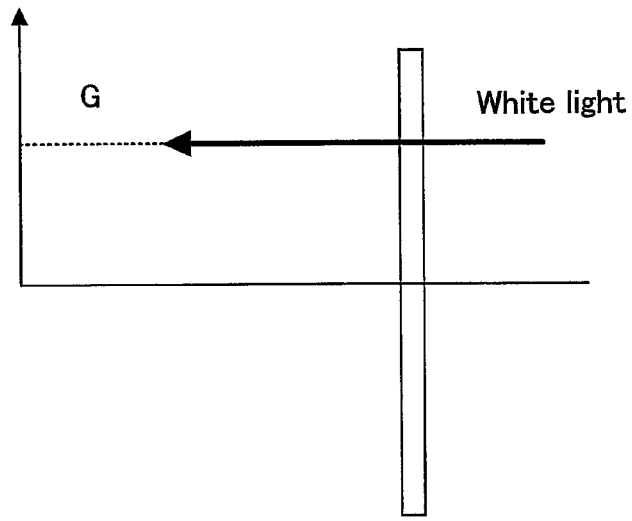
Figure 16B:
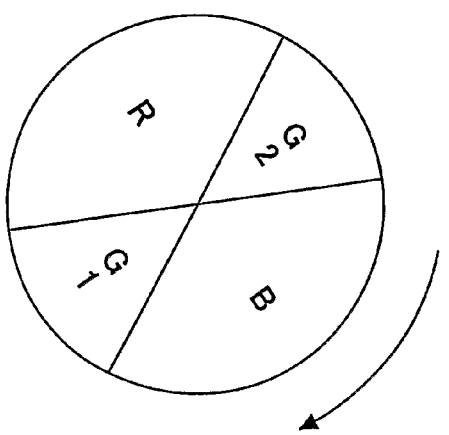
Figure 16B:
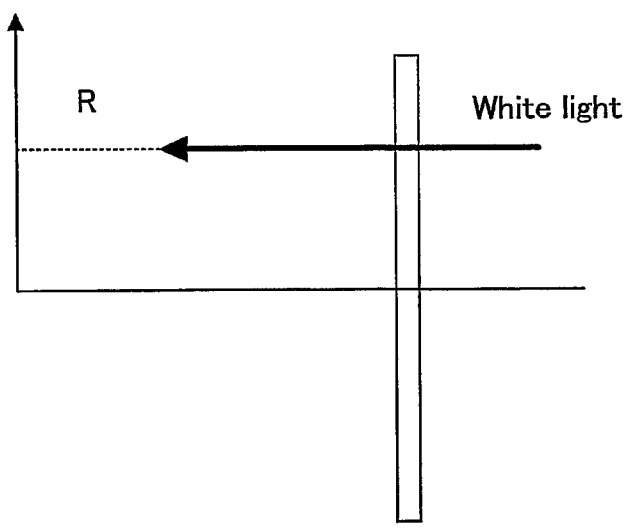

FIG. 16A and FIG. 16B are diagrams illustrating examples of the wavelength selective filter.

In FIG. 16A and FIG. 16B, "R", "G1" or "G2", and "B" represent respective regions in the wavelength selective filter which only allow red light, green light, and blue light.

If the wavelength selective filter is rotated in the direction indicated by the arrow in FIG. 16A or FIG. 16B, white light propagating from the right side in FIG. 16A and FIG. 16B is wavelength-selected by the wavelength selective filter, and monochromatic light beams are extracted in order of R, G1, B, G2, R, G1. For example, the rotational speed of the wavelength selective filter is set such that one rotation cycle of the wavelength selective filter exactly corresponds to one frame of the displayed image; thus illumination with the green light is performed only twice in each frame.

Here, if the times for the incident light to pass through the G1, G2 regions are represented by TG1, TG2, respectively, and the times for passing through the R region and the B region are represented to be TR and TB, respectively, pixel shift control is performed so that the pixel shift positions are different within TG1 and TG2, and the corresponding light valve pixel is updated. Here, TG1+TG2 approximately equals each of TR and TB, that is, TR=TB=TG1+TG2, approximately. With such a configuration, the illumination light of good color balance can be generated.

Figure 17:
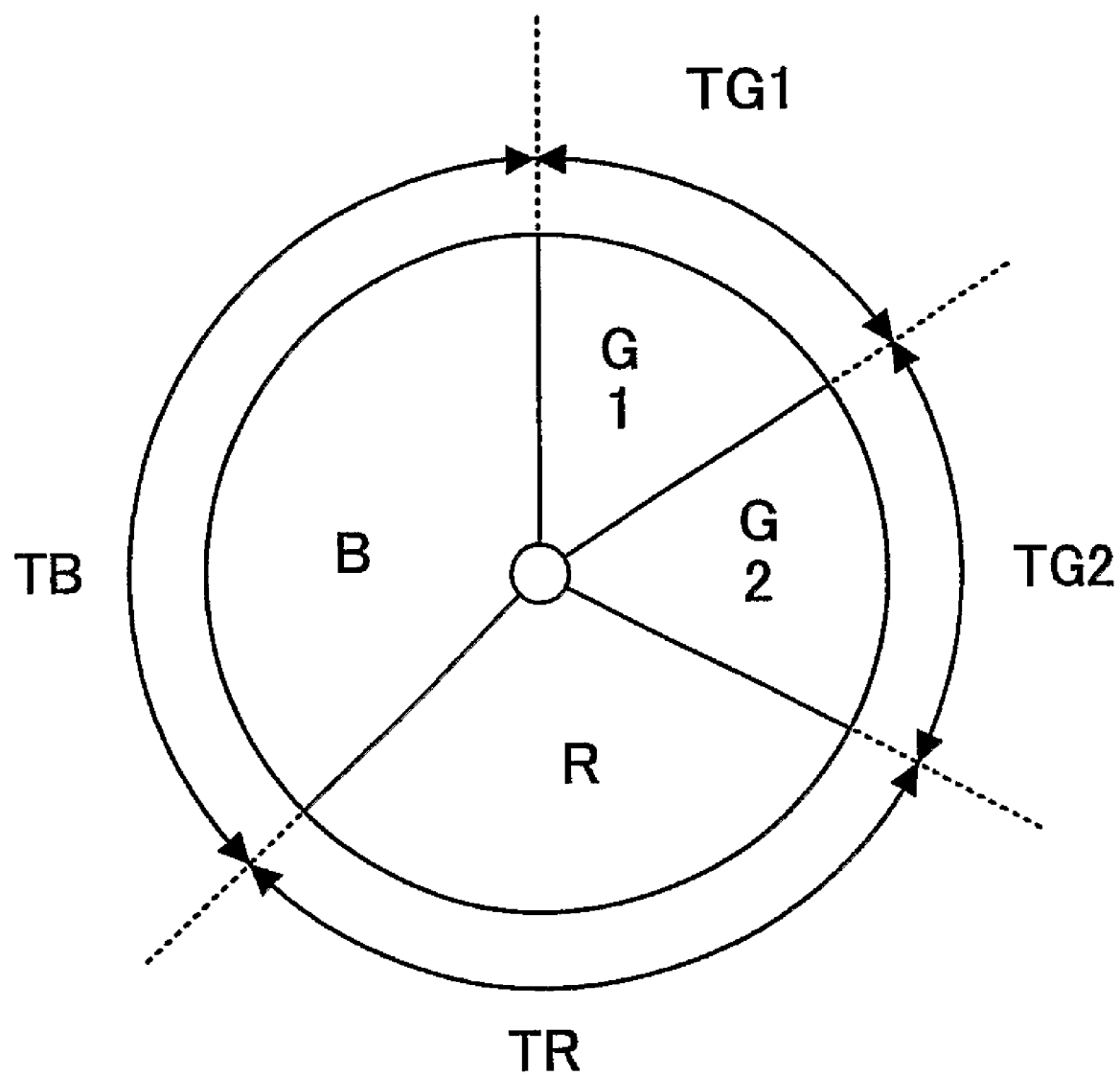
FIG. 17 is a diagram illustrating an example of a color selective filter.

FIG. 17 is a diagram illustrating an example of a color selective filter.

As shown in FIG. 17, a region G1 and a region G2 are arranged to be adjacent to each other; therefore, the color selective filter as a whole appears to have a sequence of R, G, B, which is the same as the related art. Hence, techniques of designing and fabricating a rotational filter can be utilized for the color selective filter in FIG. 17.

Here, a liquid crystal switch, for example, as disclosed in Japanese National Publication of Internal Patent Application No. 2000-510961, is used to divide monochromatic light into plural time-divisions to perform sequential illumination. The liquid crystal switch controls polarization states of incident light by applying a voltage, specifically, the liquid crystal switch controls the applied voltage to adjust the wavelength and the flux of the light transmitting the switch. For example, a spectroscopic element may be used which includes a liquid crystal color switch, manufactured by Color Link Inc., and a wave plate. This color switch operates at very high speed, specifically, it can be switched ON within 0.3 msec, and switched OFF within 10 μs. This color switch is preferable because with this color switch, it is possible to adjust the timing of switching illumination as desired.

When using the above mentioned rotational color filter, mechanical driving is required. In contrast, with the liquid crystal color switch, it is possible to provide an image display device without a mechanical driving mechanism and of high reliability.

Next, a description is made of providing shielding time for shielding the illumination light between G1 and G2.

Figure 18A:
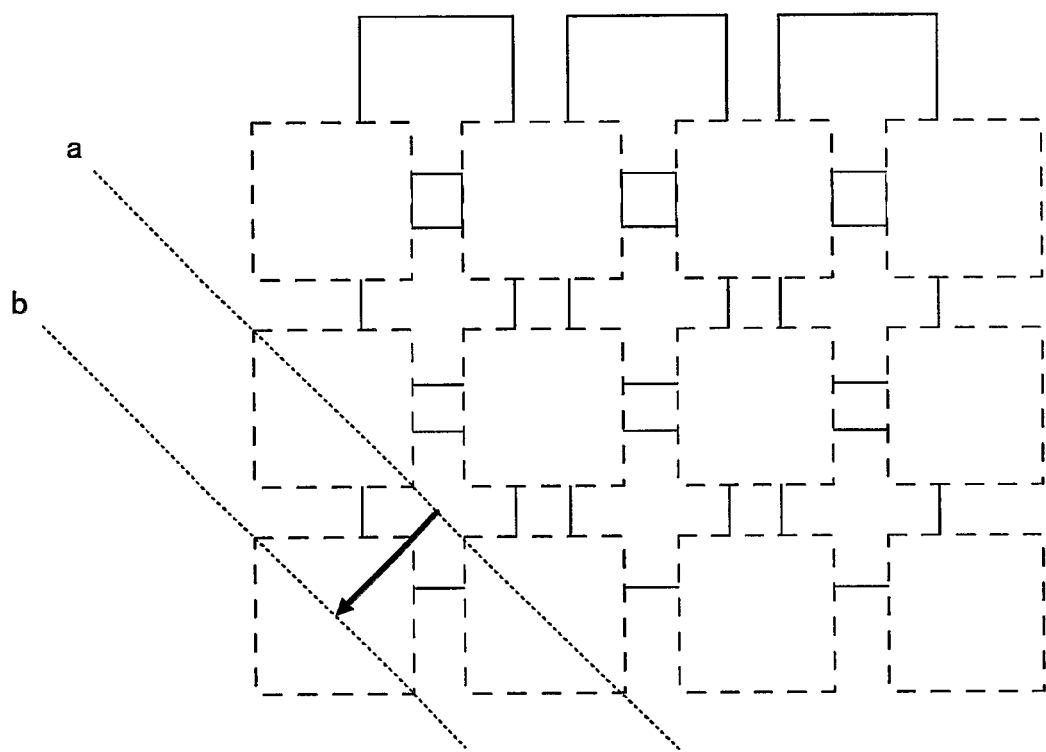
FIG. 18A and FIG. 18B are a diagram and a graph illustrating a pixel shift time when generating an image frame.
Figure 18B:
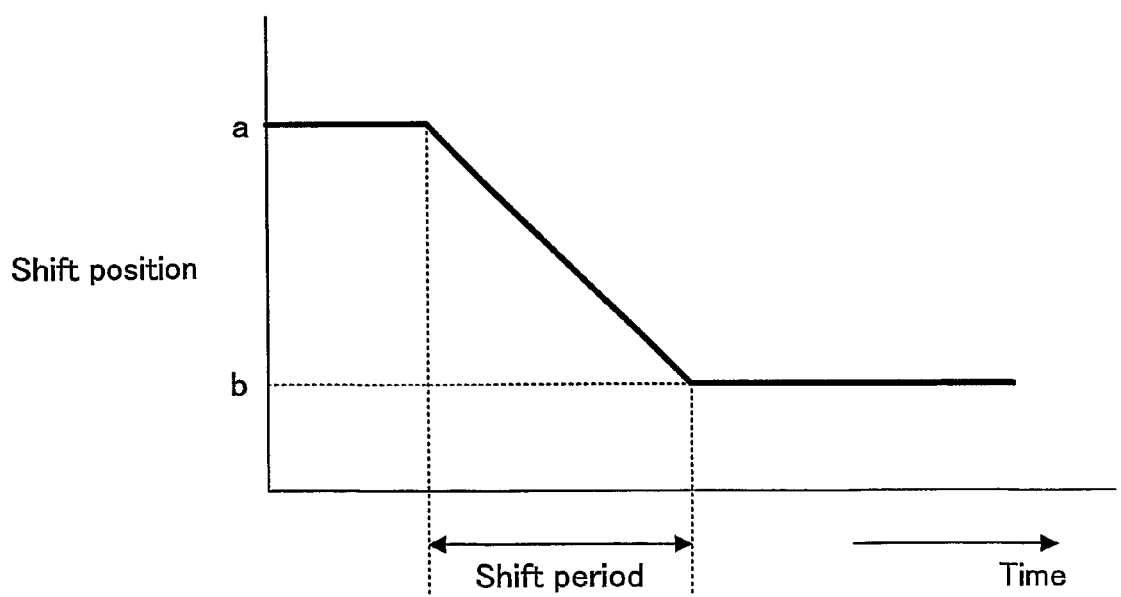

FIG. 18A and FIG. 18B are a diagram and a graph illustrating a pixel shift time when generating an image frame.

As shown in FIG. 18A and FIG. 18B, moving time from a pixel shift position "a" to a pixel shift position "b" is not always zero. If a time period of Ft is required for generating one frame, assuming this frame time is equally divided into R, G, B illumination times, the illumination time of each color becomes Ft/3. Further, the illumination time of the green light is divided into two parts G1 and G2 corresponding to two pixel shift positions, so that the illumination time of G1 or G2 becomes Ft/6. Thus, when the G1 illumination and the G2 illumination are carried out sequentially, the time used for pixel shift relatively increases with respect to the specified time period for generating one image frame.

Figure 19:
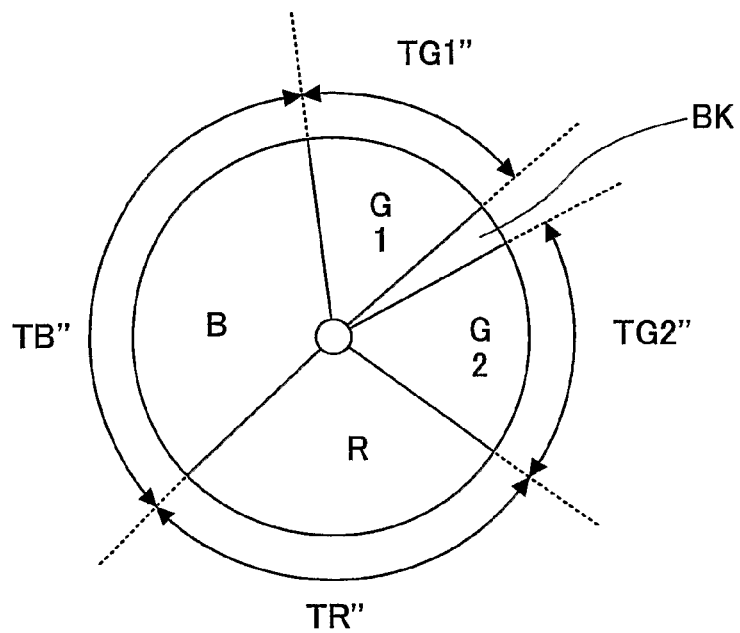
FIG. 19 is a diagram illustrating a shielding portion provided in the color filter between the portion G1 and the portion G2.

FIG. 19 is a diagram illustrating a shielding portion provided in the color filter between the portion G1 and the portion G2.

When the above-mentioned moving-time increases, displaying corresponding two pixel shift positions cannot be performed. For this reason, the advantage of high-resolution display based on pixel shift cannot be obtained. To solve this problem, it is necessary to prevent illumination during the moving time. Specifically, as illustrated in FIG. 19, a shielding portion BK is provided between G1 and G2. For example, the shielding portion BK is a reflection film or an absorption film to shield light from passing through a portion of the rotational filter. For example, the size of the shielding portion BK in the filter is specified appropriately so that the shielding time period equals a part or the whole of the time for updating the light valve pixel, or a part or the whole of the time for pixel shift. In addition, this shielding time is subtracted from the time period of generating one frame, and the residual time is divided into three equal parts to be defined as the R, G, B illumination times.

On the other hand, updating the light valve pixel also requires a definite time period, and by shielding this updating time, there is no leakage of the illumination and thus no color bleeding occurs.

Figure 20:
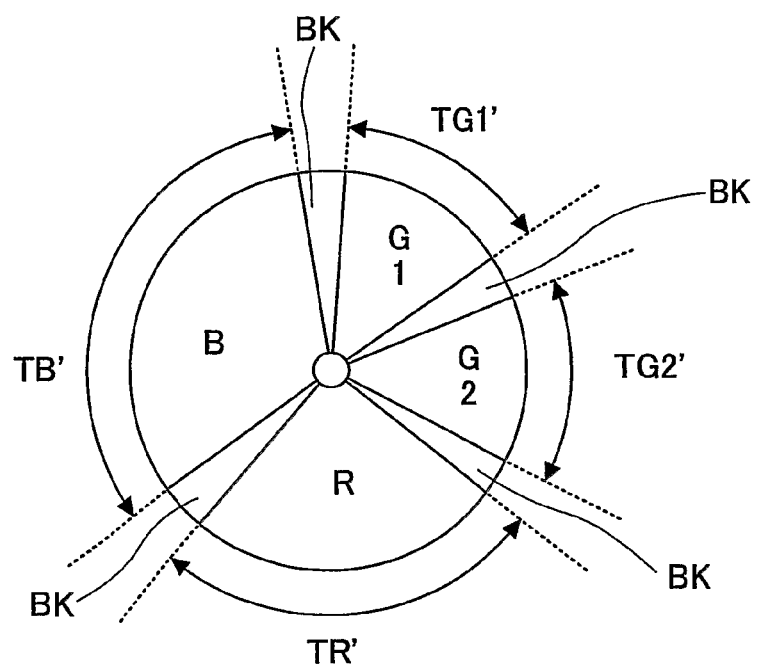
FIG. 20 is a diagram illustrating a shielding portion provided in the color filter between different colors for shielding the short durations of switching the illumination light.

FIG. 20 is a diagram illustrating a shielding portion provided in the color filter between different colors for shielding the short durations of switching the illumination light.

With the durations of switching the illumination light being shielded as illustrated in FIG. 20, for example, even while updating the light valve pixel, it is possible to prevent color bleeding from occurring.

Fifth Embodiment

When the green light which has the highest relative visibility is divided into two or more time-divisions within the time period for displaying one image frame, if the intensity of the green light having plural time divisions is adjusted appropriately, it is possible to maintain good color balance without an increase of the light intensity even when the illumination time of the green light is longer than other colors.

In the present embodiment, this configuration is described with reference to drawings.

Figure 21B:
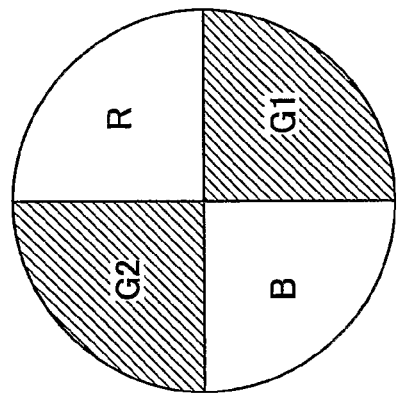
FIG. 21A and FIG. 21B are a time chart and a diagram respectively illustrating illumination time of different colors after adjusting the intensity of the green light.
Figure 21A:
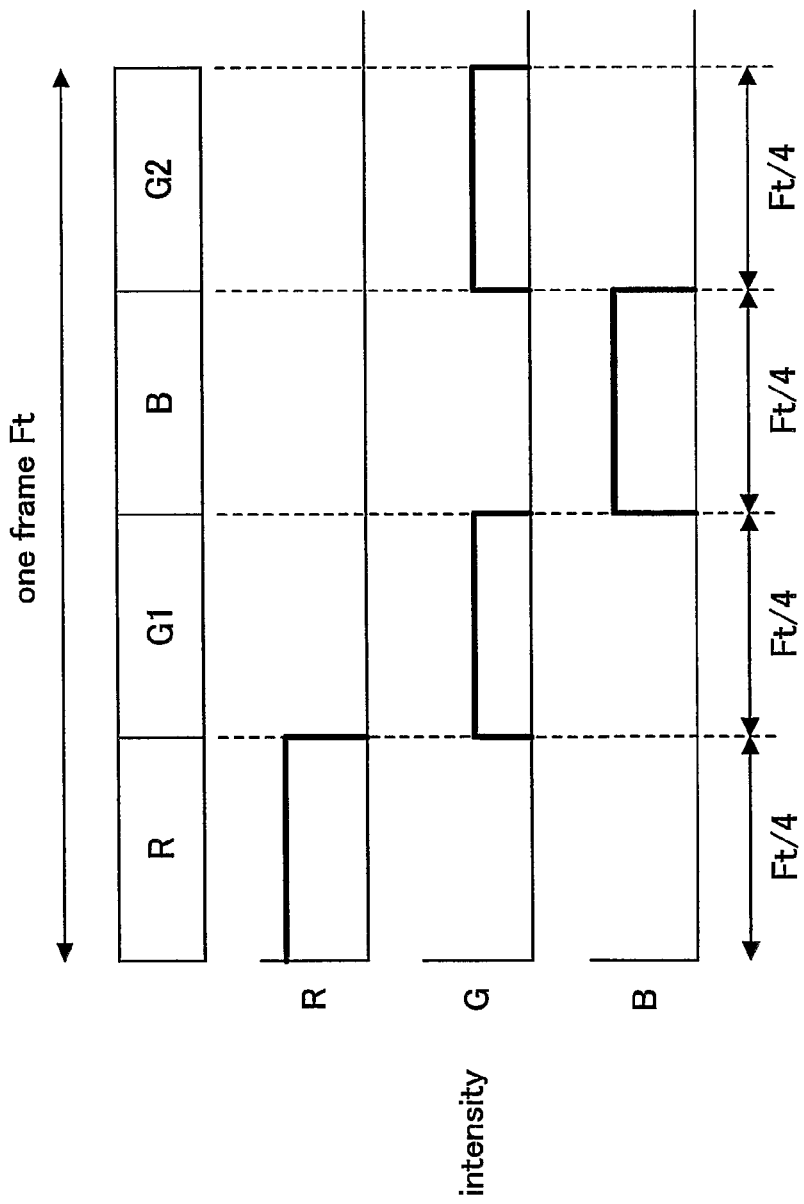

FIG. 21A and FIG. 21B are a time chart and a diagram respectively illustrating illumination time of different colors after adjusting the intensity of the green light.

As illustrated in FIG. 21A, assuming that one frame period Ft is constituted by four sub-frames including one R sub-frame, one B sub-frames, and two G sub-frames, then one sub-frame period is Ft/4. The timing of updating the light valve pixel is also determined in accordance with this sub-frame period.

Since green light corresponds to two sub-frames out of four sub-frames, the total illumination time of the green light is twice as long as the total illumination time of other colors. For this reason, the illumination light loses color balance.

To solve this problem, as shown in FIG. 21A, the intensity of the green light is set to be lower than those of other colors. In other words, if the intensity of the red (R) and blue (B) light is set to be higher than that of the green light, it is possible to obtain illumination light of good color balance.

FIG. 21B illustrates an example in which a rotational filter is used. As shown in FIG. 21B, the transmittance of the G1 and G2 portions is set to be low. Hence, it is possible to set the transmittance of a green color filter to be low, or to adjust light intensity with a filter including a green filter and a ND filter which are integrated together. When the green light is divided into three divisions in one frame, and pixel shift is in a three-step manner at intervals of ⅓ pixel pitch, there are five sub frames, and the green light may be set to be of ⅓ intensity. When the green light is divided into four divisions with two in the vertical direction and two in the horizontal direction, one frame is divided into six sub frames, and the green light may be set to be of ¼ intensity.

In the above, it is described that the green light having the highest relative visibility is divided into two or more time-divisions. If a dark period, in which illumination is not performed, is defined within divided sub frame time periods, it is equivalent to the intensity of the green light being reduced.

Figure 22B:
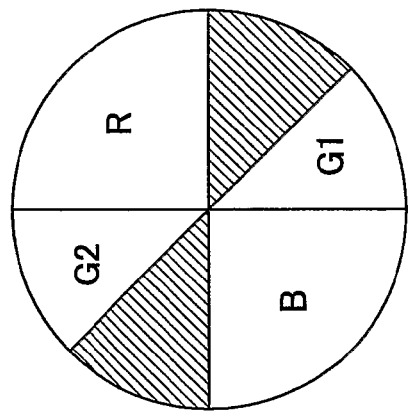
FIG. 22A and FIG. 22B are a time chart and a diagram respectively illustrating illumination time of different colors with a dark period being defined within divided sub frame time periods.
Figure 22A:
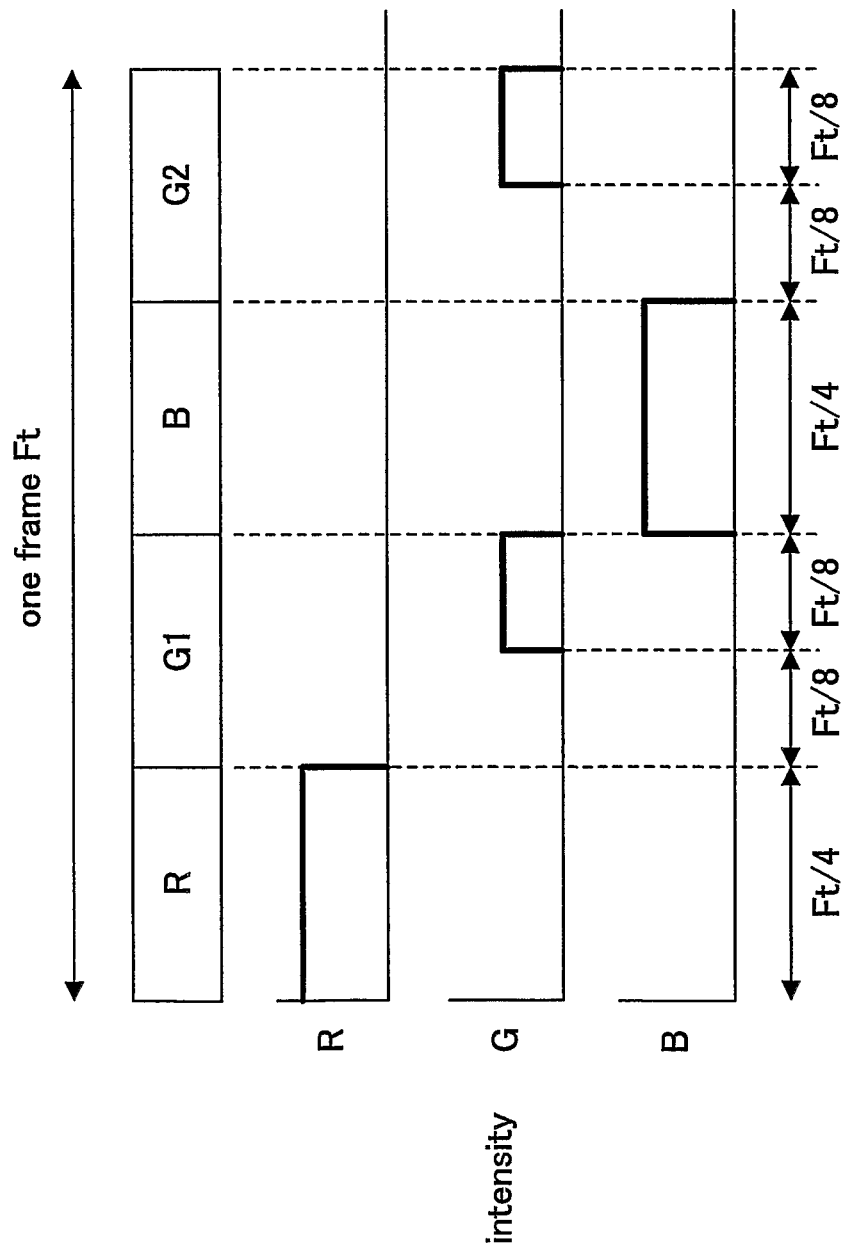

FIG. 22A and FIG. 22B are a time chart and a diagram respectively illustrating illumination time of different colors with a dark period being defined within divided sub frame time periods.

As illustrated in FIG. 22A, one frame period Ft is constituted by four sub-frames including one R sub-frame, one B sub-frames, and two G sub-frames, with the time period of each of the sub-frame periods being Ft/4. In one G sub-frame, a time period Ft/8 equaling half of the sub-frame is shielded. Consequently, within one G sub-frame equaling Ft/4, the intensity of the green light is reduced substantially, thereby maintaining balance with R and B.

FIG. 22B illustrates an example in which a rotational filter is used. As shown in FIG. 22B, light-shielding portions are provided between R and G1, and B and G2. Certainly, the light-shielding portions may be provided between G1 and B, and G2 and R.

In addition, a light-shielding layer may be provided in such a way that each of the shielding time periods may be reduced by half, and in the time period at the position of G1 only, the illumination time is set to be half of the sub frame. Further, the light-shielding layer and the green selective filter may be arranged alternately.

Sixth Embodiment

In the previous embodiments, the light path shift technique is combined with the color sequential technique, specifically, only one light valve is used and illumination of different monochromatic light on the light valve is performed in a time-division manner. However, the present invention is not limited to one light valve and illumination in the time-division manner.

In the present embodiment, three light valves are used and different monochromatic light beams are illuminated on a corresponding light valve. As described below, with plural light valves, the optical system of the device is simple, high image quality is obtainable, and arrangement of the light valves is easy.

Figure 23:
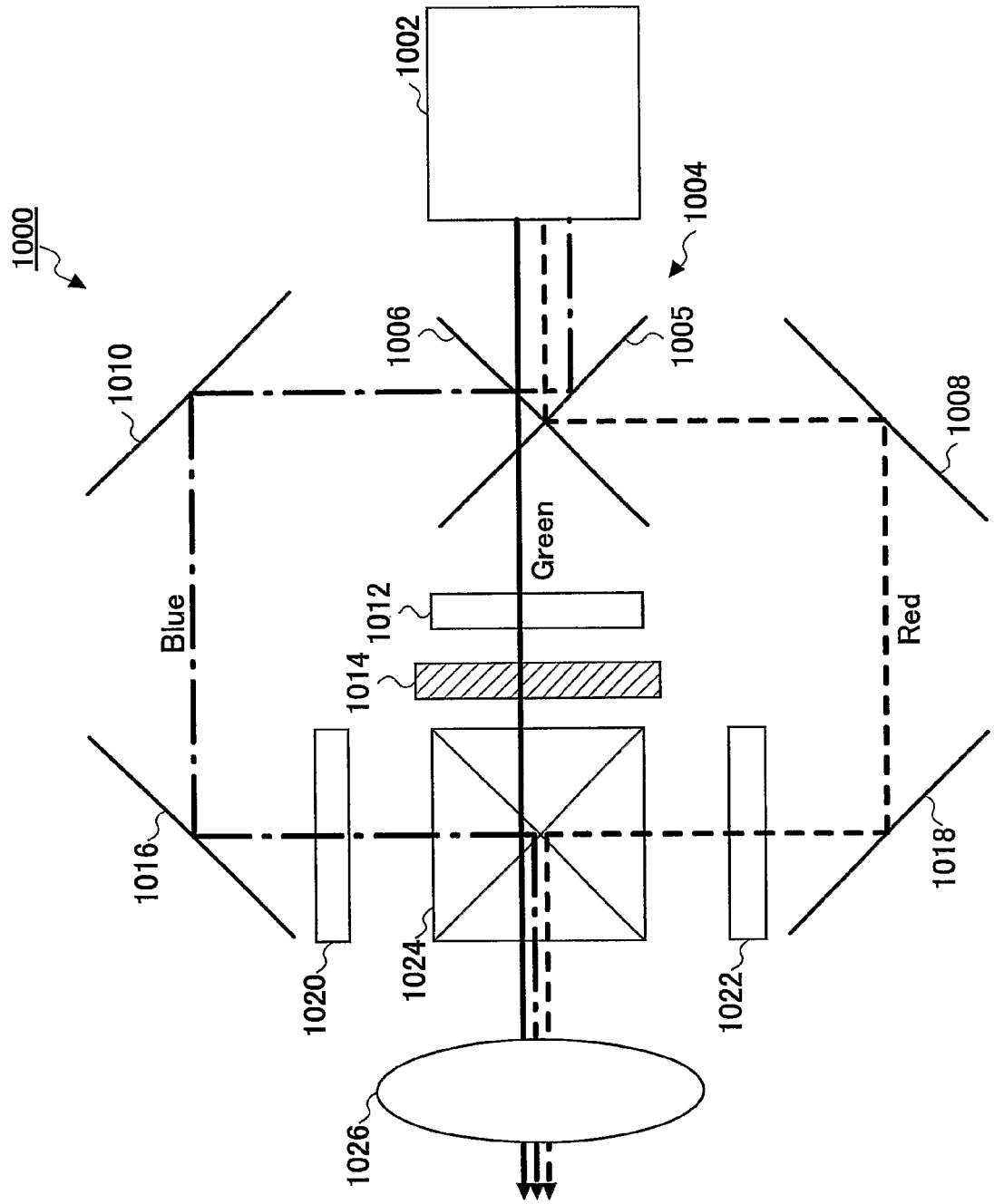
FIG. 23 is a diagram exemplifying a configuration of an image display device according to a sixth embodiment of the present invention.

FIG. 23 is a diagram exemplifying a configuration of an image display device according to a sixth embodiment of the present invention.

As illustrated in FIG. 23, the image display device 1000 includes an illumination unit 1002, a color separation unit 1004 for separating the white light from the illumination unit 1002 into different monochromatic light, for example, light of the three primary colors, Red, Green, Blue, a light valve 1012 for use of the green light, a light valve 1020 for use of the blue light, a light valve 1022 for use of the red light, a color combination unit 1024 for combining the red, green, and blue light to form a color image, a projection optical system 1026, and reflecting mirrors 1008, 1010, 1016, and 1018.

For example, the illumination unit 1022 may include, although not illustrated, a white light source, such as a halogen lamp, a xenon lamp, a metal halide lamp, or a super high-pressure mercury lamp, and an illuminance equalization unit, which homogenizes illuminance through light superposition by using a fly-eye lens array, or homogenizes illuminance by using a rod integration optical system.

The color separation unit 1004 may be a dichroic mirror system formed from a dichroic mirror 1005 which only reflects the red light component of the white light from the illumination unit 1002, and a dichroic mirror 1006 which only reflects the blue light component, and allows green light component to pass through. In this way, the white light from the illumination unit 1002 is separated into Red, Green, Blue light.

Each of the light valves 1012, 1020, and 1022 may be a transmission type liquid crystal panel, or a reflection type liquid crystal panel, or a digital micro-mirror device (DMD, for example, produced by Texas Instrument Company).

When the light valves 1012, 1020 and 1022 are transmission type liquid crystal panels, preferably, they may be formed from high temperature poly-silicon TFT liquid crystal elements.

The color combination unit 1024, for example, may be a cross dichroic prism.

The projection optical system 1026 magnifies and projects the images formed by the light valves 1012, 1020, and 1022.

Further, in the present embodiment, a pixel shift unit 1014 is provided, for example, on the downstream side of the light valve 1012 for use of the green light. Thus, the pixel shift unit 1014 shifts the light path of the green light output from the light valve 1012 in each frame and thus to shift positions of the green pixels projected by the light valve 1012 and form additional one or more green sub frames. Note that the shifted green pixels should not overlap with those un-shifted pixels. As described previously, the green light has high relative visibility compared to red and blue light, that is, green color can be observed clearly compared to red and blue colors even the red, green, blue light has the same intensity.

For example, the pixel shift unit 1014 shifts the pixels projected by the light valve 1012 by half of a pixel pitch, or one and half of a pixel pitch, or two and half of a pixel pitch, or other odd integral multiples of ½ pixel pitch. Alternatively, the pixels may also be shifted by ⅓ pitch, ⅔ pitch, or the pixels may be shifted by ½ pitch in both the horizontal direction and the vertical direction.

Each set of the shifted green pixels at each shift positions form an additional green sub frame, and the image data on the light valve 1012 is updated for each pixel shift operation. The pixel shift and image data updating operations are performed quickly within one image frame period, thus, due to the after image effect on human eyesight, both the green sub frames at the shifted positions and the red, green and blue sub frames at the un-shifted position exist within one frame, therefore, it appears as if the number of pixels has been increased by the number of the shifted green sub frames.

The pixel shift unit 1014 may be a light path conversion element or a liquid crystal element capable of light path shift. In FIG. 23, it is illustrated that the pixel shift unit 1014 is inserted in the light path to shift the light path, but the pixel shift function may also be implemented by driving a projection panel to perform micro-motion. For example, the pixel shift unit 1014 may be driven electromagnetically, piezoelectrically, or mechanically.

In addition, if the back focus of the projection system 1026 can be made sufficiently long, the light path can be changed by using a so-called Galvano mirror, that is, a mirror is provided in the light path to displace the light path by a small angle each time.

It is preferable to place the pixel shift unit 1014 to be close to the light valve 1012. Further, when the light valve 1012 is a transmission type liquid crystal panel, it is preferable to place the pixel shift unit 1014 immediately behind the light valve 1012. In FIG. 23, the light valve 1012 is a transmission type liquid crystal panel, and the pixel shift unit 1014 is placed between the light valve 1012 and the color combination unit 1024.

With the pixel shift unit 1014 being close to the light valve 1012, it is possible to reduce the distance from the light valve 1012 to the color combination unit 1024 as much as possible, and reduce the back focus length of the projection lens 1026.

This also provides room of arranging additional optical elements for improving the image quality without increasing the size of the device.

In addition, with the pixel shift unit 1014 being close to the light valve 1012, the light valve 1012 can be made small without loss of illumination light. When the light valve 1012 is a liquid crystal type element, in which liquid crystal materials are sandwiched by two transparent substrates and a voltage is applied on the two transparent substrates, and thus, on the liquid crystal materials, with a small light valve 1012, the cost of the image display device can be greatly reduced. In addition, when the light valve is obtained by cutting out from a large liquid crystal panel, with a small light valve 1012, it is possible to obtain more light valves, thus improving productivity and reducing the cost of the image display device.

It should be noted that although it is described here that the pixel shift unit 1014 is provided behind the light valve 1012 to shift the green pixels, which have the highest relative visibility, the pixel shift unit 1014 may also be provided behind the light valve 1016 or the light valve 1022 to shift the red pixels or the blue pixels.

In addition, in order to achieve high light utilization efficiency, a polarization conversion element (not illustrated) may be provided to make the polarization states of the red, green, and blue light the same.

Figure 24:
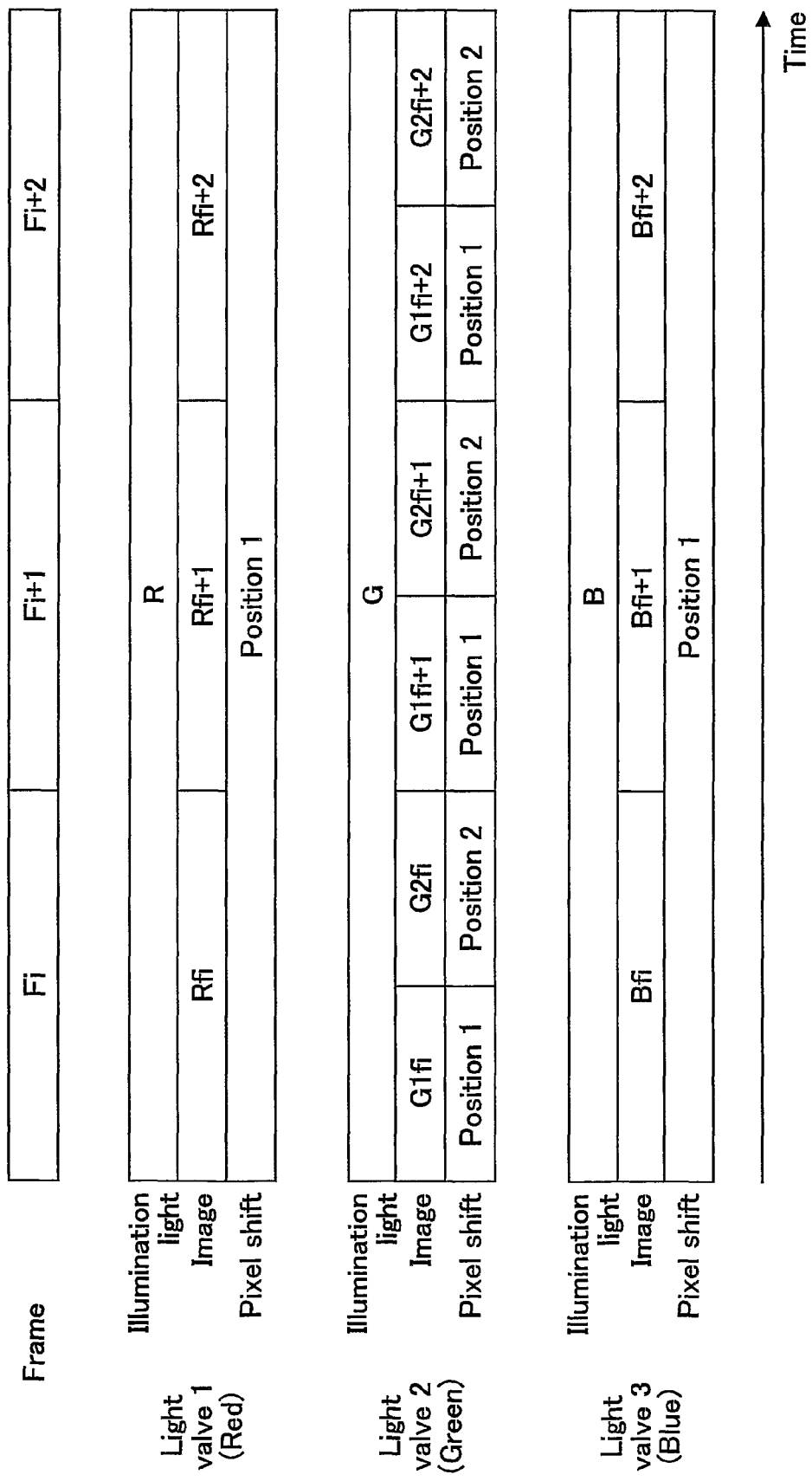
FIG. 24 shows timing sequences illustrating timings of pixel shift and light illumination in the present embodiment.

Although not illustrated in FIG. 23, a control unit similar to the control unit 13 disclosed in the previous embodiments is provided in the image display device 1000 of the present embodiment. This control unit controls image data applied on the light valves 1012, 1020, 1022, and controls pixel shift operations of the pixel shift unit 1014 so that the light valves 1012, 1020, 1022 and the pixel shift unit 1014 operate cooperatively to form monochromatic images and the target color image. FIG. 24 shows timing sequences illustrating timings of pixel shift and light illumination in the present embodiment.

In the present embodiment, because red, green, and blue three light valves are used, illumination of red, green, and blue three light is performed constantly and at the same time, without switching the illumination light as shown in FIG. 2A.

As illustrated in FIG. 24, in order to form image frames Fi, Fi+1, Fi+2, illumination with red light is performed to form red sub frames Rfi, Rfi+1, Rfi+2 at the first pixel position (position 1), sequentially, illumination with blue light is performed to form blue sub frames Bfi, Bfi+1, Bfi+2 at the first pixel position (position 1), sequentially.

in FIG. 24, the pixel-shift unit 1014 performs pixel shift once within each of the image frames Fi, Fi+1, Fi+2 during illumination with the green light, thereby, in the image frame Fi, a green sub frame G1$fi$ is formed at the first pixel position (position 1) and a green sub frame G2$fi$ is formed at the second pixel position (position 2), in the image frame Fi+1, a green sub frame G1$fi$+1 is formed at the first pixel position (position 1) and a green sub frame G2$fi$+1 is formed at the second pixel position (position 2), and in the image frame Fi+2, a green sub frame G1$fi$+2 is formed at the first pixel position (position 1) and a green sub frame G2$fi$+2 is formed at the second pixel position (position 2).

The red sub frame Rfi and the blue sub frame Bfi at the first pixel position (position 1), the green sub frame G1$fi$ at the first pixel position (position 1), and the green sub frame G2$fi$ at the second pixel position (position 2) collectively form the image frame Fi. The red sub frame Rfi+1 and the blue sub frame Bfi+1 at the first pixel position (position 1), the green sub frame G1$fi$+1 at the first pixel position (position 1), and the green sub frame G2$fi$+1 at the second pixel position (position 2) collectively form the image frame Fi+1.

The red sub frame Rfi+2 and the blue sub frame Bfi+2 at the first pixel position (position 1), the green sub frame G1$fi$+2 at the first pixel position (position 1), and the green sub frame G2$fi$+2 at the second pixel position (position 2) collectively form the image frame Fi+2.

According to the present embodiment, in the related art, four or more panels are used to shift the green pixels, meanwhile, in the present embodiment, the pixel shift unit 1014 is provided behind the light valve 1012 to shift the light path of the green light to shift positions of the green pixels projected by the light valve 1012 in each frame. When the pixel shift and image updating on the light valve 1012 are performed at a high speed within one image frame period, it appears as if the number of pixels has been increased by the number of the shifted green sub frames, and this improves the resolution of the image. Therefore, by using only three light values, it is possible to provide a compact image display device having a simplified structure and able to display a high quality image of high resolution at low cost.

Seventh Embodiment

Figure 25:
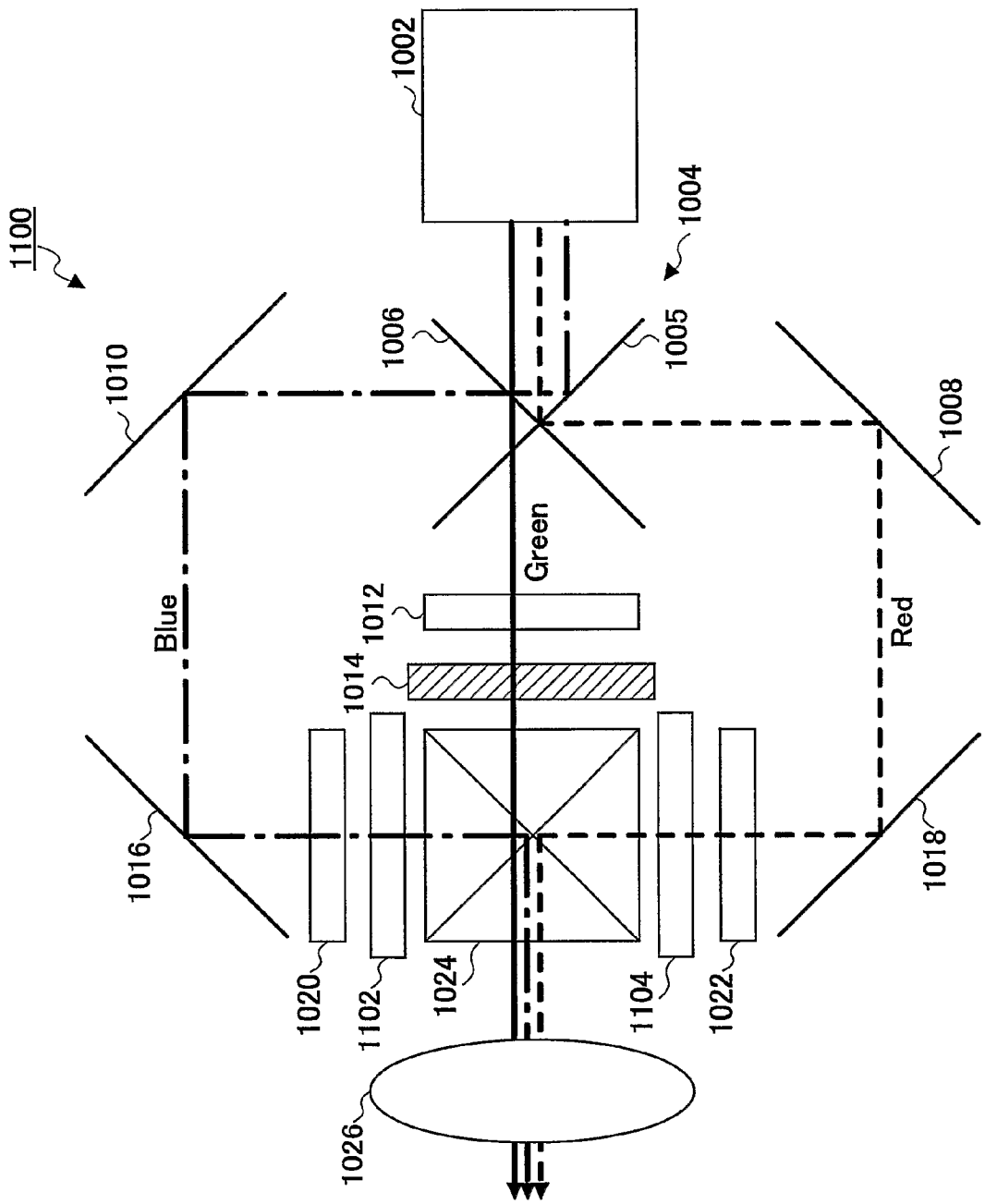
FIG. 25 is a diagram exemplifying a configuration of an image display device according to a seventh embodiment of the present invention.

FIG. 25 is a diagram exemplifying a configuration of an image display device according to a seventh embodiment of the present invention.

In FIG. 25, the same reference numbers are assigned to the same elements as those described in FIG. 23, and overlapping descriptions are omitted appropriately.

The image display device 1100 in FIG. 25 differs from the image display device 1000 in FIG. 23 in that light path correction elements 1102 and 1104 are provided additionally.

In FIG. 25, the same as FIG. 23, because the pixel shift unit 1014 is placed between the light valve 1012 and the color combination unit 1024, an additional light path length is generated by the light path shift unit 1014.

In the present embodiment, the light path correction element 1102 is arranged between the color combination unit 1024 and the light valve 1020 for use of blue light, and the light path correction element 1104 is arranged between the color combination unit 1024 and the light valve 1022, which is for use of red light. Further, the path length of the blue light in the light path correction element 1102 and the path length of the red light in the light path correction element 1104 are substantially equal to the path length of the green light in the light path shift unit 1014.

For example, when the light valve 1012 is a liquid crystal type element in which liquid crystal materials are sandwiched by two glass substrates, the light path correction elements 1102, 1104 may be formed by parallel glass plates, and the thicknesses of the glass plates can be determined according to the thickness of the light valve 1012.

According to the present embodiment, because the light path correction element 1102 is arranged between the color combination unit 1024 and the light valve 1020, and the light path correction element 1104 is arranged between the color combination unit 1024 and the light valve 1022, and the path length of the blue light in the light path correction element 1102 and the path length of the red light in the light path correction element 1104 are substantially equal to the path length of the green light in the light path shift unit 1014, the path length difference between the green light path and the red, blue light path, which are generated by the light path shift unit 1014, can be compensated for, thus, it is possible to prevent monochromatic aberration of magnification and further prevent degradation of the image resolution caused by the monochromatic aberration.

Eighth Embodiment

Figure 26:
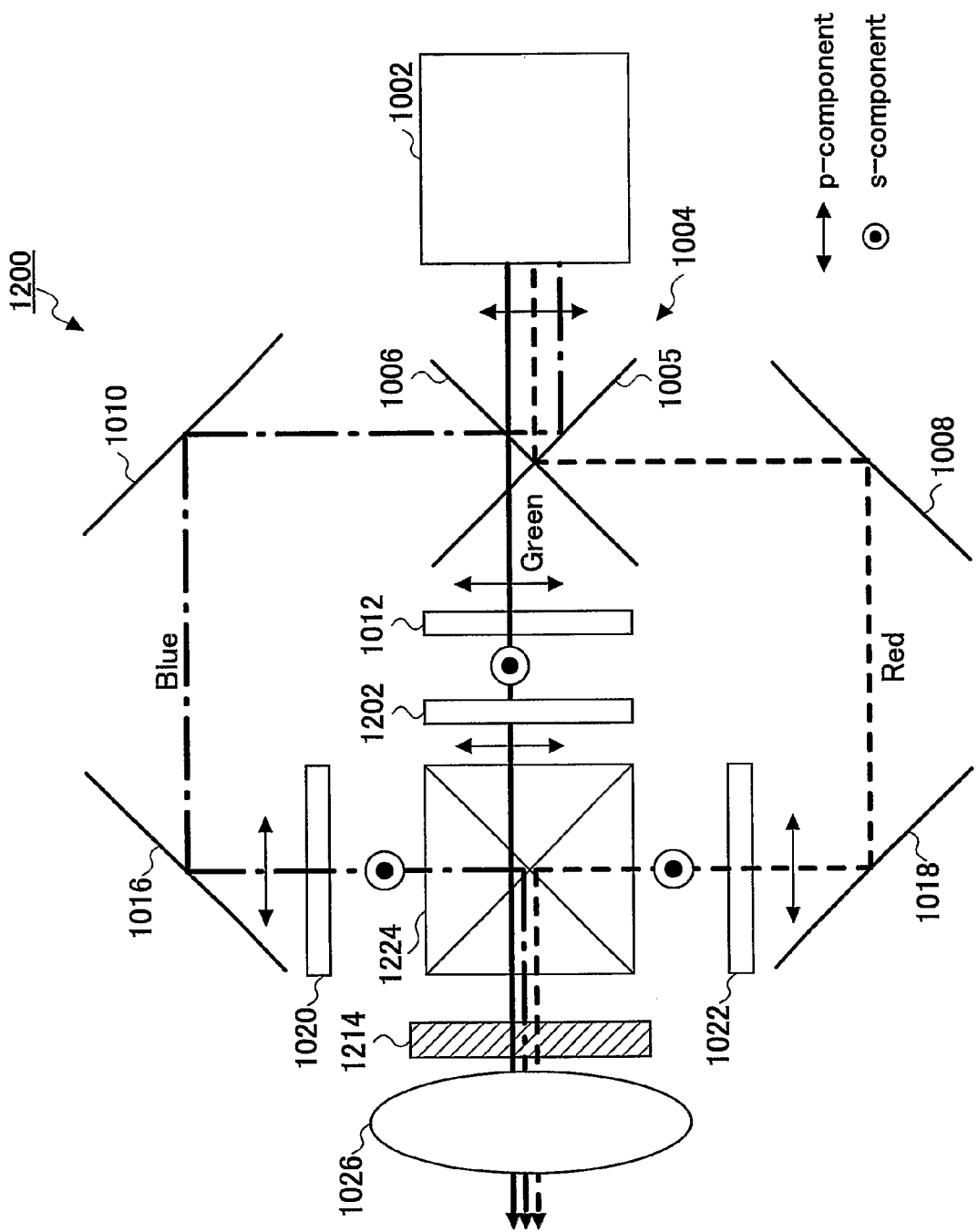
FIG. 26 is a diagram exemplifying a configuration of an image display device according to an eighth embodiment of the present invention.

FIG. 26 is a diagram exemplifying a configuration of an image display device according to an eighth embodiment of the present invention.

In FIG. 26, the same reference numbers are assigned to the same elements as those described in FIG. 23 and FIG. 25, and overlapping descriptions are omitted appropriately.

The image display device 1200 in FIG. 26 differs from the image display device 1000 in FIG. 23 in the following aspects.

In the image display device 1200, a pixel shift unit 1214 is not placed between the light valve 1012 and a color combination unit 1224, but is arranged on the downstream side of the color combination unit 1224, specifically, between the projection lens 1026 and the color combination unit 1224. Further, the pixel shift unit 1214 is a light modulation element whose operations are dependent on the polarization direction of the incident beam.

In addition, the light valves 1012, 1020, and 1022 are able to control the polarization direction of the incident light pixel by pixel.

In addition, a ½ wave plate 1202 is arranged after the light valve 1012 to rotate the polarization direction of the green light by 90 degrees.

In addition, light output from the illumination unit 1002 is linear-polarized.

As a result, green, blue, and red light beams propagate in the image display device 1200 with specified polarization directions.

As illustrated in FIG. 26, linear-polarized illumination light from the illumination unit 1002 is separated into green, blue, and red light, and are incident on the light valve 1012 for use of the green light, the light valve 1020 for use of the blue light, and the light valve 1022 for use of the red light.

In FIG. 26, a polarized light beam having a polarization direction parallel to the paper is defined to be a p-polarized component, and a polarized light beam having a polarization direction perpendicular to the paper is defined to be an s-polarized component.

The incident p-polarized green, blue, red light beams are modulated pixel by pixel and are converted into s-polarized light beams in the light valve 1012, the light valve 1020, and the light valve 1022, respectively. Further, the s-polarized green light is converted into p-polarized green light by the ½ wave plate 1202, so that the green light beam is transmitted through the pixel shift unit 1214.

The s-polarized blue and red light and the p-polarized green light are directed into the color combination unit 1224.

For example, the color combination unit 1224 may be a cross-prism. In this case, it is possible to make the optical system of the device compact. For example, the color combination unit 1224 is configured to reflect the blue and red light, but allows the green light to be transmitted. Since the blue and red light are reflected by the color combination unit 1224, preferably, the blue and red light are adjusted to be in the s-polarized state and are directed to incident in the color combination unit 1224, which is a cross-prism. Meanwhile, since the green light just transmits through the color combination unit 1224, preferably, the green light may be adjusted to be in the p-polarized state and is directed to incident in the color combination unit 1224. Therefore, a dichroic film can be provided in the color combination unit 1224 which has a high reflectivity for the blue and red light and a high transmittance for the green light. As a result, after being combined in the color combination unit 1224, the polarization direction of the green light is perpendicular to those of the blue light and the red light.

As described above, the pixel shift unit 1214, which is a light modulation element dependent on the polarization direction of the incident combined light beam, is placed after the color combination unit 1224. The pixel shift unit 1214 is configured to shift the light path of the incident p-polarized green light only, but not shift the light path of the incident s-polarized blue or red light. As described previously, the green light has high relative visibility compared to the blue light and red light.

As a result, pixels in the green image formed by the light valve 1012 are shifted by the pixel shift unit 1214, but pixels in the blue image formed by the light valve 1020 and pixels in the red image formed by the light valve 1022 are not shifted and are directly projected by the projection lens 1026.

With the pixel shift unit 1214 being placed after the color combination unit 1224, and with the polarization states of the incident green light, blue light and red light being appropriately manipulated, the same effect as that of the preceding embodiment can be obtained. Further, because all of the green light, blue light, and red light transmit the pixel shift unit 1214, additional light path length differences do not occur, hence, it is not necessary to use a light path length correction element.

According to the present embodiment, by using the polarization-dependent pixel shift unit 1414, which is adapted to only operate on the p-polarized light, but not on the s-polarized light, it is possible to set the pixel shift unit in a common light path of red, green and blue light without the necessity of limiting the pixel shift unit in the light path of the green light.

In addition, by making use of the high reflectivity for the blue and red light and the high transmittance for the green light in the color combination unit 1324, which is a cross prism, it is possible to increase the utilization of illumination light, thereby, improving brightness of the projection system.

In addition, it is possible to prevent occurrence of additional light path length differences between light of difference colors, thus, prevent monochromatic aberration of magnification of these light of difference colors, and further reduce the cost of the device without using the light path length correction element.

Ninth Embodiment

Figure 27:
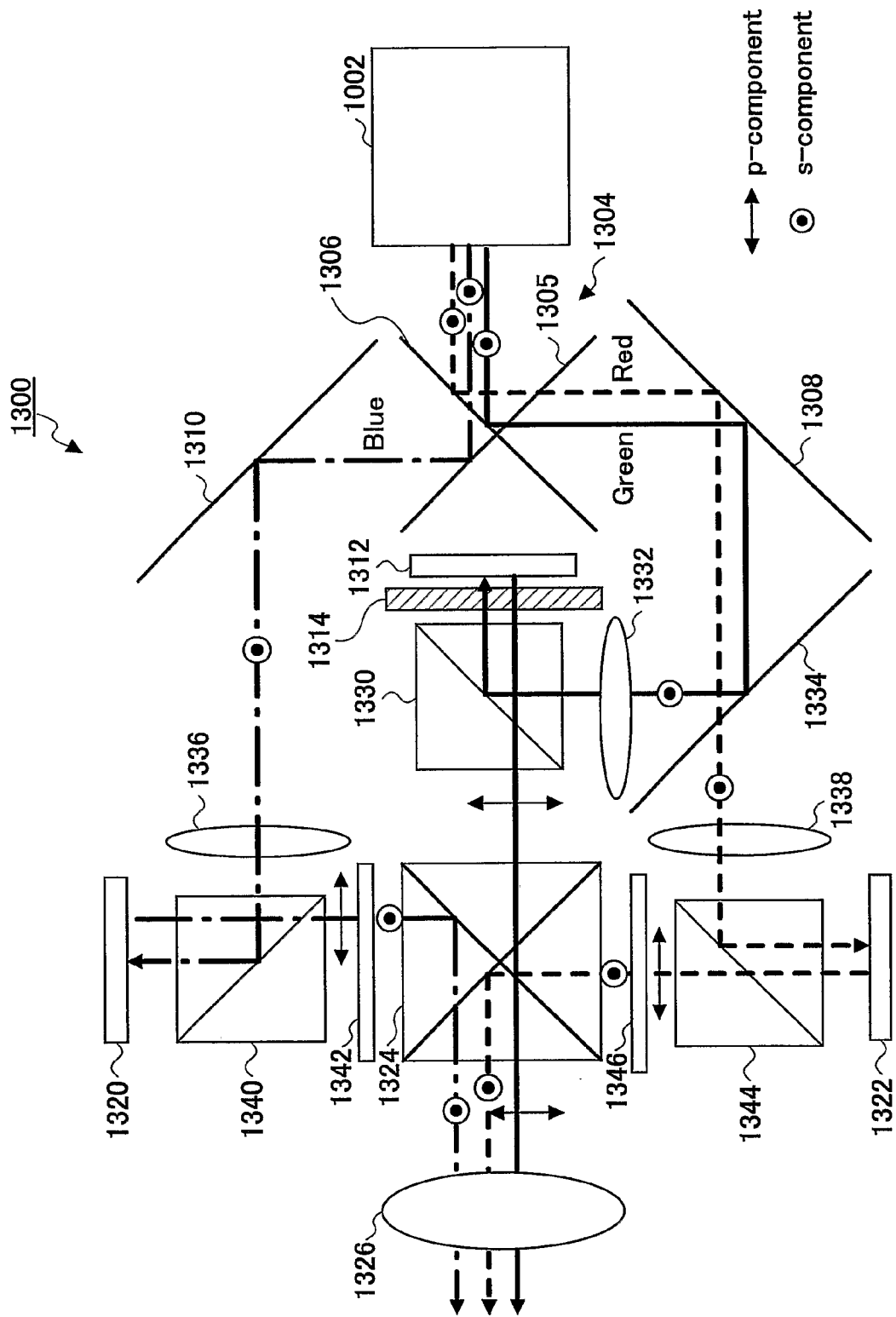
FIG. 27 is a diagram exemplifying a configuration of an image display device according to a ninth embodiment of the present invention.

FIG. 27 is a diagram exemplifying a configuration of an image display device according to a ninth embodiment of the present invention.

In FIG. 27, the same reference numbers are assigned to the same elements as those described previously, and overlapping descriptions are omitted appropriately.

The image display device 1300 in FIG. 27 is the same as the image display device 1000 in FIG. 23 and the image display device 1100 in FIG. 25, a pixel shift unit 1314 is placed immediately after a light valve 1312, but differs from the image display devices 1000, 1100 and the image display device 1200 in FIG. 26 in that light valves 1312, 1320 and 1322 are not transmission type, but are reflection type light valves.

As illustrated in FIG. 27, the image display device 1300 includes an illumination unit 1002, a color separation unit 1304 including color-selection mirrors 1305, 1306 for separating white light from the illumination unit 1002 into different monochromatic light, for example, the red, green, and blue light (the three primary colors), reflecting mirrors 1308 and 1310, a light valve 1312 for use of the green light, a pixel shift unit 1314 placed immediately after the light valve 1312, a light valve 1320 for use of the blue light, a light valve 1322 for use of the red light, a color combination unit 1324 for combining the red, green, and blue light to form a color image, a projection optical system 1326.

In addition, in the image display device 1300 further includes a color separation unit 1334 for separating the green light and red light, which are obtained by the color-selection mirror 1306.

In the light path of the green light, there are arranged a condense lens 1332, and a polarized beam splitter (PBS) 1330 to direct the green light to the pixel shift unit 1314 and the light valve 1312.

In the light path of the blue light, which is separated from the incident white light by the color-selection mirror 1305, and reflected by the mirror 1310, there are arranged a condense lens 1336 and a polarized beam splitter (PBS) 1340 for directing the blue light to the light valve 1320, and a ½ wave plate 1342 for changing the polarization direction of the light from the polarized beam splitter 1340.

In the light path of the red light, which is separated from the incident white light by the color-selection mirror 1306, and reflected by the mirror 1308, and passes through the color separation unit 1334 to be separated from the green light, there are arranged a condense lens 1338 and a polarized beam splitter (PBS) 1344 for directing the red light to the light valve 1322, and a ½ wave plate 1346 for changing the polarization direction of the light from the polarized beam splitter 1342.

As illustrated in FIG. 27, linear-polarized white light (for example, as illustrated, the polarization direction of the incident light is perpendicular to the paper, that is, an s-polarized component) from the illumination unit 1002 is incident into the color separation unit 1304; the blue light is separated from the white light by the color-selection mirror 1305, and the green light and red light separated from incident white light the color-selection mirror 1306.

The color separation unit 1334 further reflects the green light to the condense lens 1332, and allows the red light to pass through. The green light is incident in the polarized beam splitter (PBS) 1330. The polarized beam splitter (PBS) 1330 reflects the green light to the pixel shift unit 1314 and the light valve 1312. The s-polarized green light passes through the pixel shift unit 1314 and is incident in the light valve 1312.

For example, the light valve 1312 is a reflection type liquid crystal panel. The light valve 1312 modulates the s-polarized green light pixel by pixel. When a pixel is turned ON, the modulated light is output to the polarized beam splitter 1330 through the pixel shift unit 1314, and the polarized beam splitter 1330 changes the polarization direction of the green light by 90 degrees and outputs p-polarized green light, which is used for projecting a color image, so as to be distinguished from the incident s-polarized green light. The distinguished p-polarized green light to be used for image projection is incident into the color combination unit 1324 and passes through the color combination unit 1324.

As to the red light, after passing through the color separation unit 1334, the red light is incident in the polarized beam splitter (PBS) 1344 through the condense lens 1338. The polarized beam splitter 1344 reflects the red light to the light valve 1322.

For example, the light valve 1322 is a reflection type liquid crystal panel. The light valve 1322 modulates the s-polarized red light pixel by pixel, and when a pixel is turned ON, the modulated red light is output to the polarized beam splitter 1344, and the polarized beam splitter 1344 changes the polarization direction of the red light by 90 degrees and outputs p-polarized red light, which is used for projecting the color image, so as to be distinguished from the incident s-polarized red light. The p-polarized red light is incident in the ½ wave plate 1346 to change the polarization direction of the p-polarized red light by 90 degrees to convert the p-polarized red light back to s-polarized red light so as to be reflected in the color combination unit 1324. Then, the distinguished red light used for image projection is incident into the color combination unit 1324.

As to the blue light, after being generated by the color-selection mirror 1305 and reflected by the mirror 1310, the blue light is incident in the polarized beam splitter (PBS) 1340 through the condense lens 1336. The polarized beam splitter 1340 reflects the blue light to the light valve 1320.

For example, the light valve 1320 is a reflection type liquid crystal panel, and modulates the s-polarized blue light pixel by pixel. When a pixel is turned ON, the modulated blue light is output to the polarized beam splitter 1340, and the polarized beam splitter 1340 changes the polarization direction of the blue light by 90 degrees to output p-polarized blue light, which is used for projecting the color image, so as to be distinguished from the incident s-polarized blue light. The p-polarized blue light is incident in the ½ wave plate 1342 to change the polarization direction of the p-polarized blue light by 90 degrees to convert the p-polarized blue light back to s-polarized blue light so as to be reflected in the color combination unit 1324. Then, the distinguished blue light used for image projection is incident into the color combination unit 1324.

In the color combination unit 1324, the incident red light, green light, and blue light are combined to form a color image.

Similar to the sixth embodiment, the pixel shift unit 1314 is provided between the light valve 1312 and the color combination unit 1324 to shift the light path of the green light output from the light valve 1312 in each frame, thus to shift positions of the green pixels projected by the light valve 1312 to form additional green sub frames. Here, the shifted green pixels should not overlap with those un-shifted pixels. Due to the after image effect on human eyesight, both the green sub frames at the shifted positions and the red, green, and blue sub frames at the un-shifted position exist within one frame, therefore, it appears as if the number of pixels has been increased by the number of the shifted green sub frames.

It is preferable to place the pixel shift unit 1314 close to the light valve 1312 as much as possible. In FIG. 27, the pixel shift unit 1314 is placed between the light valve 1312 and the polarized beam splitter 1330. With the pixel shift unit 1314 being close to the light valve 1312, it is possible to reduce the size of the pixel shift unit 1314.

It should be noted that the pixel shift unit 1314 may be placed between the polarized beam splitter 1330 and the color combination unit 1324.

According to the present embodiment, reflection type light valves 1312, 1320, 1322 are used, and because the area ratio of each pixel is high in a reflection type liquid crystal panel, it is possible to increase the utilization of illumination light, thereby, improving brightness of the image.

In addition, since the pixel shift unit 1314 is provided to shift positions of the green pixels at a high speed within one image frame period, and hence to improve the resolution of the projected image. Because the pixel shift unit 1314 is placed close to the light valve 1312, it is possible to reduce the size of the pixel shift unit 1314, improve productivity of the pixel shift unit 1314, reduce the cost of the pixel shift unit 1314, and hence, reduce the cost of the whole image display device.

10th Embodiment

Figure 28:
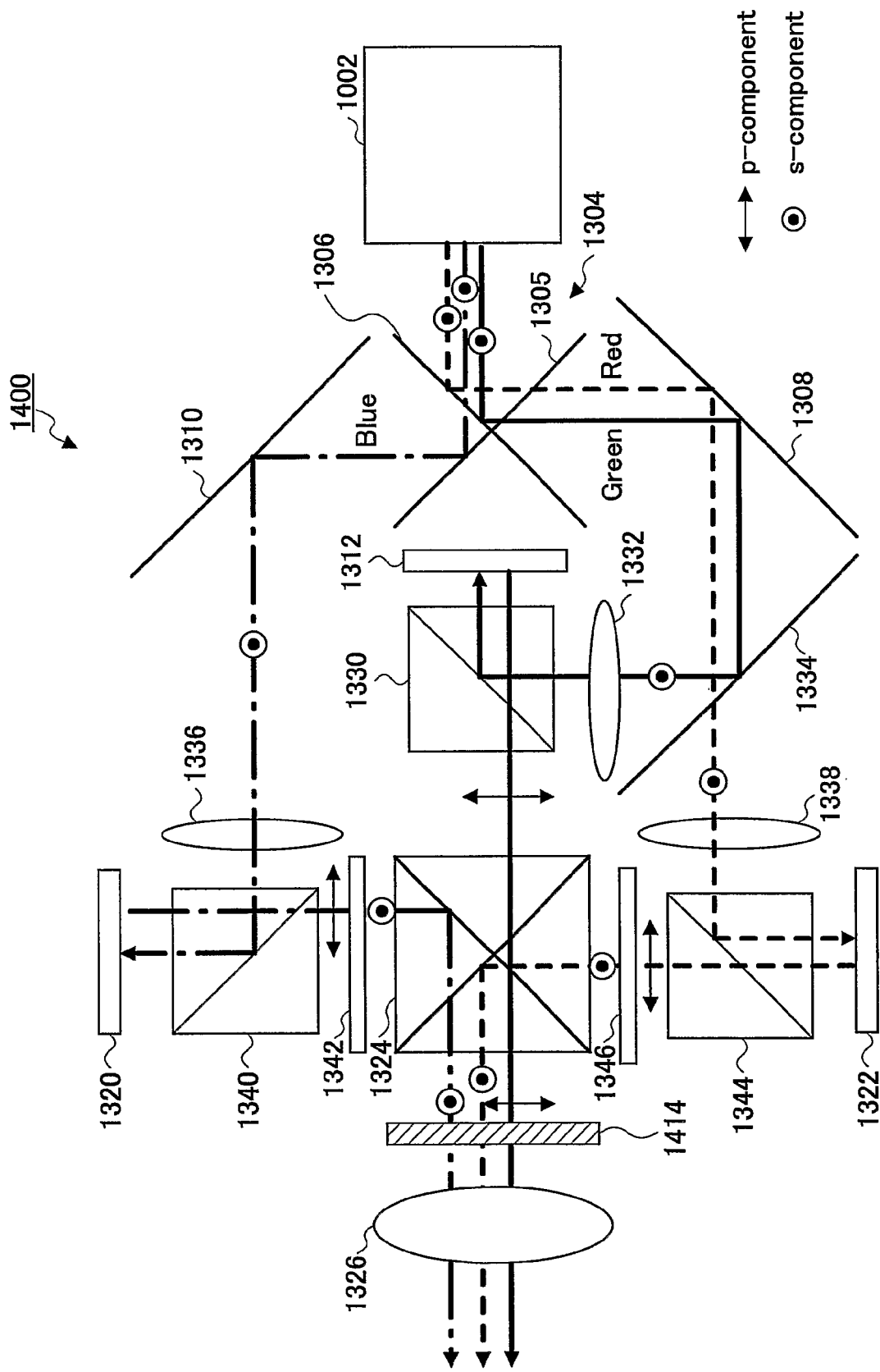
FIG. 28 is a diagram exemplifying a configuration of an image display device according to a 10th embodiment of the present invention.

FIG. 28 is a diagram exemplifying a configuration of an image display device according to a 10th embodiment of the present invention.

In FIG. 28, the same reference numbers are assigned to the same elements as those described previously, and overlapping descriptions are omitted appropriately.

The image display device 1400 in FIG. 28 is a combination of the image display device 1200 in FIG. 26 and the image display device 1300 in FIG. 27. That is, the reflection type light valves 1312, 1320 and 1322 are used, and a pixel shift unit 1414 is arranged between the projection lens 1326 and the color combination unit 1324.

As illustrated in FIG. 28, s-polarized white light from the illumination unit 1002 is incident into the color separation unit 1304 and is separated into s-polarized blue light and a mixture of green light and red light. The color separation unit 1334 further separates the incident light into s-polarized green light and s-polarized red light. The s-polarized green light is incident in the polarized beam splitter 1330, and is reflected to the light valve 1312.

The reflection type light valve 1312, for example, which is a reflection type liquid crystal panel, modulates the s-polarized green light pixel by pixel, and outputs the modulated s-polarized green light to the polarized beam splitter 1330, and the polarized beam splitter 1330 changes the polarization direction of the incident s-polarized green light by 90 degrees to output p-polarized green light, which is used for projecting a color image, to the color combination unit 1324 and passes through the color combination unit 1324.

The s-polarized red light is incident in the polarized beam splitter 1344 through the condense lens 1338, and is reflected to the light valve 1322. The light valve 1322, for example, which is a reflection type liquid crystal panel, modulates the incident s-polarized red light pixel by pixel, and outputs the modulated red light to the polarized beam splitter 1344. The polarized beam splitter 1344 changes the polarization direction of the s-polarized red light by 90 degrees to output p-polarized red light used for projecting the color image. The ½ wave plate 1346 further changes the polarization direction of the p-polarized red light by 90 degrees to convert the p-polarized red light back to s-polarized red light so as to be reflected in the color combination unit 1324. Then, the s-polarized red light is incident into the color combination unit 1324.

The s-polarized blue light is incident in the polarized beam splitter 1340 through the condense lens 1336, and is reflected to the light valve 1320. The light valve 1320, which is a reflection type liquid crystal panel, modulates the s-polarized blue light pixel by pixel, and outputs the modulated s-polarized blue light to the polarized beam splitter 1340. The polarized beam splitter 1340 changes the polarization direction of the blue light by 90 degrees to output p-polarized blue light, the ½ wave plate 1342 further changes the polarization direction of the incident p-polarized blue light by 90 degrees to convert the p-polarized blue light back to s-polarized blue light so as to be reflected in the color combination unit 1324. Then, the s-polarized blue light is incident into the color combination unit 1324.

In the color combination unit 1324, the incident s-polarized red light, p-polarized green light, and s-polarized blue light are combined to form a color image.

For example, the color combination unit 1324 may be a cross-prism, and is configured to reflect the s-polarized blue and red light, but allows the p-polarized green light to be transmitted. Therefore, a dichroic film can be provided in the color combination unit 1324 which has a high reflectivity for the s-polarized blue and red light and a high transmittance for the p-polarized green light. As a result, after being combined in the color combination unit 1324, the polarization direction of the green light is perpendicular to those of the blue light and the red light.

The pixel shift unit 1414 is a light modulation element dependent on the polarization direction of the incident light beam, and is placed after the color combination unit 1324. The pixel shift unit 1414 shifts the light path of the incident p-polarized green light, but not shift the light path of the incident s-polarized blue or red light. As a result, pixels in the green image formed by the light valve 1312 are shifted by the pixel shift unit 1414, but pixels in the blue image formed by the light valve 1320 and pixels in the red image formed by the light valve 1322 are not shifted and are directly projected by the projection lens 1326. Consequently, it is possible to realize high-resolution image projection.

As described in the previous embodiment, by using reflection type light valves 1312, 1320, 1322, high area ratio of each pixel is obtainable, and it is possible to increase the utilization of illumination light, thereby, improving brightness of the image.

By using the polarization-dependent pixel shift unit 1414, which is adapted to only operate on the p-polarized light, but not on the s-polarized light, it is possible to set the pixel shift unit 1414 in a common light path of red, green and blue light without the necessity of limiting the pixel shift unit 1414 in the light path of the green light.

In addition, by making use of the high reflectivity for the blue and red light and the high transmittance for the green light in the color combination unit 1324, which is a cross prism, it is possible to increase the utilization of illumination light, thereby, improving brightness of the projection system.

With the pixel shift unit 1414 being placed after the color combination unit 1324, and with the polarization states of the incident green light, blue light and red light being appropriately manipulated, the same effect as the previous embodiments can be obtained. Further, because the green light, blue light, and red light transmit the pixel shift unit 1414, additional light path length differences do not occur, hence, it is not necessary to use a light path length correction element. Thus, it is possible to prevent occurrence of additional light path length differences between light of difference colors, and to prevent monochromatic aberration of magnification of these light of difference colors, and further reduce the cost of the device without using the light path length correction element.

11th Embodiment

Figure 29:
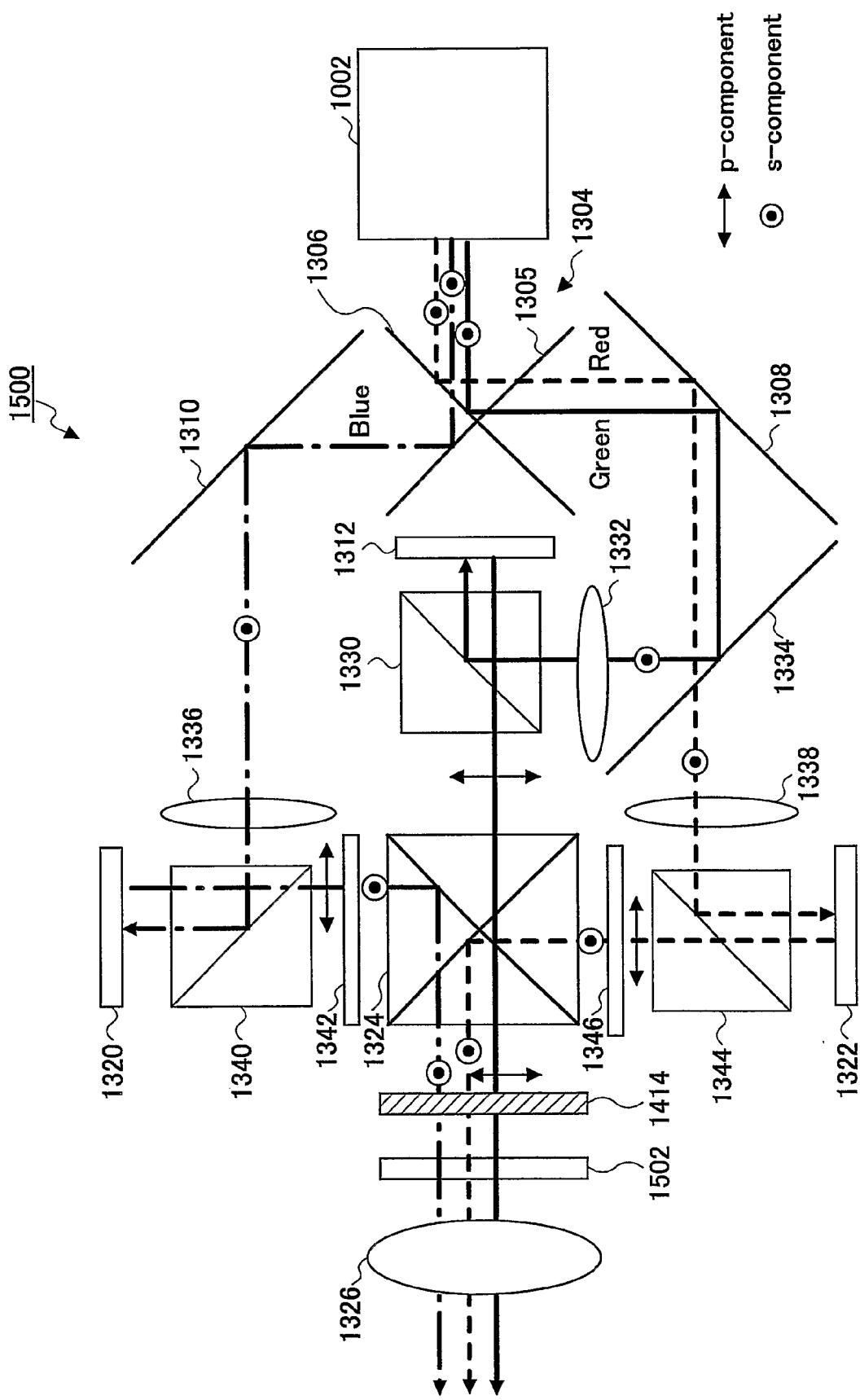
FIG. 29 is a diagram exemplifying a configuration of an image display device according to an 11th embodiment of the present invention.

FIG. 29 is a diagram exemplifying a configuration of an image display device according to an 11th embodiment of the present invention.

In FIG. 29, the same reference numbers are assigned to the same elements as those described previously, and overlapping descriptions are omitted appropriately.

The configuration of the image display device 1500 in FIG. 29 is basically the same as that of the image display device 1400 in FIG. 28, except that a color selective wave plate 1502 is further arranged on the downstream side of the color combination unit 1324.

In the present embodiment, the color selective wave plate 1502 is used to adjust the polarization states of the light beams from the pixel shift unit 1414 to be the same. For example, the color selective wave plate 1502 is an element able to change the polarization direction of incident light of a specified color by 90 degrees. For example, a product "Color Select" manufactured by Color Link Company may be used.

As described in the previous embodiments, p-polarized green light, and s-polarized blue or red light are output from the pixel shift unit 1414. If the color selective wave plate 1502 is configured to change the polarization direction of the incident p-polarized light (green light), or the incident s-polarized light (blue or red light) by 90 degrees, the green, blue, and red light from the pixel shift unit 1414 have the same polarization states.

In the image display device of the present embodiment, performance of a not-illustrated screen is often dependent on the polarization state of the incident light beams. For example, it is known that at least a reflective screen, or transmission screen, has polarization dependency. Thus, if the incident light on the screen possesses various polarization states, degradation of color balance may occur.

One solution to this problem is to equalize the polarization states of the incident light. In the present embodiment, with the green, blue, and red light from the pixel shift unit 1414 being adjusted to have the same polarization states by the color selective wave plate 1502 to have the same polarization states, this problem can be solved.

Further, with the green, blue, and red light from the pixel shift unit 1414 being adjusted to have the same polarization states by the color selective wave plate 1502, an addition polarizer (not illustrated) can be installed to improve the degree of polarization of the green, blue, and red light from the pixel shift unit 1414, and this improves the contrast of the image display device.

12th Embodiment

In the previous embodiments, it is disclosed that the light path shift technique is realized by combining the color sequential technique, specifically, a single light valve is used and illumination of different monochromatic light on the light valve is performed in a time-division manner; further, it is also disclosed that the light path shift technique is realized by using three light valves, and illumination of different monochromatic light on the light valves are performed at the same time.

As described above, the present invention is not limited to the number of the light valves and the method of illumination.

In the present embodiment, two light valves are used, and illumination of monochromatic light beams on the two light valves is performed at the same time, but illumination on one of the light valves is performed in the time-division manner.

Figure 30:
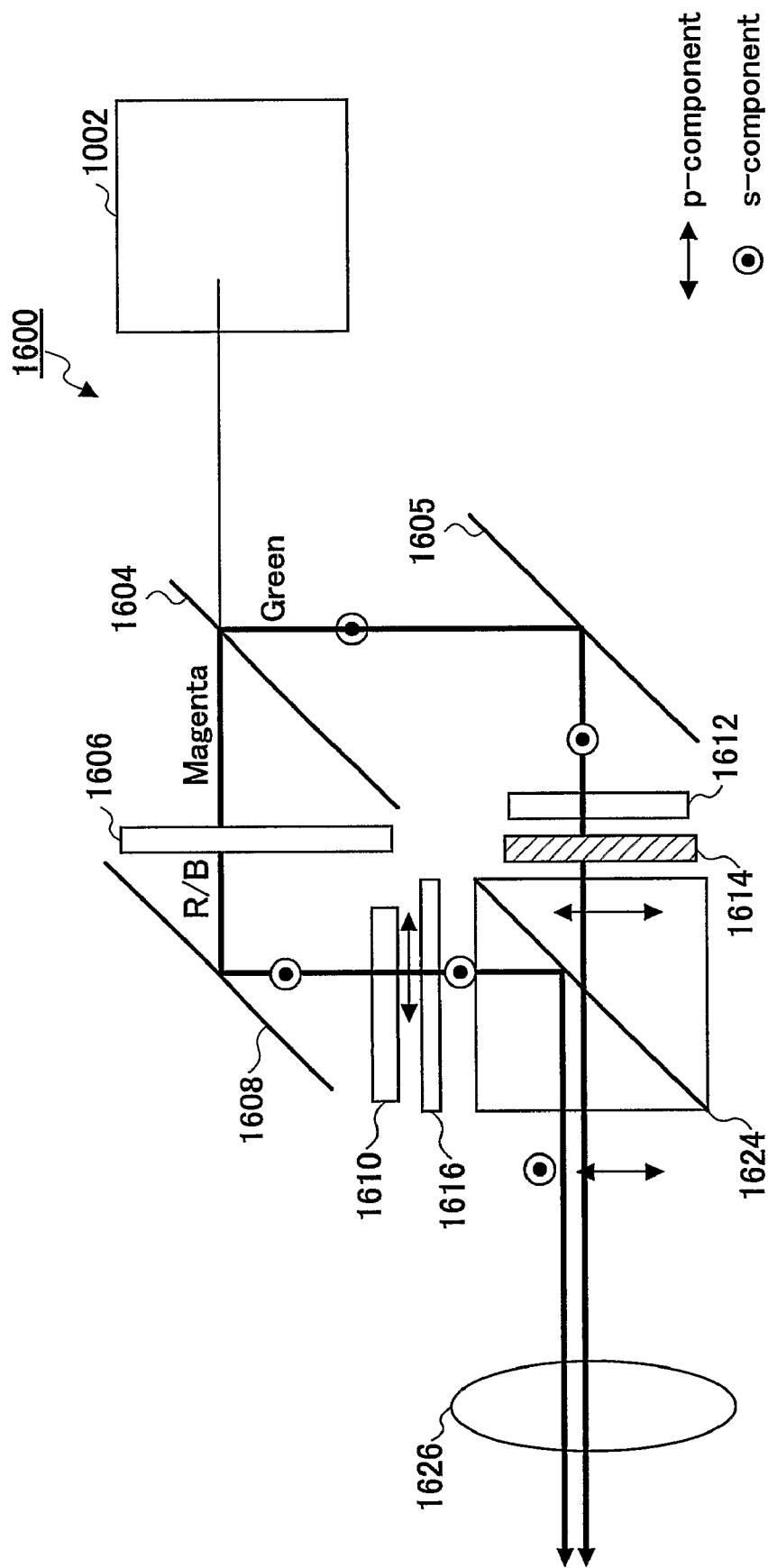
FIG. 30 is a diagram exemplifying a configuration of an image display device according to a 12th embodiment of the present invention.

FIG. 30 is a diagram exemplifying a configuration of an image display device according to a 12th embodiment of the present invention.

Below, overlapping descriptions of the same elements as those described previously are omitted appropriately.

As illustrated in FIG. 30, the image display device 1600 includes an illumination unit 1002, a color separation unit 1604 for separating linear polarized white light from the illumination unit 1002 into different monochromatic light, for example, green and magenta light, a color-switching unit 1606 for selecting monochromatic light (for example, red or blue light) from the magenta light, a reflecting mirror 1608, a light valve 1608 for use of the red or blue light, a ½ wave plate 1616, a light valve 1612 for use of the green light, a pixel shift unit 1614, a color combination unit 1624 for combining the green light with the red or blue light to form a color image, and a projection optical system 1626 for magnifying and projecting the images formed by the light valves 1610 and 1612.

The color separation unit 1604 may be a dichroic mirror which reflects the green light component of the white light from the illumination unit 1602, and allows the magenta light component to pass through.

The color-switching unit 1606 may be formed from color filters to select monochromatic light from the magenta light.

Figure 31:
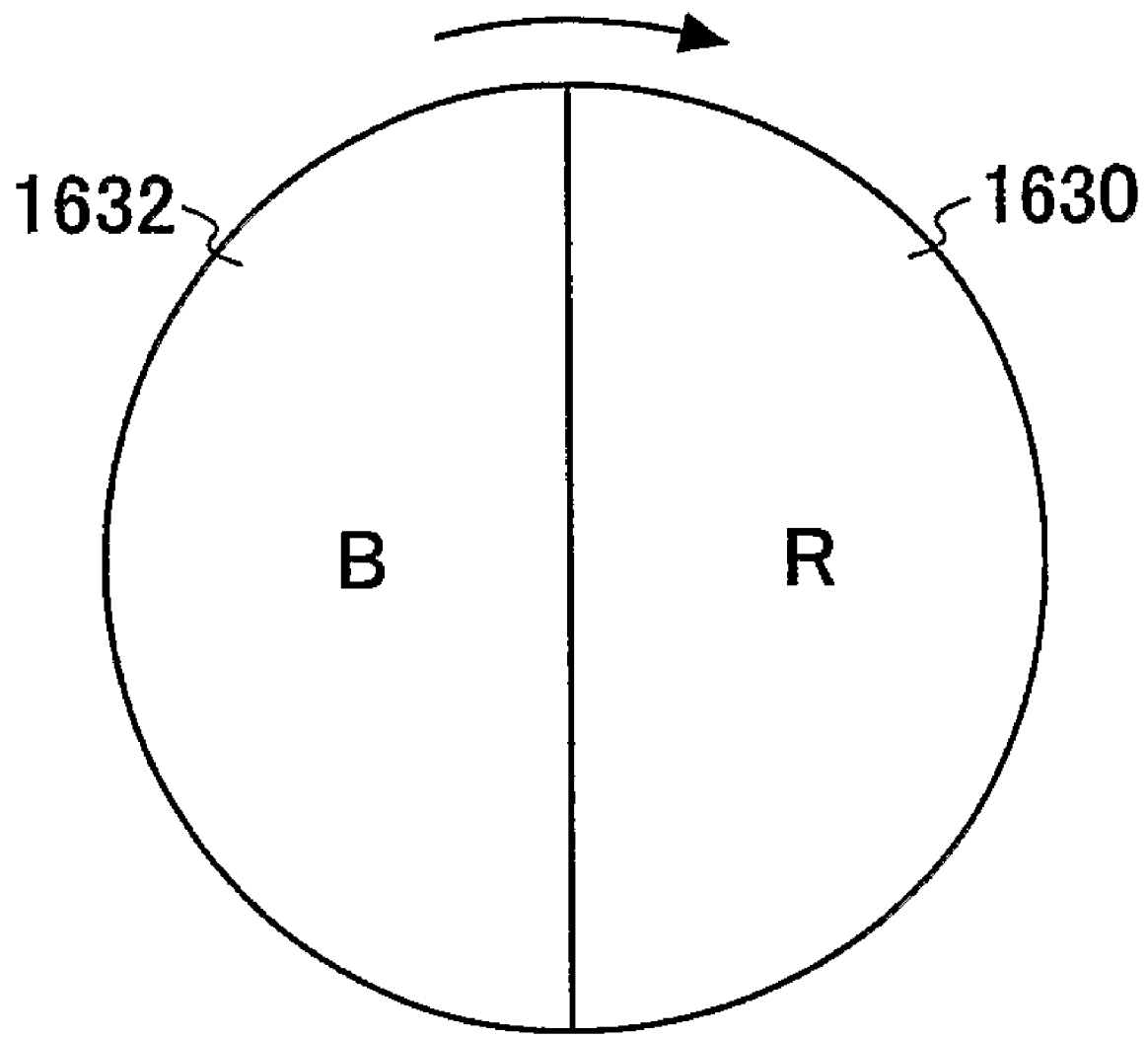
FIG. 31 is a diagram illustrating examples of the color-switching unit 1606 in FIG. 30.

FIG. 31 is a diagram illustrating examples of the color-switching unit 1606 in FIG. 30.

As illustrated in FIG. 31, the color-switching unit 1606 is formed from a red filter 1630 (R), and a blue filter 1632 (B) arranged side by side. The red filter 1630 (R) and the blue filter 1632 (B) are transmission type colors filters, allowing red light only and blue light only to pass through, respectively. In addition, in operations, the color-switching unit 1606 is rotated allowing incident white light to selectively pass through, thereby generating red light and blue light. Of course, a reflection type color filter may also be used to generate the monochromatic light. For example, the rotational speed of the color-switching unit 1606 is set to be in synchronization with the timings of switching the projected images, thus, the red illumination light and the blue illumination light are switched in a time division manner, and thereby, forming a red image and a blue image.

The light valves 1610 and 1612 may be a transmission type liquid crystal panel, or a reflection type liquid crystal panel, or a digital micro-mirror device (DMD, for example, produced by Texas Instrument Company).

The pixel shift unit 1614 is provided after the light valve 1612 for use of the green light to shift the light path of the green light from the light valve 1612 in each frame, and thus to shift positions of the green pixels projected by the light valve 1612 and form additional one or more green sub frames. Note that the shifted green pixels should not overlap with those un-shifted pixels.

Image data on the light valve 1612 is updated each time pixel shift is performed. The pixel shift and image data updating operations are performed quickly within one image frame period, thus, due to the after image effect on human eyesight, both the green sub frames at the shifted positions and the red, green and blue sub frames at the un-shifted position are present within one frame, therefore, it appears as if the number of pixels has been increased by the number of the shifted green sub frames.

The pixel shift unit 1614 may be a light path conversion element or a liquid crystal element capable of light path shift, or may also be implemented by driving a projection panel to perform micro-motion.

Although not illustrated in FIG. 30, a control unit similar to the control unit 13 disclosed in the first embodiment is provided in the image display device 1600 of the present embodiment. This control unit controls image data applied on the light valves 1610, 1612, controls the color-switching operations of the color-switching unit 1606, and controls pixel shift operations of the pixel shift unit 1614 so that the light valves 1610, 1612, the color-switching unit 1606, and the pixel shift unit 1614 operate cooperatively to form monochromatic images and the target color image.

Figure 32:
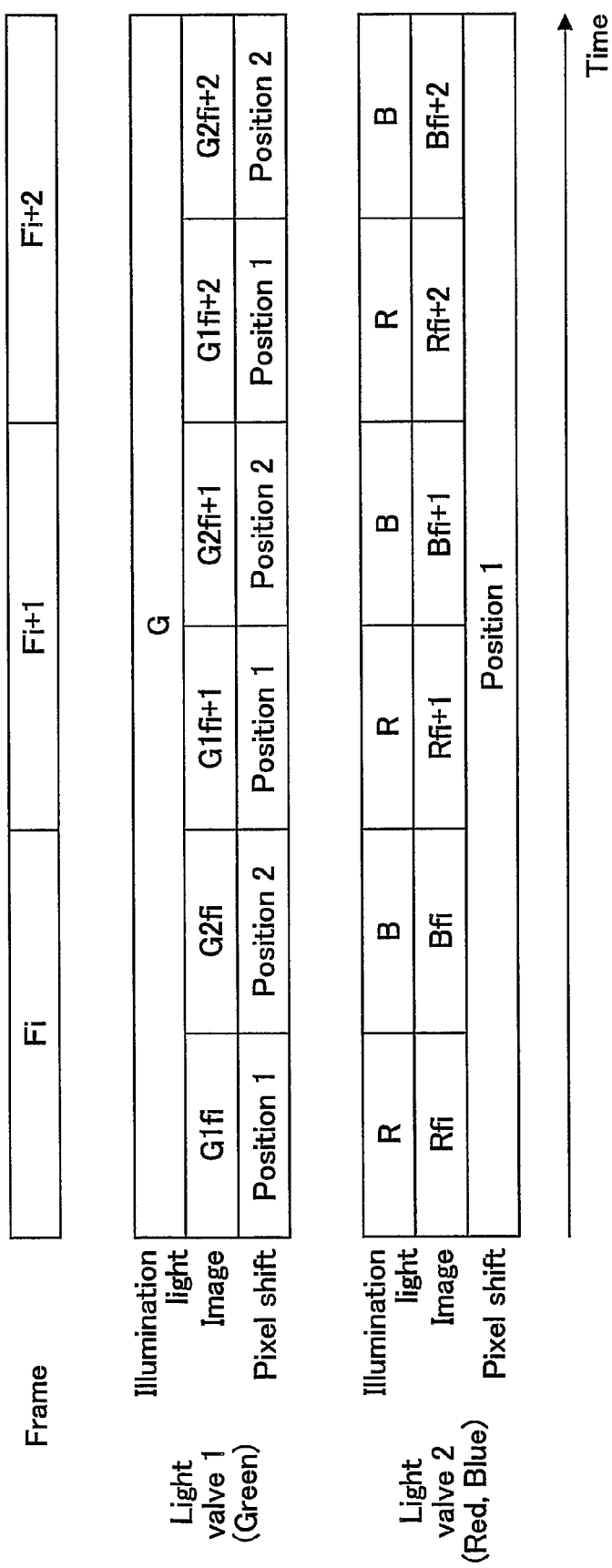
FIG. 32 shows timing sequences illustrating timings of pixel shift and light illumination in the present embodiment.

FIG. 32 shows timing sequences illustrating timings of pixel shift and light illumination in the present embodiment.

In the present embodiment, two light valves are used, illumination with the green light is performed constantly without being switched. On the other hand, illumination with red and blue is performed in the time division manner, that is, illumination with red and blue light is switched sequentially.

As illustrated in FIG. 32, in order to form an image frame, for example, Fi, illumination with red light and blue light is switched within the frame, thus forming red sub frames Rfi and Bfi at the first pixel position (position 1), sequentially.

As illustrated in FIG. 32, the pixel-shift unit 1614 performs pixel shift once on the green light within the image frame Fi during illumination with the green light, thereby, in the image frame Fi, a green sub frame G1fi is formed at the first pixel position (position 1) and a green sub frame G2fi is formed at the second pixel position (position 2).

The red sub frame Rfi and the blue sub frame Bfi at the first pixel position (position 1), the green sub frame G1fi at the first pixel position (position 1), and the green sub frame G2fi at the second pixel position (position 2) collectively form the image frame Fi.

Similarly, in order to form an image frame, Fi+1, illumination with red light and blue light is switched within the frame Fi+1, forming red sub frames Rfi+1 and Bfi+1 at the first pixel position (position 1), sequentially. The pixel-shift unit 1614 performs pixel shift once on the green light within the image frame Fi+1, thereby, in the image frame Fi+1, a green sub frame G1fi+1 is formed at the first pixel position (position 1) and a green sub frame G2fi+1 is formed at the second pixel position (position 2).

The red sub frame Rfi+1 and the blue sub frame Bfi+1 at the first pixel position (position 1), the green sub frame G1fi+1 at the first pixel position (position 1), and the green sub frame G2fi+1 at the second pixel position (position 2) collectively form the image frame Fi+1.

Similarly, for the image frame Fi+2, red light and blue light is switched within the frame Fi+2, forming red sub frames Rfi+2 and Bfi+2 at the first pixel position (position 1), sequentially. The pixel-shift unit 1614 performs pixel shift once on the green light within the image frame Fi+2, thereby, in the image frame Fi+1, a green sub frame G1fi+2 is formed at the first pixel position (position 1) and a green sub frame G2fi+2 is formed at the second pixel position (position 2).

The red sub frame Rfi+2 and the blue sub frame Bfi+2 at the first pixel position (position 1), the green sub frame G1fi+2 at the first pixel position (position 1), and the green sub frame G2fi+2 at the second pixel position (position 2) collectively form the image frame Fi+2.

It should be noted that it is not necessary for the timing of switching the red and blue light to be equal to the timing of shifting the green pixels.

In the present embodiment, illumination with the green light is performed constantly without being switched, and illumination with red and blue is switched sequentially in the time division manner, that is, the durations of illumination with the red light, the blue light, and the green light are different. Because of the after image effect on the human eyesight, the color brightness of the projected image is determined by accumulation of the red image, blue image, and the green images within a certain period, for example, if the durations of illumination with the green light at two positions are reduced by half, it is possible to attain color balance of the projected image. In addition, illumination techniques such as "color scroll", it is possible to obtain a sufficiently high light utilization rate.

According to the present embodiment, it is possible to provide an image display device that has a simplified structure characterized by color sequential technique.

In addition, it is possible to provide a compact image display device able to display a high quality image of high resolution at low cost.

13th Embodiment

Figure 33:
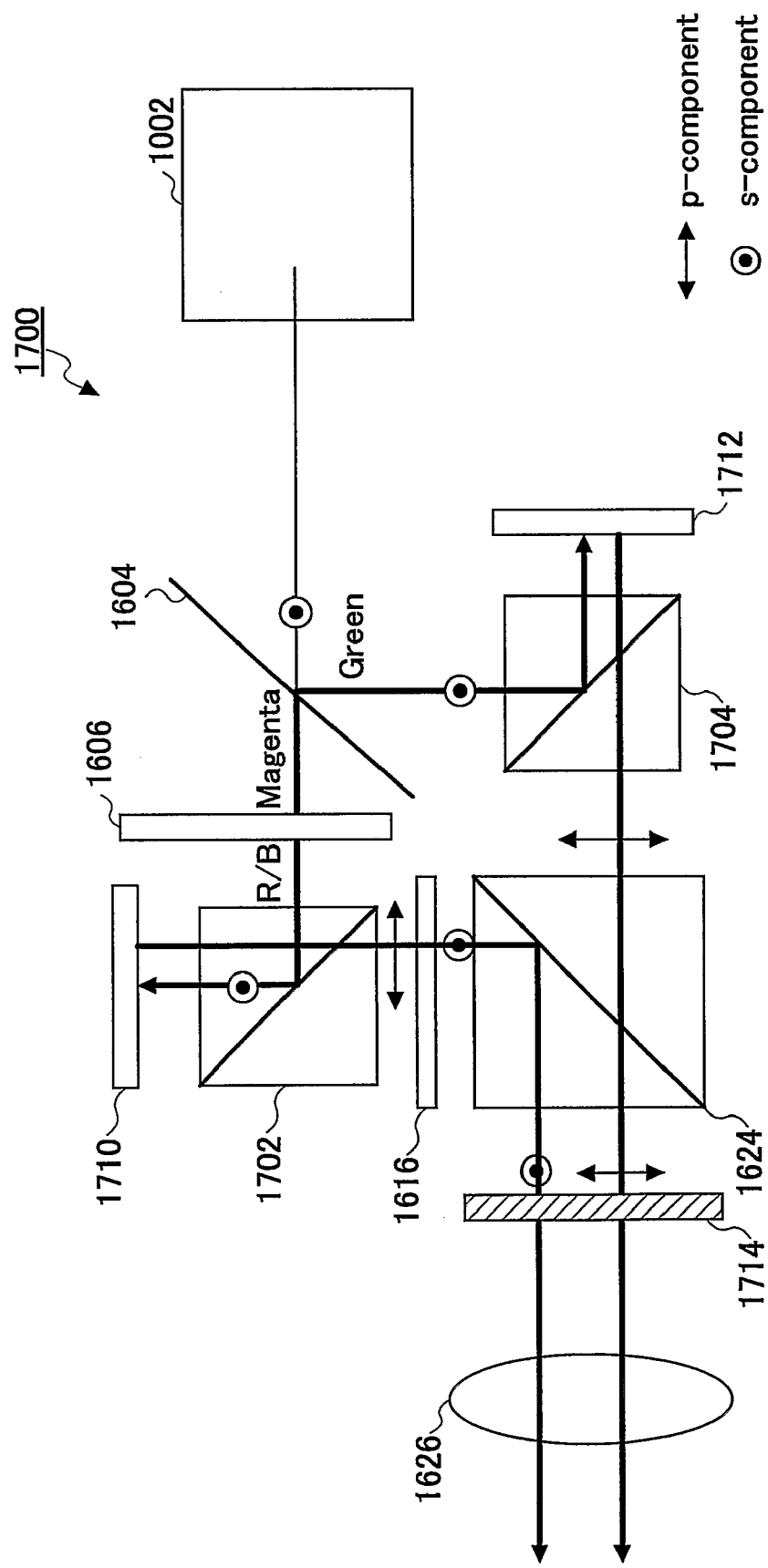
FIG. 33 is a diagram exemplifying a configuration of an image display device according to a 13th embodiment of the present invention.
Figure 34:
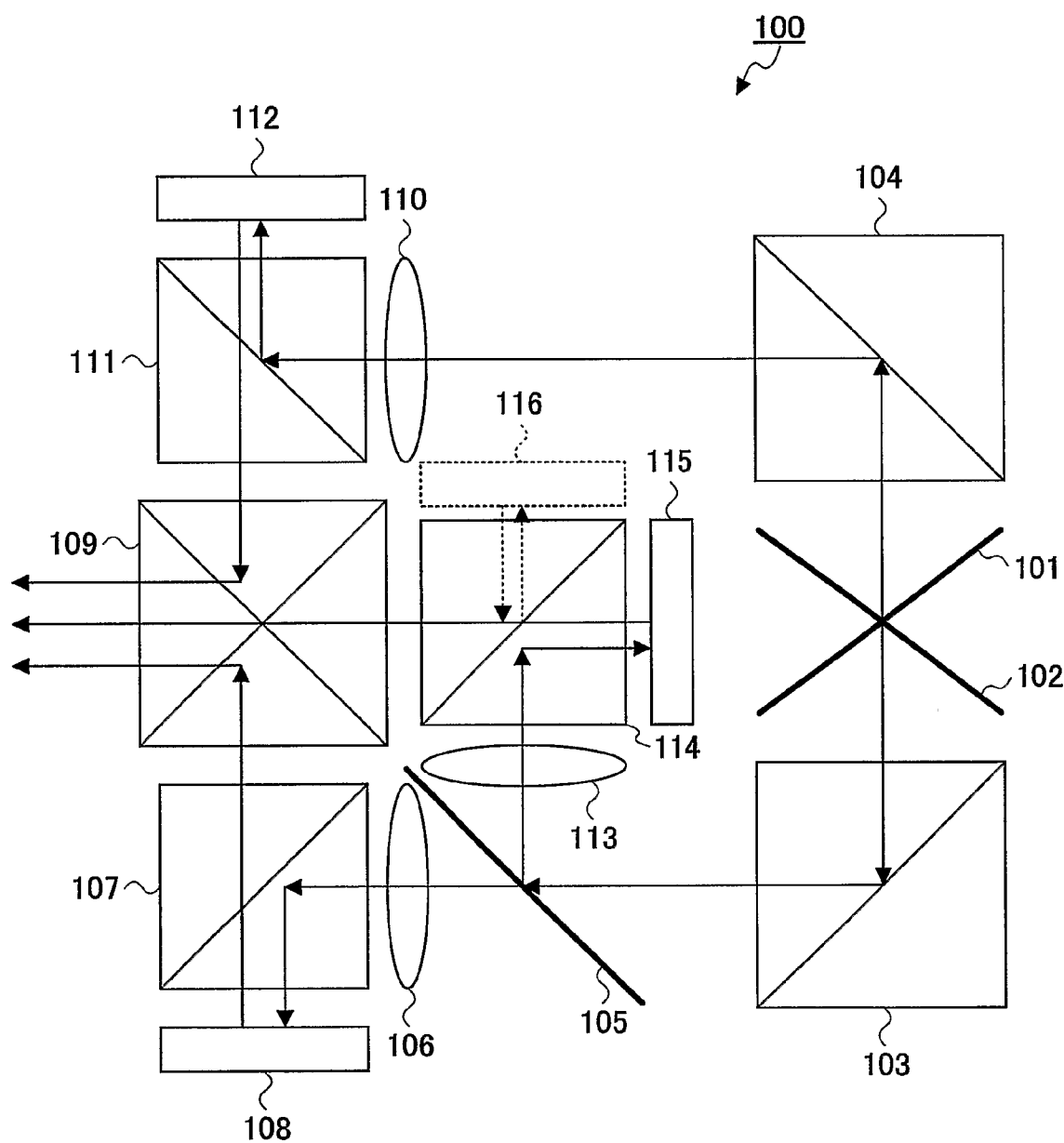
FIG. 34 is a diagram illustrating a configuration of the liquid crystal projection device in the related art, as disclosed in reference 1.

FIG. 33 is a diagram exemplifying a configuration of an image display device according to a 13th embodiment of the present invention.

In FIG. 33, the same reference numbers are assigned to the same elements as those described previously.

The image display device 1700 in FIG. 33 differs from the image display device 1600 in FIG. 32 in that reflection type light valves 1710 and 1712 are used, and a pixel shift unit 1714 is arranged between the projection lens 1626 and a color combination unit 1724.

Detailed descriptions are omitted.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-319045 filed on Nov. 2, 2004, the entire contents of which are hereby incorporated by reference.

The invention claimed is:

1. An image display device, comprising:
a time-division illumination unit that generates a plurality of different monochromatic light beams sequentially in a time-division manner for time-divisional illumination;
a light valve that is operable to form a plurality of sub frames of a target image when each of the monochromatic light beams is illuminating the light valve;
a control unit that controls the light valve during illumination of one of the monochromatic light beams so as to form a monochromatic image corresponding to the one of the monochromatic light beams; and
a light path shift unit that is operable to shift a light path of an output light beam from the light valve according to a frame period of the target image to form a sub frame of the target image at different positions from the other sub frames formed by the light valve,
wherein
the time-division illumination unit includes a color-switching unit configured to, in one frame period of the target image, divide at least one of the monochromatic light beams having a predetermined wavelength band into at least two portions in the time-division manner,
the light path shift unit shifts the light path of the output light beam from the light valve at least when one or more of the portions of the monochromatic light beam having the predetermined wavelength band is illuminating the light valve, and
illumination is performed in the time-division manner according to the timing of the light path shift operation of the light path shift unit.

2. The image display device as claimed in claim 1, wherein the color-switching unit is configured to specify illumination time periods of the different monochromatic light beams, respectively, so that white color illumination light is produced within one frame period of the target image so that illumination is performed in the time-division manner according to the specified illumination time periods and the timing of light path shift operation of the light path shift unit.

3. The image display device as claimed in claim 1, wherein
the different monochromatic light beams include a red light beam, a green light beam, and a blue light beam,
the color-switching unit, within one frame period of the target image, divide the green light beam into at least a first portion and a second portion, and define one illumination cycle including four or more time divisions corresponding to the first portion of the green light beam, the second portion of the green light beam, the red light beam, and blue light beam, respectively,
the light path shift unit shifts the light path of the output light beam from the light valve during illumination of the first portion of the green light beam or during illumination of the second portion of the green light beam.

4. The image display device as claimed in claim 1, wherein
the different monochromatic light beams include a red light beam, a green light beam, and a blue light beam,
the color-switching unit, within one frame period of the target image, divide the green light beam into at least a first portion and a second portion, and define one illumination cycle including four or more time divisions corresponding to the first portion of the green light beam, the second portion of the green light beam, the red light beam, and blue light beam, respectively,
illumination time periods of the red light beam and the blue light beam are arranged between the illumination time period of the first portion of the green light beam and the illumination time period of the second portion of the green light beam, and
the light path shift unit shifts the light path of the output light beam from the light valve during illumination of the red light beam or during illumination of the blue light beam.

5. The image display device as claimed in claim 1, wherein
the color-switching unit includes a plurality of color filters arranged side by side,
the color-switching unit repeatedly moves the color filters back-and-forth in accordance with timings of displaying the monochromatic images to perform color switching, select the monochromatic light beam having the predetermined wavelength band, and perform illumination in the time-division manner.

6. The image display device as claimed in claim 1, wherein each of the monochromatic light beams is emitted from a monochromatic light source that is controlled to emit light in synchronization with one of the corresponding illumination time periods.

7. The image display device as claimed in claim 1, wherein the time-division illumination unit generates the different monochromatic light beams by passing white light from a white light source through a plurality of wavelength-selective filters which are configured to be switchable with each other, setting timings of switching the wavelength-selective filters to be different for different colors included in the white light, and adjusting illumination time periods of the different colors included in the white light.

8. The image display device as claimed in claim 1, wherein the time-division illumination unit sets strength per time unit of the different monochromatic light beam having the predetermined wavelength band to be lower than strength per time unit of the other different monochromatic light to maintain color balance within one frame.

9. The image display device as claimed in claim 7, wherein strength per time unit of the different monochromatic light beam having the predetermined wavelength band is set to be lower than strength per time unit of the other different monochromatic light beams by adjusting light flux passing through the wavelength-selective filters.

10. The image display device as claimed in claim 9, wherein the strength per time unit of the different monochromatic light beam is reduced by setting a non-illumination time period.

11. The image display device as claimed in claim 1, wherein
the time-division illumination unit generates the different monochromatic light beams by using a liquid crystal switching element to set timings of switching wavelength selection in the liquid crystal switching element to be different for different colors included in white light from a white light source, and selectively adjust illumination time periods of the different colors included in the white light.

12. The image display device as claimed in claim 1, wherein the light valve is one of a transmission type liquid crystal panel, a reflection type liquid crystal panel, and a micro-minor device.

* * * * *